US005591833A

United States Patent [19]

Hines et al.

[11] Patent Number: 5,591,833
[45] Date of Patent: *Jan. 7, 1997

[54] COLORANTS AND INTERMEDIATES THEREFOR HAVING BRANCHED POLY(OXYALKYLENE)MOIETIES, AND THEIR MANUFACTURE

[75] Inventors: John B. Hines; David J. Moody, both of Spartanburg; Edward W. Kluger, Pauline, all of S.C.

[73] Assignee: Milliken Research Corporation, Spartanburg, S.C.

[*] Notice: The portion of the term of this patent subsequent to Apr. 28, 2009, has been disclaimed.

[21] Appl. No.: 104,276

[22] Filed: Aug. 10, 1993

Related U.S. Application Data

[63] Continuation of Ser. No. 887,109, May 19, 1992, abandoned, which is a continuation of Ser. No. 546,206, Jun. 28, 1990, abandoned.

[51] Int. Cl.$^6$ ............................... C09B 69/10; D06P 5/13
[52] U.S. Cl. ..................... 534/607; 534/608; 534/610; 534/611; 534/729; 544/105; 546/135; 546/288; 548/179; 548/371.1; 549/53; 549/474; 549/479; 558/391; 558/409; 552/109
[58] Field of Search ........................ 552/109; 8/403; 534/607, 608, 610, 611, 729

[56] References Cited

U.S. PATENT DOCUMENTS

| | | | |
|---|---|---|---|
| 3,154,535 | 10/1964 | Graham, Jr. ............... | 534/729 |
| 3,157,633 | 11/1964 | Kuhn ........................ | 534/729 |
| 3,446,757 | 5/1969 | Wandenberg ............. | 528/421 |
| 3,535,382 | 10/1970 | Brown et al. .............. | 564/418 |
| 3,927,044 | 12/1975 | Foster et al. ............... | 552/109 |
| 3,945,894 | 3/1976 | Martin et al. .............. | 204/55 R |
| 4,086,151 | 4/1978 | Stevens et al. ............. | 204/159.16 |
| 4,091,034 | 5/1978 | Kuhn ........................ | 552/109 |
| 4,113,721 | 9/1978 | Hauser et al. ............. | 11/4 |
| 4,167,510 | 9/1979 | Brendle .................... | 534/109 X |
| 4,298,764 | 11/1981 | Berkowitz ................ | 568/618 |
| 4,659,774 | 4/1987 | Webb et al. ............... | 525/54.2 |
| 4,751,254 | 6/1988 | Kluger et al. ............. | 521/163 |
| 4,761,502 | 8/1988 | Kluger et al. ............. | 564/442 |
| 4,812,141 | 3/1989 | Baumgartner et al. .... | 8/506 |
| 4,846,846 | 7/1989 | Rekers ...................... | 8/403 X |
| 4,849,533 | 7/1989 | Finter et al. ............... | 303/12 |
| 4,871,371 | 10/1989 | Harris ....................... | 5/13 |
| 4,877,411 | 10/1989 | Hines et al. ............... | 8/403 |
| 5,071,440 | 10/1991 | Hines et al. ............... | 8/403 |
| 5,082,938 | 1/1992 | Kluger et al. ............. | 211/46 |
| 5,108,460 | 4/1992 | Hines et al. ............... | 8/403 |
| 5,290,921 | 3/1994 | Moody ...................... | 534/729 X |

FOREIGN PATENT DOCUMENTS

| | | |
|---|---|---|
| 52-121038 | 10/1977 | Japan . |
| 53-137228 | 11/1978 | Japan . |
| 56-77271 | 6/1981 | Japan . |

OTHER PUBLICATIONS

Vandenberg, E. J., "Polymerization of Glycidol and Its Derivatives: A New Rearrangement Polymerization", *Journal of Polymer Science: Polymer Chemistry Edition*, vol. 23, 915–949 (1985).
Shigehara et al, Chemical Abstracts, 89:26022 (1977).
Shigehara et al, Chemical Abstracts, 90:123075 (1978).
Tsuchida, Chemical Abstracts, 95:170995 (1981).
English Translation of Japanese Patent 56–7721 Jun. 25, 1981.

*Primary Examiner*—Fiona T. Powers
*Attorney, Agent, or Firm*—Terry T. Moyer; Timothy J. Monahan

[57] ABSTRACT

Colorants and compositions useful as a fugitive or permanent colorant for a variety of substrates, or as intermediates for their manufacture, and having one or more improved properties of enhanced aqueous washability, compatibility with and non-extractibility from thermoplastic resins, or reactivity with resins having reactive functionality, said composition having the formula $C(Z)_{1-8}$ wherein:

C is the residue of a reactant having from 1–8 nucleophilic site residues to which the Z moieties are attached; said Z moieties containing at least about 60 weight percent of poly(oxyalkylene) which is comprised of (a) at least one glycidol residue segment of 2–6 glycidol residues attached to a nucleophilic site of C, wherein said poly(oxyalkylene) contains a total of from 2–20 glycidol residues, (b) and wherein said poly(oxyalkylene) further contains the residues of one or more other epoxide reactants of ethylene oxide (EO), propylene oxide (PO), or butylene oxide (BO), or mixtures thereof, wherein said poly(oxyalkylene) contains a total of from about 10 to about 600 of said EO, PO or BO residues, or mixtures thereof, at least about 75 mole percent of which are EO residues, (c) and with the provisions that the ratio of the total of —O—PO— and —O—BO— linkages of all glycidol residues to the total of all functional oxy linkages of said glycidol residues is less than one, and the molar ratio of EO residues to glycidol residues is from 4 to 75.

8 Claims, No Drawings

COLORANTS AND INTERMEDIATES THEREFOR HAVING BRANCHED POLY(OXYALKYLENE)MOIETIES, AND THEIR MANUFACTURE

RELATED APPLICATIONS

This application is a continuation of Ser. No. 07/887,109, filed on May 19, 1992, now abandoned of John Bery Hines, David Jesse Moody and which is a continuation of application Ser. No. 07/546,206 filed Jun. 28, 1990, abandoned.

The present invention concerns novel permanent or transient colorants, their intermediates, and processes for their manufacture, wherein the compounds contain branched poly(oxyalkylene) moieties having substantial poly(ethyleneoxy) content and are comprised of multiple chains branching from one or more polyglycidol residue segments.

The colorants, in one embodiment, have improved properties desirable for the fugitive tinting of polymers, such as enhanced aqueous washability and markedly reduced staining, which renders the colorants especially useful for color-coding textile materials such as fibers during their processing and use in the manufacture of fabric. The colorants, in another embodiment, show greatly improved non-extractibility from thermoplastic materials, particularly polyolefins, in which the colorants are physically blended for the permanent coloring thereof. The present intermediate compounds containing the novel poly(oxyalkylene) moieties typically have reactive sites such as reactive hydrogens or one or more groups such as aldehyde, amino, nitroso, nitro or the like which render them useful for the manufacture of colorants by various reactions known to the art.

In regard to the fugitive tinting or transient coloring aspect of the present invention, such technology has achieved wide acceptance in the textile industry including the poly(ethyleneoxy) substituted tints described in U.S. Pat. No. 3,157,833 incorporated herein by reference. These tint materials are normally applied to yarn such as nylon yarn before heat setting and comprise a combination of a chromophoric radical such as azo, and one or two poly(ethyleneoxy) groups, preferably attached to the chromophoric radical of the tint composition by an amine nitrogen.

It is particularly noted that the fugitive tint coloration of nylon presents special problems since the tinted yarn, or fabric woven or knitted therefrom, or carpet tufted therefrom, may be subjected to a heat-setting treatment which can fix the tint more or less permanently in the fibers such that it cannot be removed readily in later finish-scouring operations. Special and inconvenient reducing or oxidizing treatments to remove the tint are thus typically required.

Also, with the advent of improved carpet dyeing techniques such as the Kuster Continuous Dyer, scouring of such nylon carpet with copious quantities of water prior to dyeing is unnecessary and, in fact, may be undesirable except for the necessity of removing the fugitive tint. Environmental concerns have further acerbated the problems resulting from the use of large amounts of water in scouring the carpet.

Further, while conventional fugitive tints have in the past generally been applied at levels below about 0.5 percent based upon the weight of the fiber, at the present time increased tint levels are needed for maintaining proper identification of yarn ends during tufting operations. Where conventional fugitive tints are used at such high levels, e.g., above about 0.5 percent, removal of all of the tint after the applicable fiber processing become increasingly difficult or impossible.

In the processing of yarns, a particularly troublesome problem arises in attempting to monitor and detect broken yarn ends during graphic tufting, which involves tufting together different noncolored yarns which have different dye affinities and which, after dyeing, will show a color pattern or design as a result of the variation in different dye level up-take propensities. In this tufting process which uses non-colored yarns, it is often difficult to distinguish between the different yarn types, i.e., either chemical such as with polyamide vs. polyester, or with light vs. deep dyeable polyamide fibers, or with physical differences such as in fiber or yarn texture or denier. In order to monitor the tufting for breakage such that in-line retying thereof back to the correct yarn can be made, it is known to employ tinting or dyeing materials as described in U.S. Pat. No. 4,877,411 wherein the tinting materials are actually chemically affected by the yarn and lose their color after a relatively short period of time. It has been found, however, that the loss of color rate is very difficult to control and often results in a deficient color shade at the very time that monitoring, detecting and identifying the yarn is most needed. It would appear, therefore, that if different colored fugitive tints which can be removed by subsequent washing are used to tint the yarns, then it would be far easier to repair down or broken ends which must be tied back onto the correct yarn during tufting. However, extensive investigation has revealed that conventional fugitive tints are not sufficiently water removable or fugitive to permit application at the abnormally high levels required to enable the tufter to see and manipulate the individual down ends.

In regard to the embodiment of the present invention concerning the permanent coloring of thermoplastic materials, such coloration by liquid materials having colored chromophoric groups linked to poly(oxyalkylene) moieties is known, e.g., as in U.S. Pat. No. 4,812,141, the disclosure of which is incorporated herein by reference. The colorant materials of that patent are effective as colorants for the intended purpose; however, under conditions of prolonged or vigorous contact with solvent media, they often are extracted to an undesirable degree.

Objects therefore of the present invention are:

(1) to provide new fugitive tint materials which are more easily removed from yarns, particularly from nylon without the necessity of extensive washing or scouring of the processed yarns;

(2) to provide fugitive tint materials which can be used at much higher levels than are currently possible;

(3) to provide tint materials having increased visibility for yarn end identification; and (4) to provide colorants which have markedly improved solvent non-extractibility from thermoplastic materials.

These and other objects hereinafter appearing have been attained in accordance with the present invention which in several preferred embodiments may be defined as follows.

SUMMARY OF THE INVENTION

In its broad aspect, the present colorants or intermediates therefore are compounds having enhanced washability and marked reduced staining and are defined as having the formula

$$C-(Z)_{1-8}$$

wherein

C is the residue of a reactant having from 1–8 nucleophilic site residues to which the Z moieties are attached; said Z moieties containing at least about 60 weight percent of poly(oxyalkylene) which is comprised of (a) at least one glycidol residue segment of 2–6 glycidol residues attached to a nucleophilic site of C, wherein said poly(oxyalkylene) contains a total of from 2–20 glycidol residues, (b) and wherein said poly(oxyalkylene) further contains the residues of one or more other epoxide reactants of ethylene oxide (EO), propylene oxide (PO), or butylene oxide (BO), or mixtures thereof, wherein said poly(oxyalkylene) contains a total of from about 20 to about 600 of said EO, PO or BO residues, or mixtures thereof, at least about 75 mole percent of which are EO residues, (c) and with the provisions that the ratio of the total of —O—PO— and —O—BO— linkages of all glycidol residues to the total of all functional oxy linkages of said glycidol residues is less than one, and the molar ratio of EO residues to glycidol residues is from 4 to 75.

In certain preferred embodiments:

(a) the total number of said other epoxide residues is from about 150 to about 400;

(b) the EO residues comprise from about 90 to 100 mole percent of said other epoxide residues;

(c) the poly(oxyalkylene) moiety contains at least one glycidol residue segment containing 2–6 glycidol residues;

(d) each said poly(oxyalkylene) moiety contains at least one glycidol residue segment having three separate poly(oxyalkylene) branches pendant therefrom;

(e) each said poly(oxyalkylene) moiety is independently terminated by hydrogen or a group selected from acyl, unsubstituted or substituted alkyl, cycloalkyl, or aryl.

(f) each said poly(oxyalkylene) branch is terminated by hydrogen; and (g) the number of Z moieties is from 1–4.

Preferable colorants of the present invention have the following general formulae:

Q—N=N—$A_R$

Azo $Q_1(N=N-A_R)_{2 or 3}$

Polyazo

M=CH—$A_R$

Methine

M=N—$A_R$

Azamethine

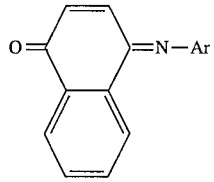

Indophenol $Ar_3C^+$

Triarylmethane

D—N=N—Ar

Quaternary Azo wherein Q is the residue of a carbocyclic or heterocyclic aromatic, diazotizable amine reactant selected from unsubstituted or substituted: phenyl; naphthyl; thiazol-2-yl; benzothiazol-2-yl; 1,3,4-thiadiazol-2-yl; 1,2,4,-thiadiazol-5-yl; isothiazol-5-yl; isoxazol-5-yl; 2,1-benzisothiazol-3-yl; 2-and 3-thienyl; 3-and 4-pyridyl; pyrazol-5-yl; 3-and 4-phthalimidyl; 1,2,4-triazol-3-yl; or 4,5(3,3-dimethyl-1-oxotetramethylene)thiazol-2-yl;

$Q_1$ is a di- or trivalent aromatic carbocyclic or heterocyclic moiety;

M is an active methylene residue;

Ar is the residue of a reactant selected from substituted or unsubstituted: anilines; naphthylamines; 1,2,3,4-tetrahydroquinolines; 3,4-dihydro-2H-1,4-benzoxazines; 2-aminothiazoles; 2,3-dihydroindoles; carbazoles; phenoxazines; phenothiazines; 2-aminothiophenes; aminopyridines or julolidines;

D is an aromatic heterocyclic radical which contains a quaternary nitrogen atom, said radical being selected from unsubstituted or substituted: thiazol-2-yl; benzothiazol-2-yl; 1,3,4-thiadiazol-2-yl; 1,2,4-thiadiazol-5-yl; isothiazol-5-yl; 2,1-benzisothiazol-3-yl; pyrazol-5-yl; 1,3,4-triazol-2-yl; 3- or 4-pyridyl; or 4,5-(3,3-dimethyl-1-oxotetramethylene)-thiazol-2-yl; and wherein at least one -Z moiety is present on either Q-, $Q_1$ or —Ar.

A more preferred group of colorants of the invention are those with the specific formulae for the Q-, $Q_1$, —Ar, M- and D- moieties as described below. Preferred colorants are those wherein the aromatic residue Q— is selected from those of the formulae:

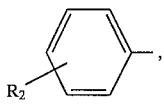

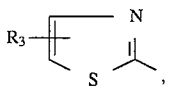

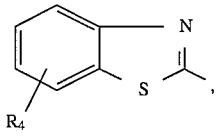

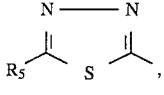

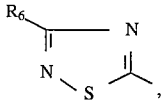

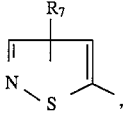

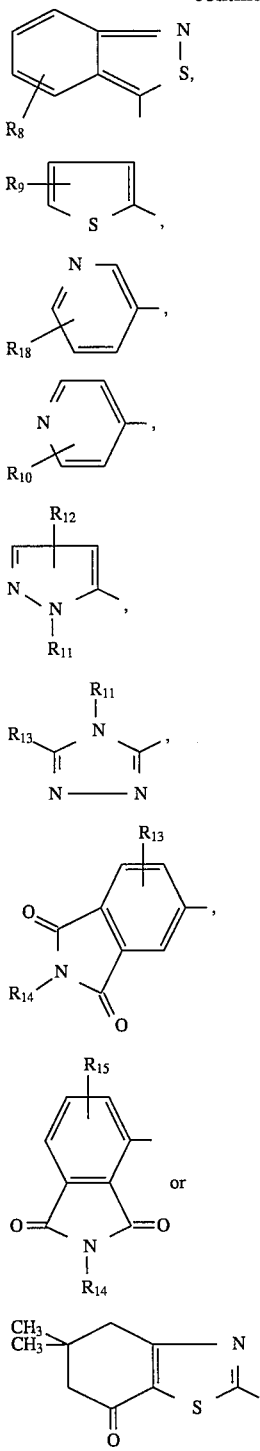

wherein:

R₂ is hydrogen or 1–3 substituents selected from lower alkyl, lower alkoxy, halogen, cyano, nitro, formyl, alkanoyl, aroyl, thiocyano, lower alkylthio, arylthio, lower alkylsulfonyl, arylsulfonyl, —SO₃alkyl, carbalkoxy, unsubstituted or substituted sulfamoyl, unsubstituted or substituted carbamoyl, nitro, trifluoromethyl or arylazo;

R₃ is hydrogen or 1–2 substituents selected from lower alkyl, aryl, arylazo, halogen, cyano, formyl, carbalkoxy, nitro, thiocyano, lower alkylsulfonyl, arylsulfonyl, trifluoromethyl, alkanoyl, aroyl, unsubstituted or substituted sulfamoyl or unsubstituted or substituted carbamoyl;

R₄ is hydrogen or 1–3 substituents selected from lower alkyl, lower alkoxy, halogen, cyano, carbalkoxy, alkanoyl, aroyl, arylazo, —SO₃-aryl, alkylsulfonyl, arylsulfonyl, unsubstituted or substituted carbamoyl, unsubstituted or substituted sulfamoyl, alkylthio, thiocyano, 2-cyanoethylthio, 2-cyanoethylsulfonyl, or alkanoylamino;

R₅ is hydrogen or a group selected from lower alkyl, cycloalkyl, aryl, alkylthio, allylthio, arylthio, cyanomethylthio, halogen, alkylsulfonyl, arylsulfonyl, lower alkoxy, benzylthio, allylthio, unsubstituted or substituted sulfamoyl, thiocyano or alkanoylamino;

R₆ is hydrogen or a group selected from lower alkyl, aryl, alkylthio, alkylsulfonyl, halogen, cyano, 2-carbalkoxyethylthio or benzylthio;

R₇ is hydrogen or 1–2 substituents selected from lower alkyl, halogen, nitro, lower carbalkoxy, cyano, alkylthio, 2-hydroxyethylthio, arylthio, alkylsulfonyl or arylsulfonyl;

R₈ is hydrogen or a group selected from lower alkyl, lower alkoxy, nitro, halogen or unsubstituted or substituted sulfamoyl;

R₉ is 1–3 substituents selected from lower alkyl, aryl, cyano, lower carbalkoxy, cyclohexylcarbonyl, alkanoyl, aroyl, halogen, formyl, unsubstituted or substituted carbamoyl, thiocyano, alkylsulfonyl, arylsulfonyl, unsubstituted or substituted sulfamoyl, nitro, arylazo or cinnamoyl;

R₁₀ is hydrogen or 1–3 substituents selected from lower alkyl, halogen, lower alkoxy, lower alkylsulfonyl, arylsulfonyl, carbalkoxy, aryl, unsubstituted or substituted carbamoyl; unsubstituted or substituted sulfamoyl, formyl, or thiocyano;

R₁₁ is hydrogen, lower alkyl, cycloalkyl, aryl, alkylsulfonyl, or arylsulfonyl;

R₁₂ is hydrogen or 1–2 substituents selected from lower alkyl, aryl, lower carbalkoxy, cyano, nitro, unsubstituted or substituted carbamoyl, lower alkylthio, cyanomethyl;

R₁₃ is hydrogen, lower alkyl, lower alkylthio, arylthio, carbalkoxy, halogen, lower alkylsulfonyl, or arylsulfonyl;

R₁₄ is selected from hydrogen, unsubstituted or substituted alkyl, aryl, cycloalkyl, or allyl; and R₁₅ is hydrogen or 1–2 substituents selected from lower alkyl, lower alkoxy, halogen, nitro, cyano, alkylthio, arylthio, alkylsulfonyl, arylsulfonyl or aryloxy;

wherein Ar is an aromatic residue selected from those of the formulae:

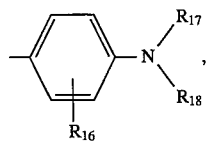

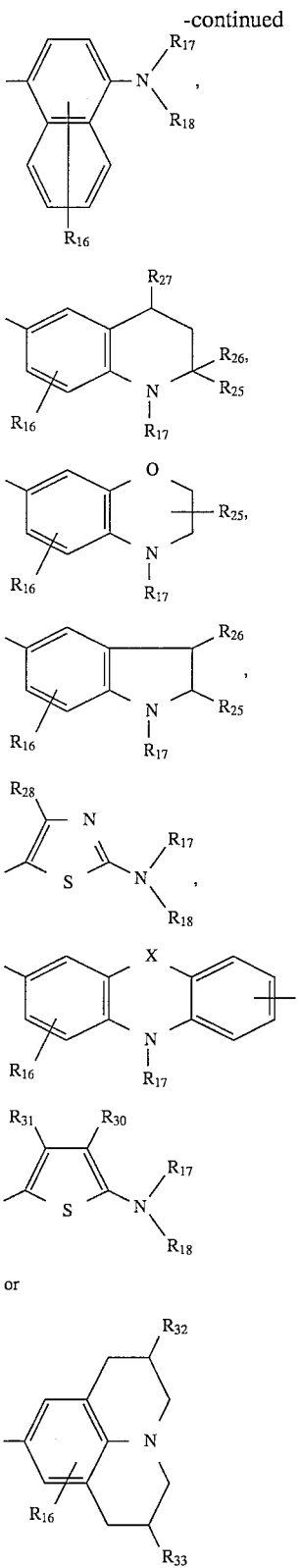

wherein:
R$_{16}$ is hydrogen or 1–2 substituents selected from lower alkyl, trifluoromethyl, lower alkoxy, arylthio, aryloxy, halo —CH$_2$—O—Z or —O—alkylene—Z;

R$_{17}$ and R$_{18}$ are each independently selected from —Z, straight or branched lower alkenyl; cycloalkyl; cycloalkyl substituted with hydroxy, alkoxy, alkyl, halogen or alkanoyl phenyl; phenyl substituted with one or more groups selected lower alkyl, lower alkoxy, cyano, alkanoyloxy or —L—Z; straight or branched chain alkyl of 1–12 carbons and such alkyl substituted with one or more of

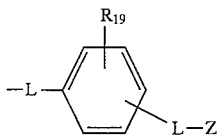

or

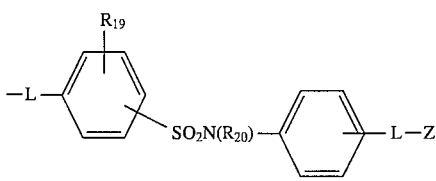

cyano, halogen, 2-pyrrolidino, phthalimidino, vinylsulfonyl, acrylamido, o-benzoic sulfonimido, a group of the formula

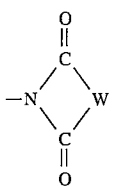

phenyl, and phenyl substituted with lower alkyl, lower alkoxy, halogen, carbalkoxy, cyano, carboxy or acyloxy;

R$_{19}$ is selected from hydrogen, lower alkyl, lower alkanoylamino, lower alkoxy, or halogen;

R$_{20}$ is selected from hydrogen; lower alkyl; lower alkyl substituted with hydroxy, acyloxy, phenyl, cycloalkyl, halogen or alkoxy; cycloalkyl; phenyl; phenyl substituted with lower alkyl, lower alkoxy, halogen, hydroxy, alkanoylamino, carbalkoxy, carboxy, cyano, or alkanoyloxy;

W is selected from: lower alkylene of 1–3 carbons; lower alkylene substituted with hydroxy, halogen, alkoxy or acyloxy; vinyl; 1,2-phenylene; 1,2-phenylene substituted with lower alkyl, lower alkoxy halogen, carboxy or carbalkoxy; 1,2-cyclohexylene; —O—CH$_2$—; —CH$_2$OCH$_2$—; SCH$_2$—; —N(R$_{21}$)CH$_2$—; —N(R$_{21}$)CH$_2$CH$_2$—; or —CH$_2$N(R$_{21}$)CH$_2$—;

wherein the alkyl group represented by R$_{17}$ and R$_{18}$ can be further substituted with a group selected from those of the formulae:
—O—R$_{21}$; —SO$_2$—R$_{22}$; —CON(R$_{21}$) R$_{23}$; —SO$_2$N(R$_{21}$)R$_{23}$; —N(R$_{21}$)SO$_2$R$_{22}$; —OCO—R$_{23}$; —OCO$_2$R$_{23}$; —OCON(R$_{21}$)R$_{23}$; —SR$_{24}$ or —SO$_2$CH$_2$CH$_2$SR$_{24}$;

wherein R$_{21}$ and R$_{23}$ are selected from hydrogen; lower alkyl; lower alkyl substituted with hydroxy, aryloxy, halogen, cycloalkyl or phenyl; cycloalkyl; phenyl; phenyl substituted with lower alkyl, lower alkoxy, halogen, hydroxy, alkanoylamino, carbalkoxy, carboxy, cyano or alkanoyloxy;

R$_{22}$ represents the same substituents listed for R$_{21}$ and R$_{23}$ excepting hydrogen;

R$_{24}$ is selected from a group listed above for R$_{21}$ and R$_{23}$ plus benzothiazol-2-yl, benzimidazol-2-yl, pyridyl, pyrimidinyl, 1,3,4,-thiadiazolyl, 1,3,4,-oxadiazolyl, naphthyl or triazolyl;

R$_{25}$, R$_{26}$, and R$_{27}$ are independently selected from hydrogen or lower alkyl;

R$_{28}$ is hydrogen, cycloalkyl, alkyl, 2-thienyl, phenyl, phenyl substituted with halogen, lower alkyl, or lower alkoxy;

R$_{29}$ is hydrogen or 1-2 substituents selected from lower alkyl, lower alkoxy or halogen;

R$_{30}$ is selected from cyano, carbalkoxy, alkylsulfonyl, arylsulfonyl or unsubstituted or substituted carbamoyl;

R$_{31}$ is hydrogen, lower alkyl or aryl;

R$_{32}$ and R$_{33}$ are independently selected from hydrogen, lower alkyl, lower alkoxy, halogen or —Z;

wherein X is a covalent bond, oxygen, or sulfur; and

L is selected from X or —SO$_2$—, —SO$_2$N(R$_{21}$)—, —C(=O)—O—, —N(SO$_2$R$_{22}$)— or —N(R$_{21}$)—; and with the proviso that the compound contain at least one —Z moiety;

wherein Q$_1$ is a di or trivalent aromatic residue of the formula:

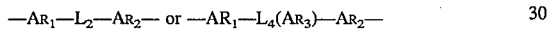

wherein Ar$_1$ Ar$_2$, and Ar$_3$ are each selected from unsubstituted or substituted phenylene, naphthalene-diyl, quinolindiyl, benzothiazole-diyl, and 1,3,4-thiadiazole-diyl.

wherein common substituents on Ar$_1$, Ar$_2$, and Ar$_3$ include lower alkyl, lower alkoxy, and halogen;

wherein L$_2$ is selected from the following: covalent bond; —O—; —S—; —SO$_2$—; —S—S—; —C(=O)—; —O—C(=O)—O—; —CON(Y)—; —N(Y)—; —N(SO$_2$Y$_1$)—; —SO$_2$N(Y)—; —NHC(=O)NH—; —C(=O)—; —NHC(=O)—O—; arylene; -alkylene-L$_3$-alkene-; —L$_3$-alkylene-L$_3$—; -alkylene-L$_3$—; —L$_3$-alkylene-arylene-alkylene-L$_3$—; —L$_3$-alkylene-L$_3$-alkylene-L$_3$—;

Y is selected from hydrogen or unsubstituted or substituted alkyl, cycloalkyl or phenyl;

Y$_1$ is selected from unsubstituted or substituted alkyl, cycloalkyl or phenyl;

L$_3$ is selected from —O—; —S—; —SO$_2$—; —CO$_2$—; —CON(Y)—; —SO$_2$N(Y)— or —N(SO$_2$Y$_1$)—; and L$_4$ is selected from —C(–)$_2$—Y or —N(–)$_2$; wherein M is an active methylene residue selected from those of the formulae

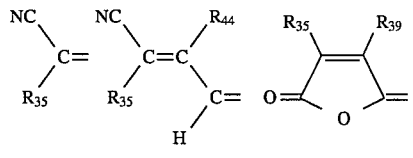

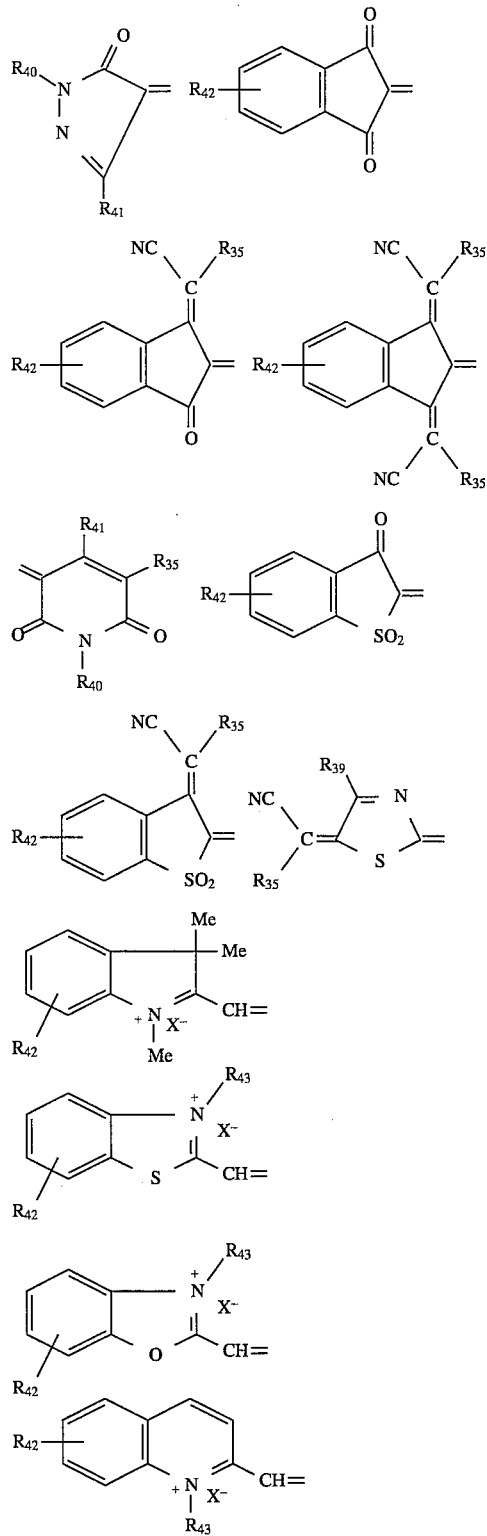

wherein:

R$_{35}$ is selected from cyano, —CON(R$_{36}$)R$_{37}$, —CO$_2$R$_{36}$, —COR$_{38}$, or —SO$_2$R$_{38}$;

R$_{36}$ and R$_{37}$ are selected from hydrogen, cycloalkyl, unsubstituted or substituted alkyl, phenyl, phenyl substituted with lower alkyl, lower alkoxy or halogen;

$R_{38}$ is selected from substituents represented by $R_{36}$ and $R_{37}$ excepting hydrogen;

$R_{39}$ is selected from lower alkyl, cycloalkyl or aryl;

$R_{40}$ is selected from hydrogen, alkyl or aryl;

$R_{41}$ is selected from hydrogen, lower alkyl, aryl or carbalkoxy;

$R_{42}$ is hydrogen or 1–2 substituents selected from lower alkyl, lower alkoxy or halogen;

$R_{43}$ is selected from lower alkenyl, lower alkyl, benzyl, substituted benzyl, hydroxyalkyl, carbamoylalkyl, -alkylene-$CO_2^-M^+$ or -alkylene-$SO_3^-M^+$ wherein $M^+$ is $H^+$, $Na^+$, $K^+$, $Li^+$ or $NH_4^+$ and wherein $X^-$ is a counter anion selected from $Cl^-$, $Br^-$, $CH_3SO_4^-$, $C_2H_5SO_4^-$, or $ZnCl_4^{-2}/2$; and $R_{44}$ is aryl or substituted aryl;

with the proviso that the colorant contain at least one poly(oxyalkylene) moiety —Z; wherein D is a residue selected from those of the formulae:

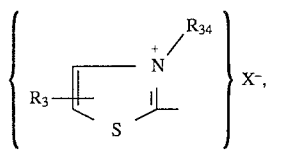

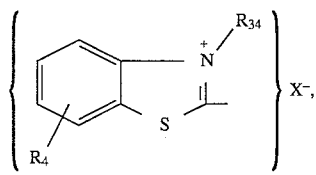

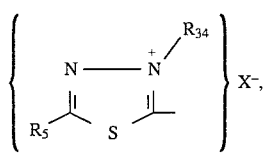

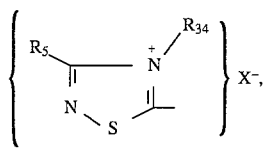

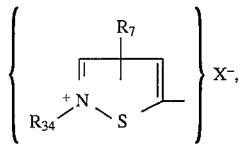

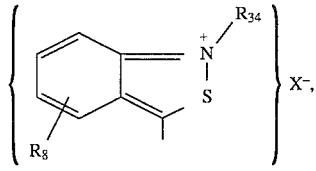

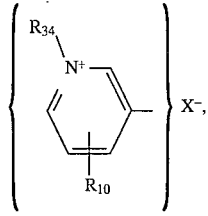

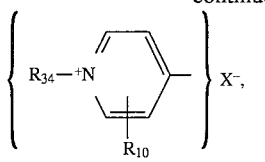

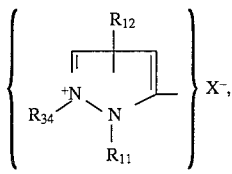

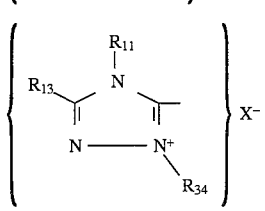

or

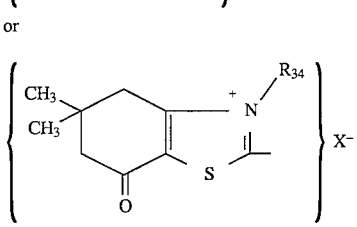

wherein:

$R_3$ is hydrogen or 1–2 substituents selected from lower alkyl, aryl, arylazo, halogen, cyano, formyl, carbalkoxy, nitro, thiocyano, lower alkylsulfonyl, arylsulfonyl, trifluoromethyl, alkanoyl, aroyl, unsubstituted or substituted sulfamoyl or unsubstituted or substituted carbamoyl;

$R_4$ is hydrogen or 1–3 substituents selected from lower alkyl, lower alkoxy, halogen, cyano, carbalkoxy, alkanoyl, aroyl, arylazo, —$SO_3$-aryl, alkylsulfonyl, arylsulfonyl, unsubstituted or substituted carbamoyl, unsubstituted or substituted sulfamoyl, alkylthio, thiocyano, 2-cyanoethylthio, 2-cyanoethylsulfonyl, or alkanoylamino;

$R_5$ is hydrogen or a group selected from lower alkyl, cycloalkyl, aryl, alkylthio, arylthio, cyanomethylthio, halogen, alkysulfonyl, arylsulfonyl, lower alkoxy, benzylthio, allylthio, unsubstituted or substituted sulfamoyl, thiocyano or alkanoylamino;

$R_6$ is hydrogen or a group selected from lower alkyl, aryl, alkylthio, alkylsulfonyl, halogen, cyano, 2-carbalkoxyethylthio or benzylthio;

$R_7$ is hydrogen or 1–2 substituents selected from lower alkyl, halogen, nitro, lower carbalkoxy, cyano, alkylthio, 2-hydroxyethylthio, arylthio, alkylsulfonyl or arylsulfonyl;

$R_8$ is hydrogen or a group selected from lower alkyl, lower alkoxy, nitro, halogen or unsubstituted or substituted sulfamoyl;

$R_{10}$ is hydrogen or 1–3 substituents selected from lower alkyl, halogen, lower alkoxy, lower alkylsulfonyl, arylsulfonyl, carbalkoxy, aryl, unsubstituted or substituted carbamoyl; unsubstituted or substituted sulfamoyl, formyl, or thiocyano;

$R_{11}$ is hydrogen, lower alkyl, cycloalkyl, aryl, alkylsulfonyl, or arylsulfonyl;

R₁₂ is hydrogen or 1–2 substituents selected from lower alkyl, aryl, cyano, lower carbalkoxy, nitro, carbamoyl, lower alkylthio, cyanomethyl;

R₁₃ is hydrogen, lower alkyl, lower thioalkyl, arylthio, carbalkoxy, halogen, lower alkylsulfonyl, or arylsulfonyl;

R₃₄ is selected from lower alkenyl, lower alkyl, optionally substituted benzyl, hydroxyalkyl, carbamoylalkyl, -alkylene-CO₂⁻M⁺ or -alkylene-SO₃⁻M⁺; wherein M⁺ is H⁺, Na⁺, K⁺, Li⁺ or NH₄⁺; and wherein X⁻ is a counter anion selected from Cl⁻, Br⁻, CH₃SO₄⁻, C₂H₅SO₄⁻, ZnCl₄⁻²/2; with the proviso that the colorant contain at least one poly(oxyalkylene) moiety Z.

Preferred intermediates are those compounds wherein C is a nucleophilic residue derived from primary or secondary amines, hydroxyl compounds, mercapto compounds, sulfinic acids, sulfonamides, imides or sulfoic imides.

More specific intermediates are those compounds wherein C is derived from a nucleophile selected from those of the formulae:

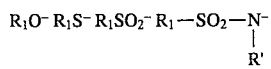

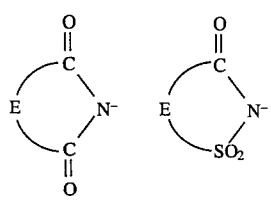

wherein:

R₁ is selected from substituted or unsubstituted alkyl of 1–20 carbons, substituted or unsubstituted aryl of 6–10 ring carbons, or substituted or unsubstituted cycloalkyl of 5–7 ring carbons;

R' is selected from hydrogen or R₁; and E comprises a divalent ring moiety.

Further perferred intermediates are compounds wherein C is the residue of a reactant selected from substituted or unsubstituted anilines; 1,2,3,4-tetrahydroquinolines; 3,4-dihydro-2H-1,4-benzoxazines; 2-aminothiazoles; indoles; 2,3-dihydroindoles; carbazoles; naphthylamines; phenoxazines; phenothiazines; diphenylamines; julolidines; 2-aminothiophenes or aminopyridines.

Especially preferred group of intermediates of the invention are those compounds wherein C is selected from the formulae:

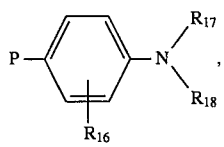

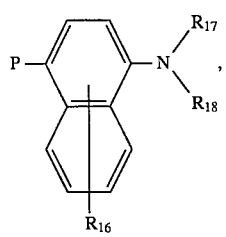

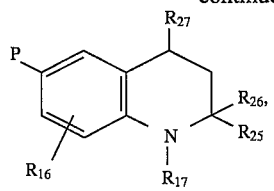

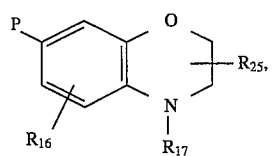

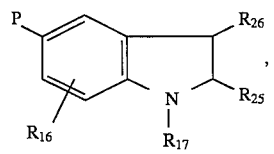

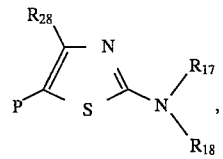

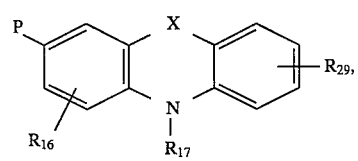

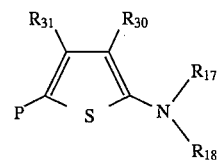

or

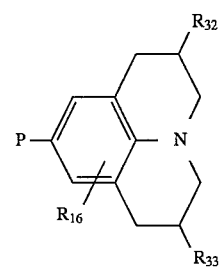

wherein:

P is selected from: hydrogen; —N=O; —NH₂; —NH—NH₂; NO₂; COR₄₈ wherein R₄₈ is selected from hydrogen, unsubstituted or substituted alkyl, cycloalkyl, or aryl; N₂⁺X⁻, wherein X⁻ is a counterion; —N=CH—R₄₉ or —CH=N—R₄₉; wherein R₄₉ is selected from alkyl, cycloalkyl or aryl;

R₁₆ is hydrogen or 1–2 substituents selected from lower alkyl, trifluoromethyl, lower alkoxy, arylthio, aryloxy, halogen, —CH₂—O—Z or —O—alkylene—O—Z;

R₁₇ and R₁₈ are each independently selected from —Z, straight or branched lower alkenyl; cycloalkyl; cycloalkyl substituted with hydroxy, alkoxy, alkyl, halogen or alkanoyloxy; phenyl; phenyl substituted with one or more groups selected from lower alkyl, lower alkoxy, cyano, alkanoyloxy or —L—Z; straight or branched chain alkyl of 1–12 carbons and such alkyl substituted with one or more of

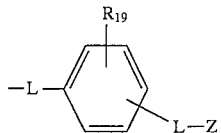

or

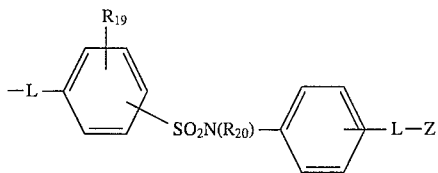

cyano, halogen, 2-pyrrolidino, phthalimidino, vinylsulfonyl, acrylamido, o-benzoic sulfonimido, a group of the formula

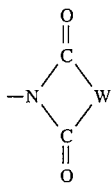

phenyl or phenyl substituted with lower alkyl, lower alkoxy, halogen, carbalkoxy, cyano, carboxy or acyloxy;

$R_{19}$ is selected from hydrogen, lower alkyl, lower alkanoylamino, lower alkoxy, or halogen;

$R_{20}$ is selected from hydrogen; lower alkyl; lower alkyl substituted with hydroxy, acyloxy, phenyl, cycloalkyl, halogen or alkoxy; cycloalkyl; phenyl; phenyl substituted with lower alkyl, lower alkoxy, halogen, hydroxy, alkanoylamino, carbalkoxy, carboxy, cyano, or alkanoyloxy;

W is selected from: lower alkylene of 1–3 carbons; lower alkylene substituted with hydroxy, halogen, alkoxy or acyloxy; vinyl; 1,2-phenylene; 1,2-phenylene substituted with lower alkyl, lower alkoxy halogen, carboxy or carbalkoxy; 1,2-cyclohexylene; —O—CH$_2$—; —CH$_2$OCH$_2$—; —SCH$_2$—; —N(R$_{21}$)CH$_2$—; —N(R$_{21}$)CH$_2$CH$_2$—; or —CH$_2$N(R$_{21}$)CH$_2$—;

wherein the alkyl group represented by $R_{17}$ and $R_{18}$ can be further substituted with a group selected from those of the formulae:

—O—R$_{21}$;    —SO$_2$—R$_{22}$;    —CON(R$_{21}$)R$_{23}$; —SO$_2$N(R$_{21}$)R$_{23}$; —N(R$_{21}$)SO$_2$R$_{22}$; —OCO—R$_{23}$; —OCO$_2$R$_{23}$;    —OCON(R$_{21}$)R$_{23}$;    —SR$_{24}$  or —SO$_2$CH$_2$CH$_2$SR$_{24}$;

wherein $R_{21}$ and $R_{23}$ are selected from hydrogen; lower alkyl; lower alkyl substituted with hydroxy, aryloxy, halogen, cycloalkyl or phenyl; cycloalkyl; phenyl; phenyl substituted with lower alkyl, lower alkoxy, halogen, hydroxy, alkanoylamino, carbalkoxy, carboxy, cyano or alkanoyloxy;

$R_{22}$ represents the same substituents listed for $R_{21}$ and $R_{23}$ excepting hydrogen;

$R_{24}$ is selected from a group listed above for $R_{21}$ and $R_{23}$ plus benzothiazol-2-yl, benzimidazol-2-yl, pyridyl, pyrimidinyl, 1,3,4-thiadiazolyl, 1,3,4-oxadiazolyl, naphthyl or triazolyl;

$R_{25}$, $R_{26}$, and $R_{27}$ are independently selected from hydrogen or lower alkyl;

$R_{28}$ is hydrogen, cycloalkyl, alkyl, 2-thienyl, phenyl, phenyl substituted with halogen, lower alkyl, or lower alkoxy;

$R_{29}$ is hydrogen or 1–2 substituents selected from lower alkyl, lower alkoxy or halogen;

$R_{30}$ is selected from cyano, carbalkoxy, alkylsulfonyl, arylsulfonyl or unsubstituted or substituted carbamoyl;

$R_{31}$ is hydrogen, lower alkyl or aryl;

$R_{32}$ and $R_{33}$ are independently selected from hydrogen, lower alkyl, lower alkoxy, halogen or —Z;

X is selected from a covalent bond, oxygen, or sulfur;

L is selected from X, —SO$_2$—, —SO$_2$N(R$_{21}$)—, —N(SO$_2$R$_{22}$)—, —N(R$_{21}$)—, —COO—, or —CON(R$_{21}$)—;

and with the proviso that the compound contain at least one —Z moiety.

Additional preferred intermediates of the invention are those compounds selected from the formulae:

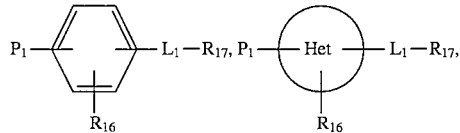

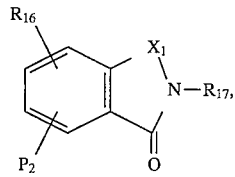

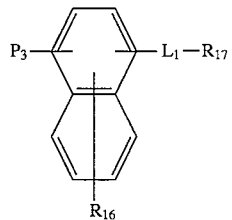

or

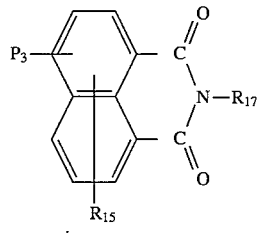

wherein $R_{16}$, and $R_{17}$ are as previously defined;

$P_1$, $P_2$, $P_3$ or $P_4$ are selected from hydrogen, nitro, amino, hydrazino, or a diazonium salt moiety;

HET is an aromatic heterocyclic radical derived from a benzothiazole; thiazole; 1,3,4-thiadiazole; 1,2,4-thiadiazole; pyridine; thiophene or 2,1-benzisothiazole compound;

$L_1$ is a linking moiety selected from —O—, —S—, —SO$_2$—, —N(R$_3$)—, —SO$_2$N(R$_3$)—, or —N(SO$_2$R$_4$)—, wherein $R_3$ is selected from hydrogen, —Z, or an unsubstituted or substituted group selected from alkyl, aryl, cycloalkyl, and $R_4$ is an unsubstituted or substituted group selected from alkyl, aryl or cycloalkyl; and $X_1$ is selected from —C(=O)—, —$SO_2$—, or —S—.

In all of the above alkyl, alkylene, alkoxy, and the like groups or moieties which are or which contain aliphatic hydrocarbon components, said groups or moieties contain 1 to 12 unsubstituted or substituted carbons unless otherwise specified. Also, the term cycloalkyl includes 5–7 membered cycloaliphatic groups and the term aryl includes unsubstituted or substituted carbocyclic and heterocyclic aromatic groups containing from 2–14 carbons.

It is particularly noted that the present coloring agents in one embodiment of the present invention are polymeric, liquid, reactive coloring materials. As such, they may be added to the reaction mixture or to one of the components thereof in solvent-free form rather than as a solution or dispersion in a solvent or dispersing medium. Obviously, such liquids have significant processing advantages over solids in solvent systems in eliminating the need for extraneous nonreactive or reactive solvents or dispersing agents and thus the need for removing such from product.

Thermoplastic resins which may be used according to the present invention include a wide range of resins and synthetic resin compositions which are known in the art as being essentially thermoplastic in nature. The term "thermoplastic" is used herein in its conventional sense to mean a resin having the property of softening or fusing when heated and of hardening again when cooled (see Webster's Seventh Collegiate Dictionary, G & C Merriam Co., 1965). Thermoplastic resins are to be clearly distinguished both in terms of their essential physical and chemical characteristics from the thermosetting resins. The term "thermosetting" used herein is also used in its conventional sense to means a resin having the property of becoming permanently rigid when heated or cured.

Examples of thermoplastic resin systems which may be employed include a wide range of polyolefin polymers, e.g., polyethylene, linear low density polyethylene, polypropylene, polybutylene and copolymers made from ethylene, propylene and/or butylene. Other thermoplastic polymers which may be employed according to the present invention include polyvinyl chloride, polyvinylidene chloride, cellulosic resins such as cellulose acetate, cellulose acetate butyrate and cellulose acetate propionate, acrylic resins such as poly(methyl methacrylate), styrene-acrylonitrile copolymer, polystyrene, polycarbonate and acrylonitrile-butadiene-styrene terpolymer (herein ABS), polyamides such as nylon 6 and nylon 66 and polyesters such as poly(ethylene terephthalate), especially glycol modified poly(ethylene terephthalate) and poly(butylene terephthalate).

As mentioned above, the colorants may be employed in the thermoplastic resins in a minor amount sufficient to provide the desired degree of coloration therein. The actual amount used will, in addition to the desired depth of shade, depend upon the tinctorial strength of the chromophore used and the overall molecular weight of the colorant, e.g., chromophore plus poly(oxyalkylene) chain length. Typically the amount of colorant employed may be from about 0.001 percent to about 10 percent, preferably from about 0.01 percent to about 3 percent, and most preferably from about 0.01 to about 1.0 percent by weight based upon the overall weight of the resin composition.

Other conventional additives may also be present in the resin compositions of the present invention. For instance, such additives may include plasticizers, antioxidants, stabilizers, lubricants, flame retardants, nucleating agents and other additives as will be readily recognized by those skilled in the art. In general, the present colorants have been observed to have little or no adverse interactions with these conventional additives.

The colorants if used properly ordinarily do not detract from the clarity of the resin, and it has been found that additives which improve the clarity may be used in combination with colorants as described herein to provide resin products that are both colored and which also have excellent clarity. One particular class of additives which have been found to be useful in this regard are the benzylidene sorbitols including substituted benzylidene sorbitols such as those described in: U.S. Pat. No. 4,016,118 to Hamada, et al. (E. C. Chemical); U.S. Pat. No. 4,371,645 to Mahaffey (Milliken Research Corporation); and Japanese Pat. No. SHO [1977] 53-117044 to Kobsyashi, et al. (New Japan Chemical); all of these patents being hereby incorporated herein by reference.

The particular shade of the colorant will depend primarily upon substituents present on the basic chromophore. A large variety of colors and shades may be obtained by blending two or more colorants. Blending the colorants of the present invention can be readily accomplished as the colorants are polymeric materials which may have substantially identical solubility characteristics dictated by the nature of the polymeric chain. Therefore, the colorants are in general soluble in one another, and are also, in general, completely compatible with each other.

According to the process of the invention, the colorant may be incorporated into the thermoplastic resin using conventional techniques such as those employed to incorporate other additives in such resins. For instance, the colorant may he incorporated into the resin by simply adding it to the resin while the resin is in a plasticized or molten state, typically prior to formation of the polymer into its final shape, e.g., by molding, extrusion, blow-molding and the like. For instance, when the thermoplastic resin to be colored is a polyolefin resin the process may be carried out by adding a colorant comprised of a poly(oxyalkylene) substituted chromophore group directly to the molten polymer, by tumbling it onto a pre-extruded pelletized resin, or by mixing it into the resin powder prior to extrusion. The polymer may then be molded or extruded in the usual manner, i.e., in the same way as for polyolefin resins which are not colored.

Alternatively, a concentrate of the colorant in an appropriate resin or vehicle may first be prepared. Such a concentrate may contain an appropriately high percentage of colorant. The concentrates may be in the form of liquids, solids, e.g., powders, pellets, or the like, as may be desired. These may then be incorporated into the thermoplastic resin. Obviously, liquids may have certain processing advantages over solids, and moreover liquids may, if desired, be added directly to the molten polymer and therefore contain no extraneous solvent or dispersing agents. This process may, therefore, provide unusual and advantageous properties in the final thermoplastic resin product. Alternatively, however, the colorants may be premixed with minor amounts of solvent or dispersing agent which is compatible with the resin, thus providing certain processing advantages.

Aromatic amine intermediates are one embodiment of the invention and are prepared in several steps. In the first step, the aromatic amine, is hydroxyalkylated by the reaction with glycidol at about 80°–150° C. to give an aromatic amine intermediate having both primary and secondary hydroxyls. The glycidol is added in the presence of an inert gas such as nitrogen until the desired amount of glycidol is reacted. This reaction is carried out with or without solvents. If solvents are desired, toluene, xylenes, nitrobenzene, dioxane are representative solvents that may be used. Exemplary of the useful basic catalysts are potassium hydroxide, lithium hydroxide, calcium hydroxide, and barium hydroxide. The amount of basic catalyst can vary but is usually in the range of from about 0.05 to about 2 percent by weight of the amine used. In addition, certain tertiary organic amines are useful catalysts, such as dimethylaminocyclohexane, triethylamine, and benzyldimethylamine.

In the next step, the aromatic amine intermediate from step one is converted into the final aromatic amine intermediate by hydroxyalkylation with ethylene oxide or propylene oxide at about 80°–150° C. The alkylene oxide is added in the presence of an inert gas such as nitrogen until the desired amount of alkylene oxide is absorbed. If propylene oxide is used first as the alkylene oxide, additional quantities of ethylene oxide must then be added afterwards to impart the desired washable properties to the polymeric compounds.

The colorants of the present invention can be prepared by many different methods depending, e.g., on the chromophoric group desired in the polymer. Some of these routes are illustrated in (I) through (VI) below. These routes are given as illustrations and are not intended to limit the scope of the present invention.

ROUTE I

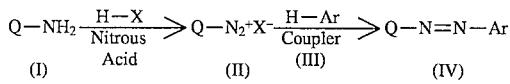

In Route I the azo colorants of the invention are prepared by diazotizing carbocylic or heterocyclic amines (I) to give diazonium salts (II) which are coupled with intermediate aromatic coupling components (III) to give the azo colorants (IV) wherein Q— and —Ar are as defined above, and wherein either one or both of Q— and —Ar contain at least one —Z moiety. Various methods for diazotizing aromatic amines are known in the chemistry of azo dyes. The couplings are usually carried out in dilute mineral acids or organic acids such as acetic or propionic acid, with coupling being facilitated by addition of some base to raise the pH to a least 3–4.

Additional polymeric amines (I) of the invention can be prepared as described in Routes IA, IB and IC.

ROUTE IA

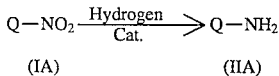

Route IA involves the conversion of nitro compounds (IA) to amine intermediates (IIA) by catalytic hydrogenation. Any suitable reduction catalyst may be used. For example, catalysts such as Raney nickel, nickel oxides, finely divided metals such as iron, cobalt, platinum, ruthenium, osmium, and rhodium may be used. Furthermore, metal catalysts supported on pumice, asbestos, Kieselguhr, alumina, silica gel or charcoal work equally as well. The amount of catalyst can vary from about 0.025 to 15 percent by weight based on the nitro intermediate used.

Reduction temperatures of about 20° C. to about 90° C., are suitable but temperatures of 40° C. to 90° C. are preferred since they may provide faster reaction times and higher yields. During the reduction of the nitro intermediates, pressures ranging from about 500 to about 1800 psi of hydrogen may be used.

The reduction reaction is usually carried out in the presence of a suitable solvent. Solvents include lower alcohols such as methyl alcohol, ethyl alcohol, and isopropyl alcohol; ethers such as dioxane; hydrocarbons such as benzene, toluene, xylenes, cyclohexanes, and petroleum ether; and mixtures of lower alcohols and water such as about equal parts by weight of ethyl alcohol and water. The amount of solvent present usually varies from about 30 to about 80 percent by weight of the total mixture as solvent plus nitro compound.

ROUTE IB

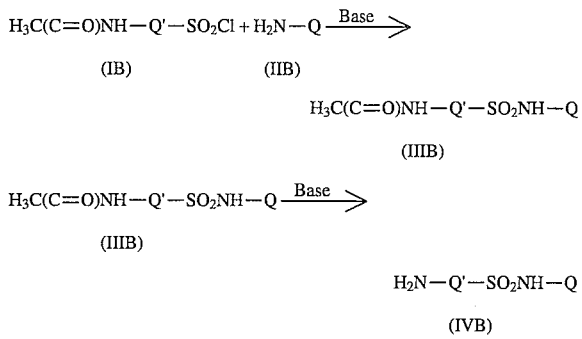

Route IB involves the condensation of an acetamidobenzenesulfonyl chloride intermediate (IB), wherein Q' is phenylene or substituted phenylene, with at least a stoichiometric quantity of an aromatic amine (IIB) wherein Q is defined above and contains at least one —Z moiety, in the presence of an inorganic base at a temperature of from about 0° C. to about 100° C. to form an acetamido intermediate (IIIB). Further heating at 80° C. to 100° C. under basic conditions hydrolyzes the corresponding acetamido intermediate (IIIB) into the polyaromatic amine intermediate (IVB).

ROUTE IC

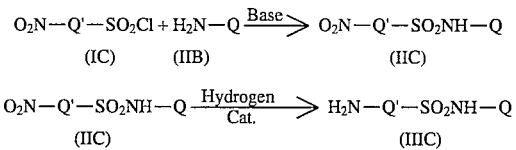

Route IC involves the condensation of a nitroarylenesulfonyl chloride intermediate (IC), wherein Q' is as defined above in Route IB, with at least a stoichiometric quantity of an aromatic amine (IIB) and an inorganic base at a temperature of from about 0° C. to about 100° C. to form a nitro polyaromatic intermediate (IIC).

The corresponding polyaromatic amine intermediate (IIIC) is then prepared by conversion of the polyaromatic nitro intermediate (IIC) by catalytic reduction as described in Route IA above.

The methine colorants of the invention are prepared in according to routes II–IV, wherein Route II comprises three steps.

In the first step, primary hydroxyl enriched aromatic amine intermediate, H—Ar, is reacted with an organic acid anhydride to form the ester intermediate. Most generally, the aromatic amine intermediate, H—Ar, is reacted with acetic anhydride at a temperature within the range of about 60°–130° C. Certain tertiary organic amines are useful catalysts, such as triethylamine, dimethylaminocyclohexane and benzyldimethylamine.

In the second step, the aromatic ester intermediate, from step one is reacted with the Vilsmeier reagent to obtain the corresponding aldehyde, [Bull. Societe Chim. de France, No. 10:1898–89 (October 1962); Angewandte Chemie 72, No. 22, 836–845, (Nov. 1960)] generally using N,N-dimethylformamide (DMF) and phosphorous oxychloride. After base hydrolysis, the corresponding aromatic aldehyde intermediate, Ar—COH is isolated.

ROUTE II-STEP-THREE

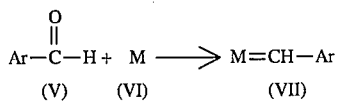

Finally, in the third step, the aromatic aldehyde intermediate Ar—COH (V) is reacted under Knoevenagel conditions with an active methylene compound (VI) to give the methine compound (VII).

The azamethine colorants of the invention are prepared in two steps according to Route III.

ROUTE III STEP-ONE

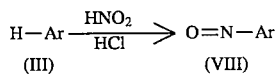

In step one, the aromatic amine intermediate (III) is nitrosated using nitrous acid to give nitroso aromatic amine intermediates (VIII).

ROUTE III STEP-TWO

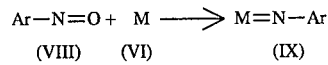

In the second step, the nitroso aromatic amine intermediate (VIII) is reacted with an active methylene compound (VI) to give the azamethine compound (IX).

The cationic azo or methine colorants of the invention can be prepared by many different methods. Some of these methods are illustrated in Routes (IV) through (VI) below. These routes are given as illustrations and are not intended to limit the scope of the present invention.

ROUTE IV

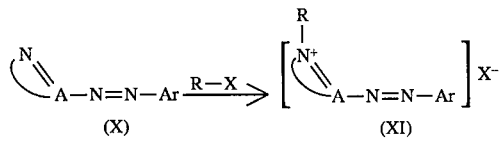

The azo colorants (X), where A is the remainder of a heterocyclic aromatic ring, are converted to the corresponding cationic colorants (XI), by reacting with an alkylating agent at elevated temperature with or without an inert solvent. Suitable alkylating agents are dialkyl sulfates, alkyl halides, aralkyl halides, alkyl esters of sulfonic acids, activated vinyl compounds, haloacetic acids, etc. Examples of such alkylating agents include dimethyl sulfate, diethyl sulfate, dipropyl sulfate, ethyl bromide, butyl bromide, methyl iodide, ethyl iodide, benzyl chloride, benzyl bromide, methyl-p-toluene sulfonate, butyl-p-toluene sulfonate, ethyl benzenesulfonate, acrylamide, and bromoacetic acid.

The cationic methine colorants of the invention are prepared as illustrated in Routes V and VI.

ROUTE V

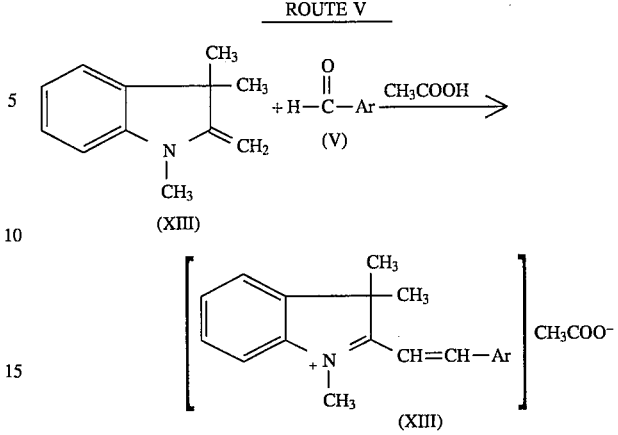

In Route V, methine cationic colorants (XIII) of the invention are prepared by condensing substituted 2-methylene-1,3,3-trimethylindoline (Fischer's Base) (XII) with the aromatic aldehyde (V) described above at elevated temperature in the presence of a catalyst with or without an inert solvent. The base (XII) and the condensation procedures are well known. These tribases are generally commercially available.

ROUTE VI

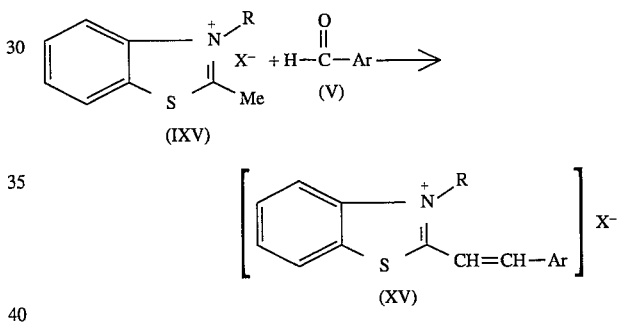

Alternatively, cationic methines (XV) are prepared by condensing substituted quaternary base salts (XIV) with the aromatic aldehyde (V) described above at elevated temperature in the presence of a catalyst with or without an inert solvent. The quaternary base salts of formula (XIV) and the condensation procedures are well known. Examples of useful quaternary bases include quaternized quinolines, benzothiazoles, benzoxazoles, indolenines, and benzimidazoles. Examples of the above anion $X^-$ include $Cl^-$, $Br^-$, $I^-$, $CH_3SO_4^-$, $C_2H_5SO_4^-$, or the like. The anion used depends upon the method of isolation utilized and the particular quaterizing agent employed.

The following examples and tables illustrate specific compounds of the present invention and their preparation. Various parts or percentages, unless otherwise stated, are by weight. The abbreviations EO, PO, and BO refer to $CH_2CH_2O$—, —$CH_2CH(CH_3)O$— and —$CH_2CH(C_2H_5)O$— respectively. In the following examples, $GL_1$ and GL signifies glycidol units. In the formulae, $GL_1$ signifies the reacted residue of an glycidol unit and GL signifies glycidol units that are terminated by other alkylene oxides such as those above. Further, the numerical designation preceding the $GL_1$ or GL units represent the average number of such units per reactive site of the nucleophile. For example, in Example 1 wherein the numerical designation is 2, in actuality one reactive site will have a single $GL_1$ unit and the other will have two such units. Also, referring to Example 1A, the terminology "2GL/100EO-H" means that each hydroxyl of the $GL_1$ unit has been reacted with at least one ethylene oxide moiety EO, the EO being in the reaction system in stoichiometric excess, and that each terminal $GL_1$ has been reacted with an ethylene oxide moiety EO also being in stoichiometric excess in the reaction system. It is noted that numerical valves assigned to the GL, PO, and EO units of Example 1A, represent the average of these units per reactive site of the nucleophile.

EXAMPLE 1

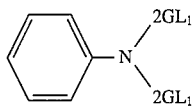

In a dry 1000 ml three-neck flask equipped with nitrogen purge, heating mantle, mechanical stirrer, temperature controller and addition funnel are charged 125 grams of aniline (1.34 moles) and 0.6 gram of potassium hydroxide. The mixture is heated to 110° C. with stirring by means of the heating mantle and temperature controller.

Three hundred ninety-seven grams (5.36 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is post-heated for one hour.

EXAMPLE 1A

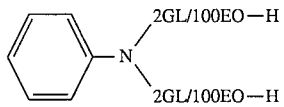

In a two gallon autoclave are charged 389 grams (1 mole) of aniline 4 glycidol intermediate of Example 1 and 2 grams of potassium hydroxide catalyst. The reactor is purged three times to 60 psi with nitrogen and is then heated to 250° F. under 5 psi nitrogen pressure. Next, 8000 grams (200 moles) of ethylene oxide are added at a rate to maintain a vapor pressure reading less than 80 psi.

After the EO addition, the reaction mixture, is post-heated at 120° C. for 2 hours. At this time the hydroxyl number is run for the reaction mixture and is found to be 38.2 (theory is 35.6).

After vacuum stripping at 200° F. for 15 minutes, the aniline 4GL/200EO-H intermediate has an average gram molecular weight of 8812 and is ready for use.

EXAMPLE 1B

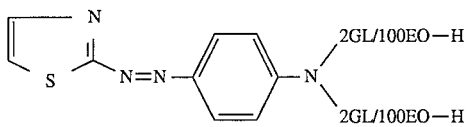

One hundred and forty-five grams of 85% phosphoric acid, 25 grams of 98% sulfuric acid, and 3 drops of 2-ethylhexanol defoamer are added to a 500 milliliter three necked flask equipped with a thermometer, cooling bath, and mechanical stirrer. The mixture is cooled and 10.3 grams (0.1 mole) of 2-aminothiazole are added to the flask. The mixture is further cooled to below 0° C. after which 35 grams of 40% nitrosyl sulfuric acid are added while maintaining the temperature below 5° C. After three hours the mixture gives a positive nitrite test and 1 gram of sulfamic acid is added slowly, keeping the temperature below 5° C. A negative nitrite test is evident after one further hour.

A 4000 milliliter beaker is charged with 969 grams of aniline 4GL/200EO-H intermediate (0.11 mole), 969 grams of water, 969 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. to give an orange oil with a maximum absorbance at 493 nm.

EXAMPLE 2

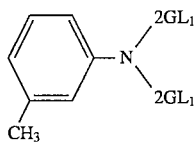

In a dry 1000 ml three-neck flask equipped with nitrogen purge, heating mantle, mechanical stirrer, temperature controller and addition funnel are charged 125 grams of aniline (1.34 moles) and 0.6 gram of potassium hydroxide. The mixture is heated to 110° C. with stirring by means of the heating mantle and temperature controller.

Three hundred ninety-seven grams (5.37 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is post-heated for one hour.

EXAMPLE 2A

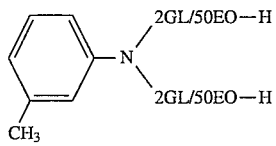

In a two gallon autoclave are charged 389 grams (1 mole) of aniline 4 glycidol intermediate of Example 2 and 4 grams of potassium hydroxide catalyst. The reactor is purged three times to 60 psi with nitrogen and is then heated to 250° F. under 5 psi nitrogen pressure. Next, 4400 grams (100 moles) of ethylene oxide are added at a rate to maintain a vapor pressure reading less than 80 psi.

After the EO addition, the reaction mixture is post-heated at 120° C. for 2 hours. At this time the hydroxyl number is run for the reaction mixture and is found to be 75.5 (theory is 70.2).

After vacuum stripping at 200° F. for 15 minutes, the aniline 4GL/100EO-H intermediate has an average gram molecular weight of 4458 and is ready for use.

EXAMPLE 2B

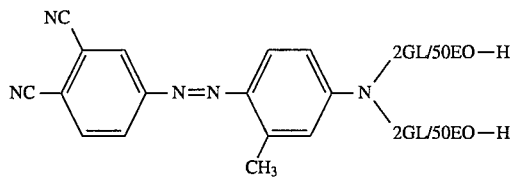

A 2000 milliliter beaker is charged with 490 grams of of the m-toluidine 4GL/100EO-H intermediate (0.11 mole), 490 grams of water, 490 grams of ice and 4 grams of urea. This mixture is cooled to below 0° C. The diazo solution (as prepared in Example 1B) from 14.3 grams (0.1 mole) of 3,4-dicyanoaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed to give a red liquid with a maximum absorbance at 500 nm.

EXAMPLE 3

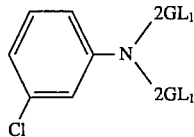

In a dry 1000 ml three-neck flask equipped with nitrogen purge, heating mantle, mechanical stirrer, temperature controller and addition funnel are charged 172 grams of m-chloroaniline (1.34 moles) and 0.6 gram of potassium hydroxide. The mixture is heated to 110° C. with stirring by means of the heating mantle and temperature controller.

Three hundred ninety-eight grams (5.37 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is post-heated for one hour. At this time the hydroxyl number is run for the m-chloroaniline 4 glycidol intermediate and is found to be 793 (theory is 799).

EXAMPLE 3A

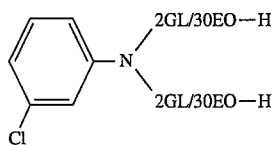

In a one gallon autoclave are charged 417 grams (1 mole) of m-chloroaniline 4 glycidol intermediate of Example 3 and 4 grams of potassium hydroxide catalyst. The reactor is purged three times to 60 psi with nitrogen and is then heated to 250° F. under 5 psi nitrogen pressure. Next, 2640 grams (60 moles) of ethylene oxide are added at a rate to maintain a vapor pressure reading less than 80 psi.

After the EO addition, the reaction mixture is post-heated at 120° C. for 2 hours.

After vacuum stripping at 200° F. for 15 minutes, the m-chloroaniline 4GL/60EO-H intermediate has an average gram molecular weight of 3057 and is ready for use.

EXAMPLE 3B

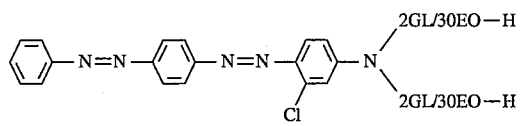

A 4000 milliliter beaker is charged with 336 grams of m-chloroaniline 4GL/60EO-H intermediate (0.11 mole) from Example 3A, 400 grams of water, 400 grams of ice and 4 grams of urea. This mixture is cooled to below 0° C. The diazo solution (as prepared in Example 1B) from 19.7 grams (0.1 mole) of 4-phenylazoaniline is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid.

EXAMPLE 4

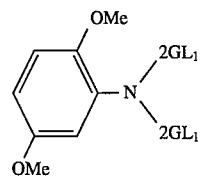

In a dry 1000 ml three-neck flask equipped with nitrogen purge, heating mantle, mechanical stirrer, temperature controller and addition funnel are charged 153 grams of 2,5-dimethoxyaniline (1.0 moles) and 0.8 gram of potassium hydroxide. The mixture is heated to 110° C. with stirring by means of the heating mantle and temperature controller.

Two hundred ninety-six grams (4.0 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is post-heated for one hour.

EXAMPLE 4A

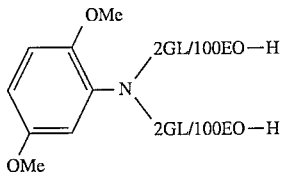

In a two gallon autoclave are charged 449 grams (1.0 mole) of 2,5-dimethoxyaniline 4 glycidol intermediate of Example 4 and 4 grams of potassium hydroxide catalyst. The reactor is purged three times to 60 psi with nitrogen and is then heated to 250° F. under 5 psi nitrogen pressure. Next, 8800 grams (3200 moles) ethylene oxide are added at a rate to maintain a vapor pressure reading less than 80 psi.

After the EO addition, the reaction mixture is post-heated at 120° C. for 2 hours.

After vacuum stripping at 200° F. for 15 minutes, the hydroxyl number is run for the 2,5-dimethoxyaniline 4GL/200EO-H intermediate and is found to be 39.6 (theory is 36.4) and has an average gram molecular weight of 8500 and is ready for use.

EXAMPLE 4B

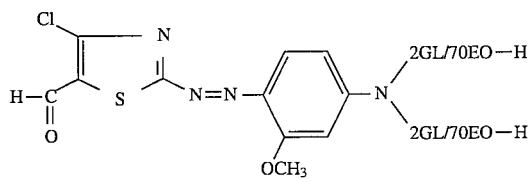

A 4000 milliliter beaker is charged with 723 grams of 4GL/140EO-H m-anisidine intermediate (0.11 mole) from Example 4A, 730 grams of water, 730 grams of ice and 4 grams of urea. This mixture is cooled to below 0° C. The diazo solution (as prepared in Example 1B) from 16.2 grams (0.1 mole) of 2-amino-4-chloro-5-formylthiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed to give an bluish-violet liquid.

EXAMPLE 5

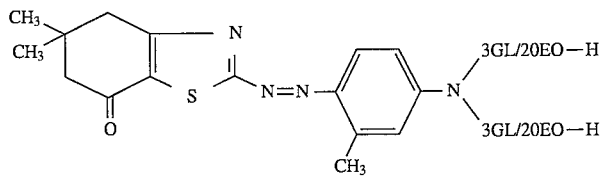

A 2000 milliliter beaker is charged with 254 grams (0.11 mole) of 6GL/40EO-H m-toluidine intermediate, 300 grams of water, 300 grams of ice and 4 grams of urea. This mixture is cooled to below 0° C. The diazo solution (as prepared in Example 1B) from 19.6 grams 0.1 mole) of 4,5-(3,3-dimethyloxytetramethylene)-2-aminothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 6

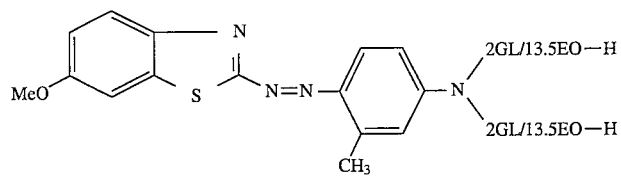

Five hundred and forty-nine grams of 85% phosphoric acid, 150 grams of 98% sulfuric acid, and 9 drops of 2-ethylhexanol defoamer are added to a 1000 milliliter three necked flask equipped with a thermometer, cooling bath, and mechanical stirrer. The mixture is cooled and 54 grams (0.3 mole) of 2-amino-6-methoxybenzothiazole are added to the flask. The mixture is further cooled to below 0° C. after which 105 grams of 40% nitrosyl sulfuric acid are added while maintaining the temperature below 5° C. After three hours the mixture gives a positive nitrite test and 2 grams of sulfamic acid are added slowly keeping the temperature below 5° C. A negative nitrite test is evident after one further hour.

A 4000 milliliter beaker is charged with 525 grams of m-toluidine 4GL/27EO-H intermediate (0.33 mole), 600 grams of water, 600 grams of ice and 12 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 780 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid with a maximum absorbance of 526 nm.

COMPARATIVE EXAMPLE 6A

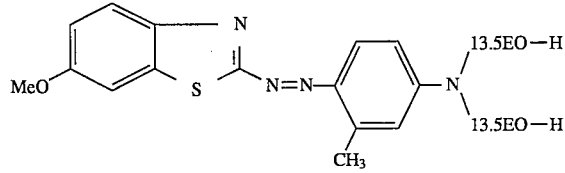

Five hundred and forty-nine grams of 85% phosphoric acid, 150 grams of 98% sulfuric acid, and 9 drops of 2-ethylhexanol defoamer are added to a 1000 milliliter three necked flask equipped with a thermometer, cooling bath, and mechanical stirrer. The mixture is cooled and 54 grams (0.3 mole) of 2-amino-6-methoxybenzothiazole are added to the flask. The mixture are further cooled to below 0° C. after which 105 grams of 40% nitrosyl sulfuric acid are added while maintaining the temperature below 5° C. After three hours the mixture gives a positive nitrite test and 2 grams of sulfamic acid are added slowly keeping the temperature below 5° C. A negative nitrite test is evident after one further hour.

A 4000 milliliter beaker is charged with 427 grams of m-toluidine 27EO-H intermediate (0.33 mole), 500 grams of water, 500 grams of ice and 12 grams of urea. This mixture is cooled to below 0° C. The diazo solution is added dropwise to the beaker over about 30 minutes, maintaining the temperature below 10° C. The resulting mixture is stirred for several hours an allowed to stand overnight, after which 780 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid with a maximum absorbance of 526 nm.

EXAMPLE 7

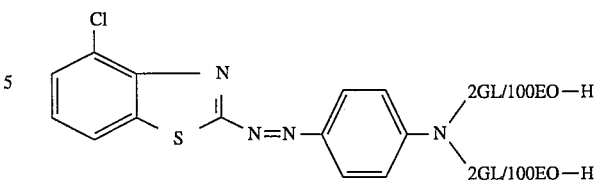

A 4000 milliliter beaker is charged with 969 grams of aniline 4GL/200EO-H intermediate (0.11 mole), 1000 grams of water, 1000 grams of ice and 4 grams of urea. This mixture is cooled to below 0° C. The diazo solution (as prepared in Example 6) from 18.4 grams (0.1 mole) 2-amino-4-chlorobenzothiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed to give a red liquid with a maximum absorbance at 524 nm.

EXAMPLE 8

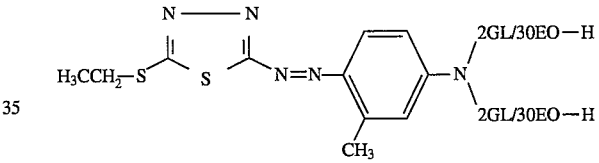

Three hundred twenty grams acetic acid, 80 grams propionic acid, and 9 drops of 2-ethylhexanol defoamer are added to a 1000 milliliter three necked flask equipped with a thermometer, cooling bath, and mechanical stirrer. The mixture is cooled and 32.2 grams (0.2 mole) of 2-amino-5-ethylthio-1,3,4-thiadiazole are added to the flask. The mixture is further cooled to below 5° C. after which 70 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 669 grams (0.22 mole) of m-toluidine 4GL/60EO-H intermediate, 700 grams of water, 700 grams of ice and 8 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 503 grams of 50% sodium hydroxide are added to neutralize excess acid to a pH of about 7 keeping the temperature below 20° C. The bottom salt layer is removed to give a red liquid.

EXAMPLE 9

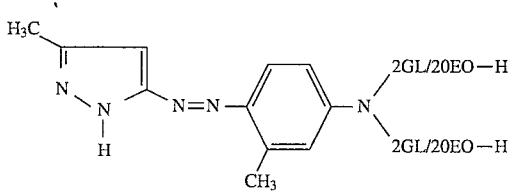

One hundred eighty grams acetic acid, 41 grams propionic acid, and 4 drops of 2-ethylhexanol defoamer are added to a 500 milliliter three necked flask equipped with a thermometer, cooling bath, and mechanical stirrer. The mixture is cooled and 9.7 grams (0.1 mole) of 5-amino-3-methylpyrazole are added to the flask. The mixture is further cooled to below 5° C. after which 35 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 238 grams (0.11 mole) of m-toluidine 4GL/40EO-H intermediate, 250 grams of water, 250 grams of ice and 8 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 268 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellow liquid with a maximum absorbance at 418 nm.

EXAMPLE 10

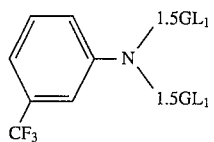

In a dry 1000 ml three-neck flask equipped with nitrogen purge, heating mantle, mechanical stirrer, temperature controller and addition funnel are charged 215.5 grams of m-trifluoroaniline (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged the reaction mixture is post-heated for one hour. At this time the hydroxyl number is run for the m-trifluoroaniline 3 glycidol intermediate and is found to be 730 (theory is 713).

EXAMPLE 10A

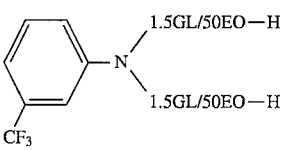

In a one gallon autoclave are charged 383 grams (1.0 mole) of m-trifluoroaniline 3 glycidol intermediate of Example 10 and 4 grams of potassium hydroxide catalyst. The reactor is purged three times to 60 psi with nitrogen and is then heated to 250° F. under 5 psi nitrogen pressure. Next, 4400 grams (100 moles) of ethylene oxide are added at a rate to maintain a vapor pressure reading less than 80 psi.

After the EO addition, the reaction mixture is post-heated at 120° C. for 2 hours.

After vacuum stripping at 200° F. for 15 minutes the m-trifluoroaniline 3GL/100EO-H intermediate has an average gram molecular weight of 4783 and is ready for use.

EXAMPLE 10B

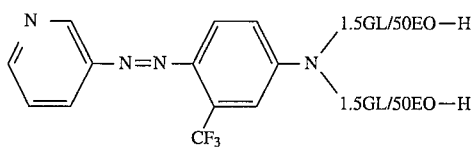

A 2000 milliliter beaker is charged with 526 grams of m-trifluoromethylaniline 3GL/50EO-H intermediate (0.11 mole), 550 grams of water, 550 grams of ice and 4 grams of urea. This mixture is cooled to below 0° C. The diazo solution (as prepared in Example 9) from 9.5 grams (0.1 mole) of 3-aminopyridine is added dropwise to the beaker over about 30 minutes, maintaining the temperature below 10° C. The resulting mixture is stirred for several hours and allowed to stand overnight, after which 268 grams of 50% sodium hydroxide are added to neutralize excess acid to a pH of about 7 keeping the temperature below 20° C. The bottom salt layer is removed to give a yellowish-orange liquid.

EXAMPLE 11

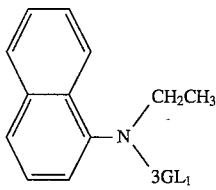

In a dry 1000 ml three-neck flask equipped with nitrogen purge, heating mantle, mechanical stirrer, temperature controller and addition funnel are charged 171 grams of N-ethyl-1-naphthylamine (1 mole) and 0.6 gram of potassium hydroxide. The mixture is heated to 110° C. with stirring by means of the heating mantle and temperature controller.

Two hundred twenty-two grams (3 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged the reaction mixture is post-heated for one hour.

EXAMPLE 11A

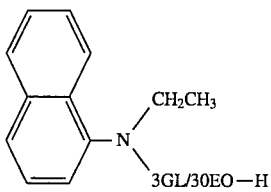

In a two liter autoclave are charged 393 grams (1 mole) of N-ethyl-1-naphthylamine 3 glycidol intermediate of Example 11 and 4 grams of potassium hydroxide catalyst. The reactor is purged three times to 60 psi with nitrogen and is then heated to 250° F. under 5 psi nitrogen pressure. Next, 1430 grams (30 moles) of ethylene oxide are added at a rate to maintain a vapor pressure reading less than 80 psi.

After the EO addition, the reaction mixture is post-heated at 120° C. for 2 hours.

After vacuum stripping at 200° F. for 15 minutes, the N-ethyl-1-naphthylamine 3GL/30EO-H intermediate has an average gram molecular weight of 1713 and is ready for use.

EXAMPLE 11B

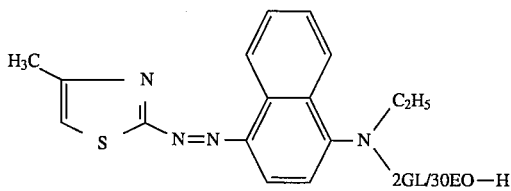

A 2000 milliliter beaker is charged with 188 grams of N-ethyl-1-naphthylamine 3GL/30EO-H intermediate (0.11 mole), 200 grams of water, 200 grams of ice and 4 grams of urea. This mixture is cooled to below 0° C. The diazo solution (as prepared in Example 1B) from 11.3 grams (0.1 mole) 2-amino-4-methylthiazole is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 12

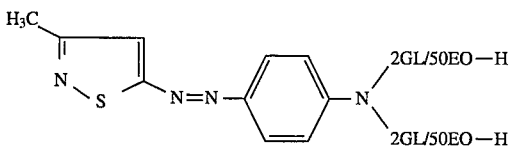

One hundred eighty grams acetic acid, 41 grams propionic acid, and 4 drops of 2-ethylhexanol defoamer are added to a 500 milliliter three necked flask equipped with a thermometer, cooling bath, and mechanical stirrer. The mixture is cooled and 15 grams (0.1 mole) of 5-amino-3-methylisothiazole hydrochloride are added to the flask. The mixture is further cooled to below 5° C. after which 35 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 4000 milliliter beaker is charged with 529 grams (0.11 mole) of aniline 4GL/100EO-H intermediate, 550 grams of water, 550 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed to give an orange liquid with a maximum absorbance at 493 nm.

EXAMPLE 13

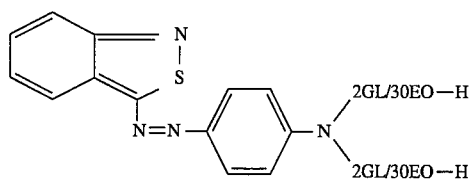

One hundred eighty grams acetic acid, 40 grams propionic acid, and 6 drops of 2-ethylhexanol defoamer are added to a 500 milliliter three necked flask equipped with a thermometer, cooling bath, and mechanical stirrer. The mixture is cooled and 15 grams (0.1 mole) of 3-amino-1,2-benzisothiazole are added to the flask. The mixture is further cooled to below 5° C. after which 37.5 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 2000 milliliter beaker is charged with 333 grams (0.11 mole) of aniline 4GL/60EO-H intermediate, 350 grams of water, 350 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed to give a red-violet liquid.

EXAMPLE 14

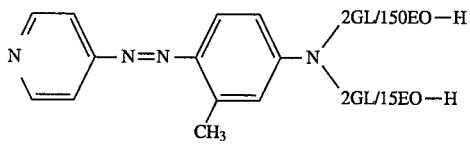

Three hundred grams acetic acid, 60 grams propionic acid, and 4 drops of 2-ethylhexanol defoamer are added to a 1000 milliliter three necked flask equipped with a thermometer, cooling bath, and mechanical stirrer. The mixture is cooled and 28.2 grams (0.3 mole) of 4-aminopyridine are added to the flask. The mixture is further cooled to below 5° C. after which 135 grams of 40% nitrosyl sulfuric acid are added while maintaining the temperature below 10° C. After three hours the mixture gives a positive nitrite test and 2 grams of sulfamic acid are added slowly keeping the temperature below 5° C. A negative nitrite test is evident after one further hour.

A 4000 milliliter beaker is charged with 569 grams (0.33 mole) of m-toluidine 4GL/30EO-H intermediate, 600 grams of water, 600 grams of ice and 12 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 804 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a yellowish-orange liquid.

EXAMPLE 15

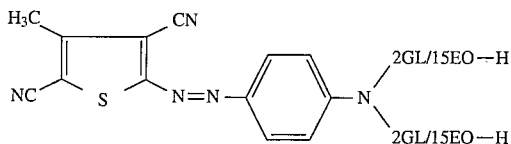

One hundred eighty-three grams of 85% phosphoric acid, 25 grams of 98% sulfuric acid, and 3 drops of 2-ethylhexanol defoamer are added to a 1000 milliliter three necked flask equipped with a thermometer, cooling bath, and mechanical stirrer. The mixture is cooled and 16.3 grams (0.1 mole) of 2-amino-3,5-dicyano-4-methylthiophene are added to the flask. The mixture is further cooled to below 0° C. after which 35 grams of 40% nitrosyl sulfuric acid are added while maintaining the temperature below 5° C. After three hours the mixture gives a positive nitrite test and 2.5 grams of sulfamic acid are added slowly keeping the temperature below 5° C. A negative nitrite test is evident after one further hour.

A 2000 milliliter beaker is charged with 188 grams of aniline 4GL/30EO-H intermediate (0.11 mole), 200 grams of water, 200 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a violet liquid with a maximum absorbance at 556 nm.

EXAMPLE 16

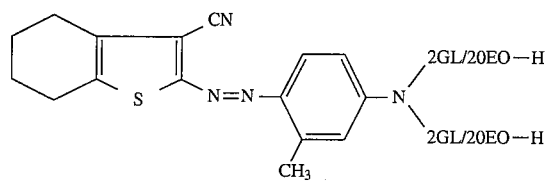

A 2000 milliliter beaker is charged with 238 grams (0.11 mole) of m-toluidine 4GL/40EO-H intermediate, 250 grams of water, 250 grams of ice and 4 grams of urea. This mixture is cooled to below 0° C. The diazo solution (as prepared in Example 13) from 17.8 grams (0.1 mole) 2-amino-3-cyano-4,5-tetramethylene- thiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a red liquid.

EXAMPLE 17

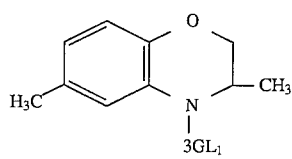

In a dry 1000 ml three-neck flask equipped with nitrogen purge, heating mantle, mechanical stirrer, temperature controller and addition funnel are charged 217 grams of 3,6-dimethylbenzomorpholine (1.34 moles) and 0.6 gram of potassium hydroxide. The mixture is heated to 110° C. with stirring with by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is post-heated for one hour. At this time the hydroxyl number is run for the benzomorpholine 3 glycidol intermediate and is found to be 536 (theory is 584).

EXAMPLE 17A

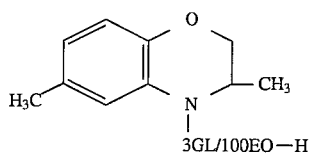

In a two gallon autoclave are charged 379 grams (1 mole) of the benzomorpholine 3 glycidol intermediate of Example 17 and 4 grams of potassium hydroxide catalyst. The reactor is purged three times to 60 psi with nitrogen and is then heated to 250° F. under 5 psi nitrogen pressure. Next, 4400 grams (100 moles) of ethylene oxide are added at a rate to maintain a vapor pressure reading less than 80 psi.

After the EO addition, the reaction mixture is post-heated at 120° C. for 2 hours.

After vacuum stripping at 200° F. for 15 minutes, the benzomorpholine 3GL/100EO-H intermediate has an average gram molecular weight of 4775 and is ready for use.

EXAMPLE 17B

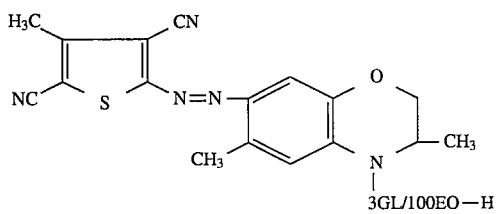

A 2000 milliliter beaker is charged with 525 grams of 3,6-dimethylbenzomorphorine 3GL/100EO-H intermediate (0.11 mole), 600 grams of water, 600 grams of ice and 4 grams of urea. This mixture is cooled to below 0° C. The diazo solution (as prepared in Example 15) from 16.3 grams (0.1 mole) 2-amino-3,5-dicyano-4-methylthiophene is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed to give a blue-violet liquid with a maximum absorbance at 578 nm.

EXAMPLE 18

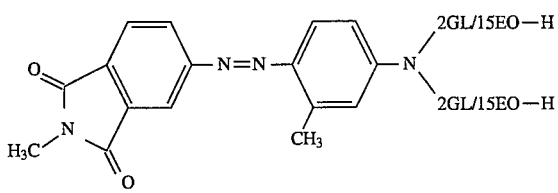

One hundred and eighty-three grams of 85% phosphoric acid, 25 grams of 98% sulfuric acid, and 3 drops of 2-ethylhexanol defoamer are added to a 500 milliliter three necked flask equipped with a thermometer, cooling bath, and mechanical stirrer. The mixture is cooled and 17.6 grams (0.1 mole) of 4-amino-N-methylphthalimide is added to the flask. The mixture is further cooled to below 0° C. after which 35 grams of 40% nitrosyl sulfuric acid are added while maintaining the temperature below 5° C. After three hours the mixture gives a positive nitrite test and 1 gram of sulfamic acid is added slowly keeping the temperature below 5° C. A negative nitrite test is evident after one further hour.

A 2000 milliliter beaker is charged with 190 grams (0.11 mole) of the m-toluidine 4GL/30EO-H intermediate, 200 grams of water, 200 grams of ice and 4 grams of urea. This mixture is cooled to below 0° C. The diazo solution is added dropwise to the beaker over about 30 minutes, maintaining the temperature below 10° C. The resulting mixture is stirred for several hours and allowed to stand overnight, after which 260 grams of 50% sodium hydroxide are added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give an orange liquid.

EXAMPLE 19

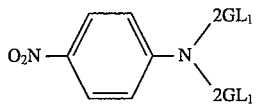

In a dry 1000 ml three-neck flask equipped with nitrogen purge, heating mantle, mechanical stirrer, temperature controller and addition funnel are charged 138 grams of p-nitroaniline (1 mole), 400 grams of xylenes and 0.6 gram of potassium hydroxide. The mixture is heated to 110° C. with stirring with by means of the heating mantle and temperature controller.

Two hundred ninety-six grams (4 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged the reaction mixture is post-heated for one hour. At this time the hydroxyl number is run for the p-nitroaniline 4 glycidol intermediate and is found to be 777 (theory is 776).

EXAMPLE 19A

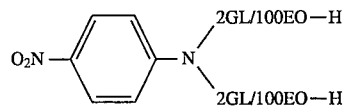

In a two liter autoclave are charged 217 grams (0.5 mole) of p-nitroaniline 4 glycidol intermediate of Example 19 and 4 grams of potassium hydroxide catalyst. The reactor is purged three times to 60 psi with nitrogen and is then heated to 250° F. under 5 psi nitrogen pressure.

Next, 4400 grams (100 moles) of ethylene oxide are added at a rate to maintain a vapor pressure reading less than 80 psi. After the EO addition, the reaction mixture is post-heated at 120° C. for 2 hours.

After vacuum stripping at 200° F. for 15 minutes the p-nitroaniline 4GL/200-H intermediate has an average gram molecular weight of 9056 and is ready for use.

EXAMPLE 19B

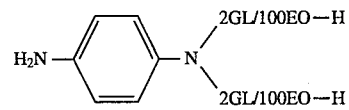

In a 2000 milliliter autoclave are charged 1326 grams (0.15 mole) of nitroaniline 4GL/200EO-H intermediate of Example 19A, 600 milliliters of ethyl alcohol and 90 grams of wet Raney nickel catalyst. The autoclave is then purged three times with hydrogen gas and heated to 85°–90° C. at a pressure of about 1300 psi. After about two hours the hydrogen uptake ceases. A sample is removed and vacuum stripped of solvent. The IR spectrum of this sample shows no nitro bands and the presence of an amine band indicating that the reaction is complete. The autoclave is cooled and vented. The product is isolated by filtering the reaction mixture and stripping away the solvent under reduced pressure.

EXAMPLE 19C

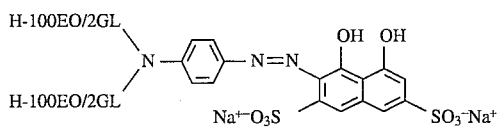

A solution of 1128 grams (0.125 mole) of p-aminoaniline 4GL/200EO-H intermediate of Example 19B, 45 milliliters of concentrated hydrochloric acid, and 500 milliliters of water is added to a 5000 milliliter flask and cooled to 0°–5° C. Ten grams of sodium nitrite are added maintaining the temperature of the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 500 grams of water, and 42 grams (0.13 mole) of chromotropic acid. The mixture is adjusted to a pH of 12 with 50 percent sodium hydroxide and is cooled to below 5° C. The diazo solution is added slowly dropwise to the beaker, maintaining the temperature below 5° C. and the pH is kept above 7 with Versene (sodium salt of EDTA). When the addition is complete, the resulting mixture is stirred for three hours for post coupling. At the end of this period, the pH is adjusted to 8.5 with dilute acetic acid where the blue colored product has a maximum absorbance at 623 nm.

COMPARATIVE EXAMPLE 19D

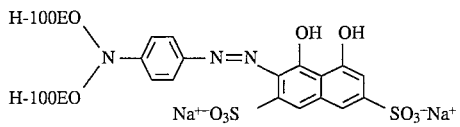

A solution of 1113 grams (0.125 mole) of p-aminoaniline 200EO-H intermediate, 45 milliliters of concentrated hydrochloric acid, and 500 milliliters of water is added to a 5000 milliliter flask and cooled to 0°–5° C. Ten grams of sodium nitrite are added maintaining the temperature of the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 500 grams of water, and 42 grams (0.13 mole) of chromotropic acid. The mixture is adjusted to a pH of 12 with 50 percent sodium hydroxide and is cooled to below 5° C. The diazo solution is added slowly dropwise to the beaker, maintaining the temperature below 5° C. and the pH is kept above 7 with Versene. When the addition is complete, the resulting mixture is stirred for three hours for post coupling. At the end of this period, the pH is adjusted to 8.5 with dilute acetic acid where the blue colored product has a maximum absorbance of 623 nm.

EXAMPLE 20

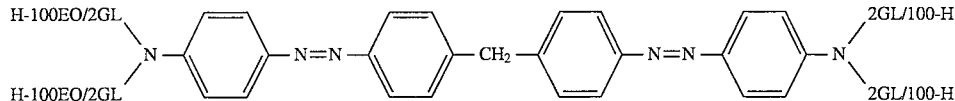

A solution of 24.8 grams (0.125 mole) of 4.4'-methylene dianiline, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minutes, maintaining the temperature below 5° C. The resulting mixture is stirred for several hours and allowed to stand overnight, after which 50% sodium hydroxide is added to neutralize excess acid to a pH of about 7 keeping the temperature below 20° C. to give a yellow-orange colored product with a maximum absorbance at 453 nm.

EXAMPLE 21

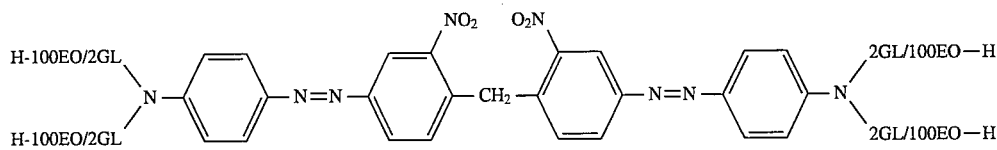

A solution of 36 grams (0.125 mole) of 4,4'-methylenebis-(3-nitroaniline), 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minutes, maintaining the temperature below 5° C. The resulting mixture is stirred for several hours and allowed to stand overnight, after which 50% sodium hydroxide is added to neutralize excess acid to a pH of about 7 keeping the temperature below 20° C. to give an orange colored product with a maximum absorbance at 480 nm.

EXAMPLE 22

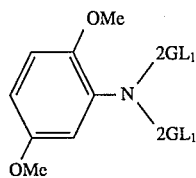

In a dry 1000 ml three-neck flask equipped with nitrogen purge, heating mantle, mechanical stirrer, temperature controller and addition funnel are charged 153 grams of 2,5-dimethoxyaniline (1.0 moles) and 0.8 gram of potassium hydroxide. The mixture is heated to 110° C. with stirring with by means of the heating mantle and temperature controller.

Two hundred ninety-six grams (4.0 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is post-heated for one hour.

EXAMPLE 22A

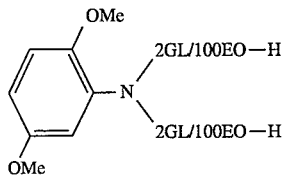

In a two gallon autoclave are charged 449 grams (1.0 mole) of 2,5-dimethoxyaniline 4 glycidol intermediate of Example 22 and 4 grams of potassium hydroxide catalyst. The reactor is purged three times to 60 psi with nitrogen and is then heated to 250° F. under 5 psi nitrogen pressure. Next, 8800 grams (200 moles) of ethylene oxide are added at a rate to maintain a vapor pressure reading less than 80 psi.

After the EO addition, the reaction mixture is post-heated at 120° C. for 2 hours.

After vacuum stripping at 200° F. for 15 minutes, the hydroxyl number is run for the 2,5-dimethoxyaniline 4GL/200EO-H intermediate and is found to be 39.6 (theory is 36.4) and has an average gram molecular weight of 8500 and is ready for use.

EXAMPLE 22B

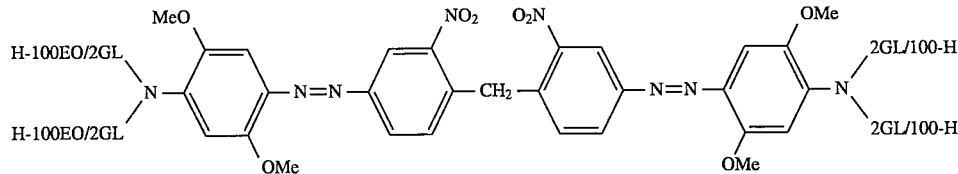

A solution of 36 grams (0.125 mole) of 4,4'-methylenebis-(3-nitroaniline), 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2210 grams (0.26 mole) of 2,5-dimethoxyaniline 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give a red colored product with a maximum absorbance at 512 nm.

EXAMPLE 23

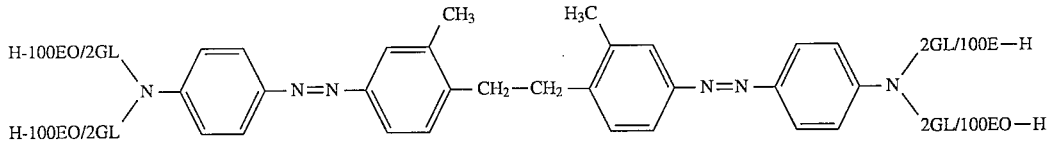

A solution of 30 grams (0.126 mole) of 4,4'-ethylene-di-m-toluidine, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 5000 milliliter beaker equipped with a thermometer, cooling bath, and mechanical stirrer is charged with 3446 grams (0.375 mole) of aniline 4GL/100EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give a yellowish-orange colored product with a maximum absorbance at 451 nm.

EXAMPLE 24

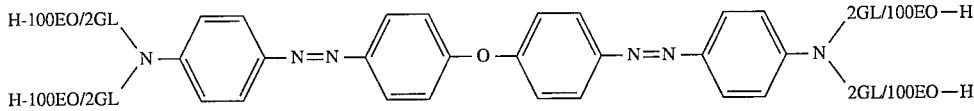

A solution of 25 grams (0.126 mole) of 4,4'-diaminodiphenyl ether, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give a yellowish-orange colored product with a maximum absorbance at 453 nm.

EXAMPLE 25

A solution of 25 grams (0.126 mole) of 4,4'-diaminodiphenyl ether, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after

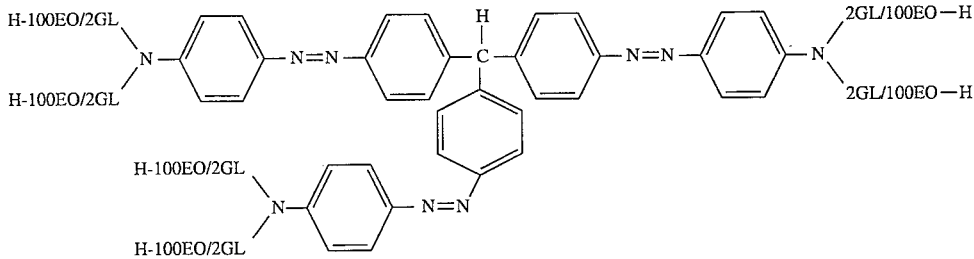

A solution of 36 grams (0.125 mole) of pararosaniline base, 120 milliliters of concentrated hydrochloric acid, and 270 milliliters of water is added to a 500 milliliter flask and cooled to 0°–5° C. Thirty grams of sodium nitrite are added maintaining the mixture below 10° C. After three hours, the which 50% sodium hydroxide is added to neutralize excess acid to a pH of about 7 keeping the temperature below 20° C. to give an orange colored product with a maximum absorbance at 490 nm.

EXAMPLE 26

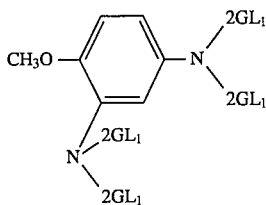

In a dry 1000 ml three-neck flask equipped with nitrogen purge, heating mantle, mechanical stirrer, temperature controller and addition funnel are charged 138 grams of 4-methoxy-1,3-phenylene diamine (1.0 moles) and 0.8 gram of potassium hydroxide. The mixture is heated to 110° C. with stirring by means of the heating mantle and temperature controller.

Five hundred ninety-two grams (8.0 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is post-heated for one hour.

EXAMPLE 26A

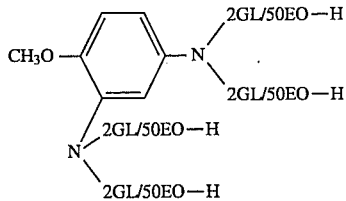

In a two gallon autoclave are charged 434 grams (1.0 mole) of 4-methoxy-1.3-phenylene diamine 4 glycidol intermediate of Example 26 and 4 grams of potassium hydroxide catalyst. The reactor is purged three times to 60 psi with nitrogen and is then heated to 250° F. under 5 psi nitrogen pressure. Next, 8800 grams (200 moles) of ethylene oxide are added at a rate to maintain a vapor pressure reading less than 80 psi.

After the EO addition, the reaction mixture is post-heated at 120° C. for 2 hours.

After vacuum stripping at 200° F. for 15 minutes, the hydroxyl number is run for the 4-methoxy-1,3-phenylene diamine 4GL/200EO-H intermediate and is found to be 70.9 (theory is 72.9) and has an average gram molecular weight of 9495 and is ready for use.

EXAMPLE 26B

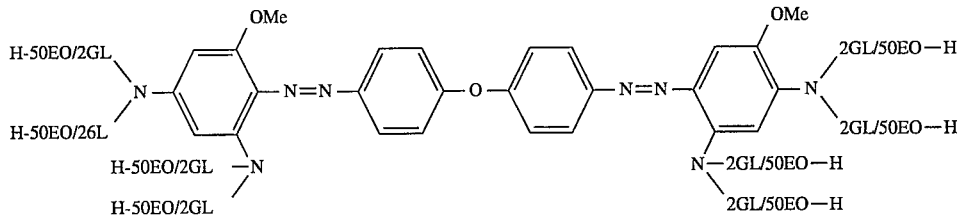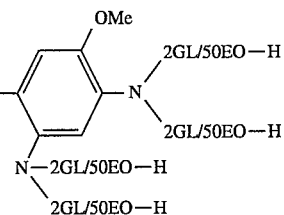

A solution of 25 grams (0.125 mole) of 4,4'-diaminodiphenyl ether, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2469 grams (0.26 mole) of 4-methoxy-1,3-phenylenediamine 4GL/200EO-H intermediate of Example 26A, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give a red colored product with maximum absorbance at 508 nm.

EXAMPLE 27

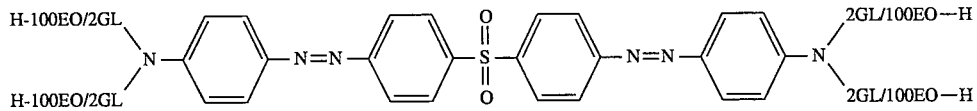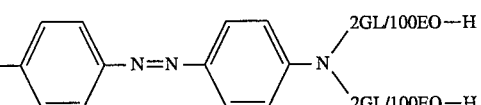

A solution of 31 grams (0.126 mole) of 4,4'-diaminodiphenylsulfone, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give an orange colored product with a maximum absorbance at 485 nm.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give an orange colored product with a maximum absorbance at 464 nm.

EXAMPLE 29

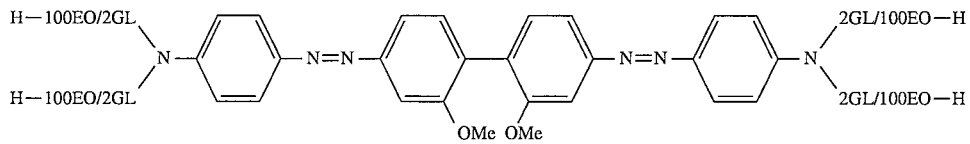

EXAMPLE 28

A solution of 31 grams (0.126 mole) of 3,3'-dimethoxybenzidine, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three

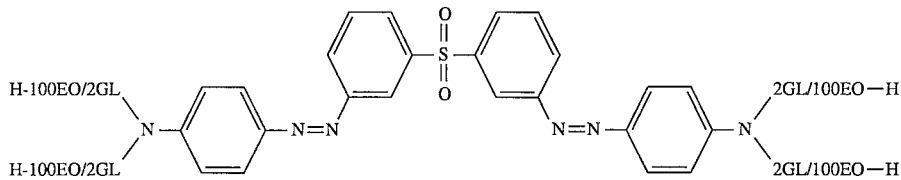

A solution of 31 grams (0.126 mole) of 3,3'-diaminodiphenylsulfone, 90 milliliters of concentrated hydrochloric acid, and 180 milliliters of water is added to a 2389 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give a red colored product with a maximum absorbance at 530 nm.

EXAMPLE 30

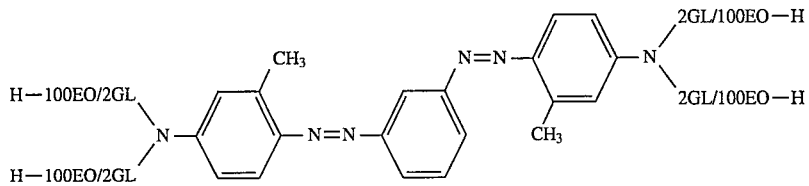

A solution of 13.6 grams (0.126 mole) of m-phenylenediamine, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2392 grams (0.26 mole) of m-toludine 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give an orange colored product.

EXAMPLE 31

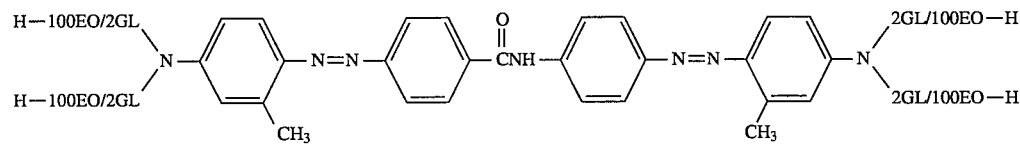

A solution of 28.6 grams (0.126 mole) of 4-amino-(4'-aminophenyl)benzamide, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2392 grams (0.26 mole) of m-toluidine 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give an orange colored product.

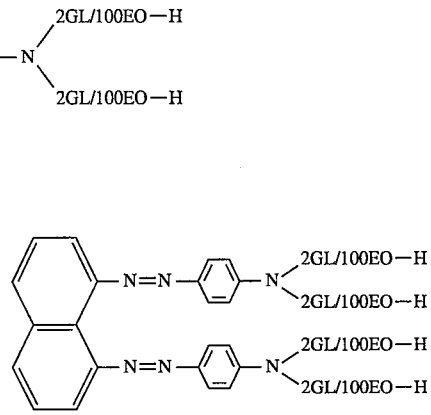

A solution of 20 grams (0.126 mole) of 1,8-diaminonaphthalene, 90 milliliters of concentrated hydrochloric acid, and 180 milliliters of water is added to a 500 milliliter flask and cooled to 0°–5° C. Twenty grams of sodium nitrite are added maintaining the mixture below 10° C. After three hours, the mixture gives a positive nitrite test and 2 grams of sulfamic acid are added slowly keeping the temperature below 5° C. A negative nitrite test is evident after one further hour.

A 4000 milliliter beaker equipped with a thermometer, cooling bath, and mechanical stirrer is charged with 2389 grams (0.26 mole) of aniline 4GL/200EO-H intermediate, 500 grams of water, 500 grams of ice and 4 grams of urea. The mixture is cooled to below 0° C. The diazo solution is added dropwise to the beaker over about 30 minute, maintaining the temperature below 5° C. The resulting mixture is stirred for several hours and allowed to stand overnight, after which 50% sodium hydroxide is added to neutralize excess acid to a pH of about 7 keeping the temperature below 20° C. to give a yellow colored product with a maximum absorbance at 443 nm.

EXAMPLE 33

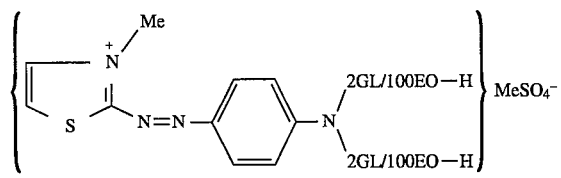

Seventy-five grams (0.047 mole) of thiazole azo aniline intermediate (prepared in Example 1B) are added to a flask fitted with a heating mantle, stirrer, and nitrogen inlet/outlet. After heating the flask to 40° C. and purging with nitrogen, 15.1 grams (0.12 mole) dimethyl sulfate are introduced into the flask. The temperature is increased to 95° C. for one hour to allow reaction completion. After cooling to 40° C., the pH is adjusted to pH 8.0 with a 10% solution of ammonium hydroxide to give a blue liquid with a maximum absorbance at 601 nm.

EXAMPLE 34

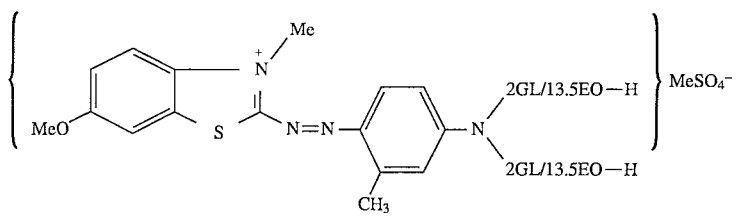

One hundred seventy-five grams (0.047 mole) of benzothiazole azo intermediate (prepared in Example 6) are added to a flask fitted with a heating mantle, stirrer, and nitrogen inlet/outlet. After heating the flask to 40° C. and purging with nitrogen, 15.1 grams (0.12 mole) dimethyl sulfate are introduced into the flask. The temperature is increased to 95° C. for one hour to allow reaction completion. After cooling to 40° C., the pH is adjusted to pH 8.0 with a 10 percent solution of ammonium hydroxide to give a blue liquid with a maximum absorbance at 620 nm.

EXAMPLE 35

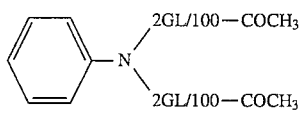

A mixture is prepared by charging 2937 grams (0.3 mole) of aniline 4GL/200EO-H intermediate (prepared in example 1A) in 8 moles of acetic anhydride. The mixture is stirred mechanically and five drops of N-methylimidazole catalyst are added. After the initial exotherm, the reaction mixture is heated to 100°–120° C. and is maintained at 110°—110° C. for an additional two hours to insure complete reaction. The mixture is cooled and the product is isolated by removing the excess acetic acid and acetic anhydride under reduced pressure at 90° C. An IR spectrum of the resulting liquid product displays an absence of hydroxyl absorbance and characteristic carbonyl absorbance of the corresponding acetate intermediate.

EXAMPLE 35A

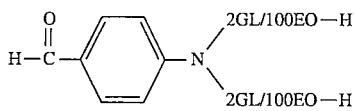

A dry 2000 ml three-neck flask is charged with 181 grams N,N-dimethylformamide under nitrogen and cooled to 0° C. One hundred ninety-two grams of phosphorus oxychloride are added dropwise with mechanical stirring and cooling over one hour. The resulting mixture is stirred for an additional two hours at 0°–5° C. Then 907 grams (0.3 mole) of aniline 4GL/200EO-H acetate intermediate (from Example 35) are added dropwise. The reaction mixture is gradually heated to 90° C. and held at this temperature for an additional two hours to insure complete reaction. After cooling, the mixture is diluted with an equal amount of ice and 0.83 moles of sodium hydroxide (50 percent by weight). The resulting mixture is heated to 50°–60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed under vacuum at 90° C. The resulting liquid has a maximum absorbance at 341 nm. An IR spectrum of the resulting liquid product displays both the presence of hydroxyl absorbance and characteristic carbonyl absorbance of the corresponding formyl intermediate.

EXAMPLE 35B

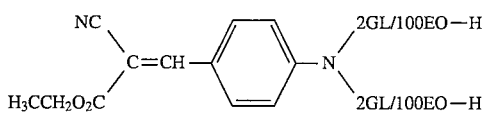

Four hundred and forty-two grams of aldehyde (0.05 mole) from example 35A, 5.7 grams of ethyl cyanoacetate (0.05 mole), one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and washed with water three times. The resulting methylene chloride solution is then dried over magnesium sulfate and filtered into a 1000 milliliter round bottom flask. The solution is then stripped of all volatiles under reduced pressure to give a yellow liquid with a maximum absorbance at 426 nm.

EXAMPLE 36

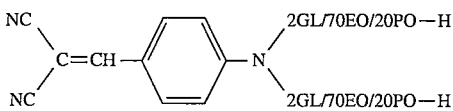

Four hundred and forty-five grams of aldehyde (0.05 mole) from Example 35A, 3.3 grams of malononitrile (0.05 mole), one drop of piperidine catalyst and 300 milliliters of toluene are charged into a 500 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and washed with water three times. The resulting methylene chloride solution is then dried over magnesium sulfate and filtered into a 1000 milliliter round bottom flask. The solution is then stripped of all volatiles under reduced pressure to give a yellow liquid with a maximum absorbance at 426 nm.

EXAMPLE 37

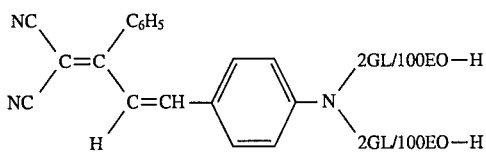

Four hundred and forty-two grams of aldehyde (0.05 mole) from Example 35A, 8.4 grams of 1-phenylethylidene malononitrile (0.05 mole), one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a red liquid with a maximum absorbance at 500 nm.

EXAMPLE 38

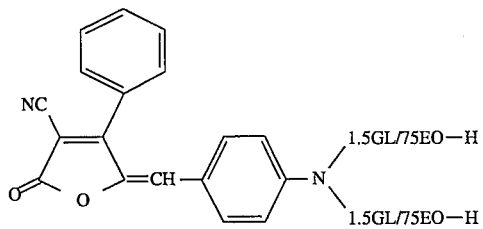

Three hundred and forty-seven grams of aldehyde (0.05 mole), 9.3 grams (0.05 mole) of 3-cyano-4-phenyl-2-(5H)-furanone, one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated to reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a red liquid with a maximum absorbance at 530 nm.

EXAMPLE 39

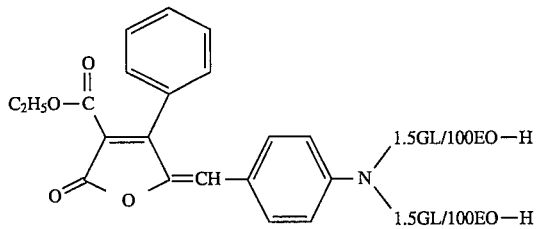

Four hundred and fifty-seven grams of aldehyde (0.05 mole), 9.3 grams (0.05 mole) of 3-ethoxycarbonyl-4-phenyl-2-(5H)-furanone, one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a red liquid with a maximum absorbance at 504 nm.

EXAMPLE 40

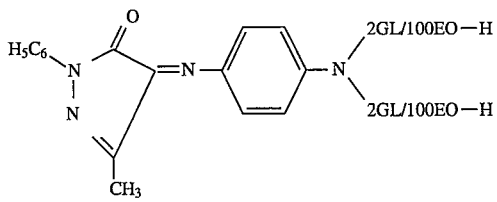

Four hundred and forty-two grams of aldehyde (0.05 mole), 8.7 grams (0.05 mole) of 3-methyl-1-phenyl-2-pyrazolone, one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give an orange liquid with a maximum absorbance at 464 nm.

EXAMPLE 41

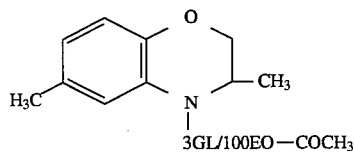

A mixture is prepared by charging 2388 grams (0.5 mole) of the benzomorpholine 3GL/100EO-H intermediate of Example 17A in 6 moles of acetic anhydride. The mixture is stirred mechanically and five drops of N-methylimidazole catalyst are added. After the initial exotherm, the reaction mixture is heated to 100°–120° C. and is maintained at 110°–110° C. for an additional two hours to insure complete reaction. The mixture is cooled and the product is isolated by removing the excess acetic acid and acetic anhydride by reduced pressure at 90° C. An IR spectrum of the resulting liquid product displays an absence of hydroxyl absorbance and characteristic carbonyl absorbance of the corresponding acetate intermediate.

EXAMPLE 41A

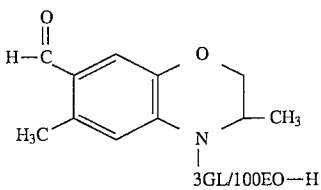

A dry 2000 ml three-neck flask is charged with 45 grams N,N-dimethylformamide under nitrogen and cooled to 0° C. Forty-eight grams of phosphorous oxychloride are added dropwise with mechanical stirring and cooling over one hour. The resulting mixture is stirred for an additional two hours at 0°–5° C. Then 1246 grams (0.25 mole) of the benzomorpholine 3GL/100EO acetate intermediate (prepared in example 41) are added dropwise. The reaction mixture is gradually heated to 90° C. and held at this temperature for an additional two hours to insure complete reaction. After cooling, the mixture is diluted with an equal amount of ice and 0.65 moles of sodium hydroxide (50 percent by weight). The resulting mixture is heated to 50°–60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed by reduced pressure at 90° C. The resulting liquid has a maximum absorbance at 356 nm. An IR spectrum of the resulting liquid product displays both the presence of hydroxyl absorbance and characteristic carbonyl absorbance of the corresponding formyl intermediate.

EXAMPLE 41B

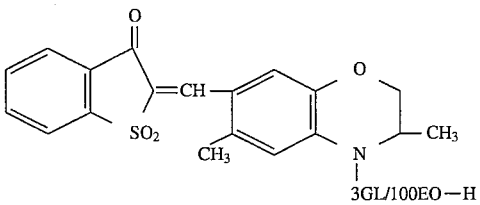

Two hundred and forty-two grams of aldehyde (0.05 mole) of Example 41, 9.1 grams (0.05 mole) of 3(2H)-thianaphthalenone, one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a reddish-orange liquid.

EXAMPLE 42

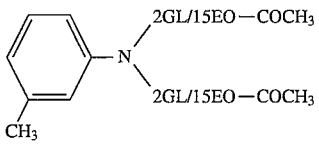

A mixture is prepared by charging 1723 grams (1 mole) of m-toluidine 4GL/30EO-H intermediate in 7 moles of acetic anhydride. The mixture is stirred mechanically and five drops of N-methylimidazole catalyst are added. After the initial exotherm, the reaction mixture is heated to 100°–120° C. and is maintained at 110°–110° C. for an additional two hours to insure complete reaction. The mixture is cooled and the product is isolated by removing the excess acetic acid and acetic anhydride by reduced pressure at 90° C. An IR spectrum of the resulting liquid product displays an absence of hydroxyl absorbance and characteristic carbonyl absorbance of the corresponding acetate intermediate.

EXAMPLE 42A

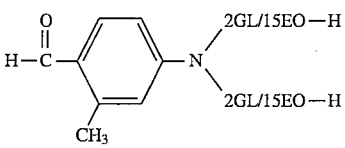

A dry 3000 ml three-neck flask is charged with 181 grams N,N-dimethylformamide under nitrogen and cooled to 0° C. One hundred ninety-two grams of phosphorous oxychloride are added dropwise with mechanical stirring and cooling over one hour. The resulting mixture is stirred for an additional two hours at 0°–5° C. Then 1975 grams (1 mole) of m-toluidine 4GL/30EO acetate intermediate of Example 42 are added dropwise. The reaction mixture is gradually heated to 90° C. and held at this temperature for an additional two hours to insure complete reaction. After cooling, the mixture is diluted with an equal amount of ice and 2.5 moles of sodium hydroxide (50 percent by weight). The resulting mixture is heated to 50°–60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed by reduced pressure at 90° C. The resulting liquid has a maximum absorbance at 342 nm. An IR spectrum of the resulting liquid product displays both the presence of hydroxyl absorbance and characteristic carbonyl absorbance of the corresponding formyl intermediate.

EXAMPLE 42B

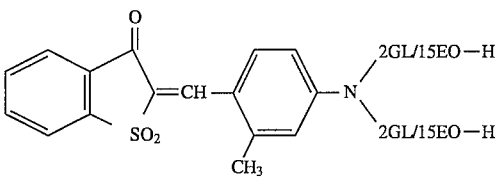

One hundred and seventy-five grams of aldehyde (0.1 mole) of Example 42A, 18.2 grams of 3(2H)-thianaphthalenone (0.1 mole), two drops of piperidine catalyst and 300 milliliters of toluene are charged into a 500 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 500 milliliter round bottom flask. The solution is then stripped of all volatiles under reduced pressure to give an orange liquid with a maximum absorbance at 493 nm.

EXAMPLE 43

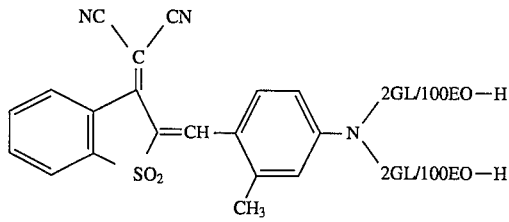

Four hundred and sixty-two grams of aldehyde (0.05 mole), 11.4 grams of the substituted 3(2H)-thianaphthalidene (0.05 mole), one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a blue liquid with a maximum absorbance at 600 nm.

EXAMPLE 44

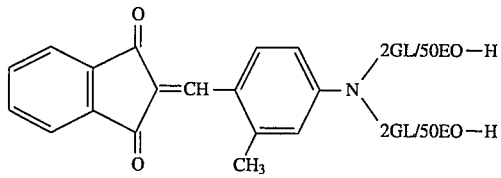

Four hundred and sixty-two grams of aldehyde (0.05 mole), 7.3 grams (0.05 mole) of 1,3-indandione, one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give an orange liquid with a maximum absorbance at 501 nm.

EXAMPLE 45

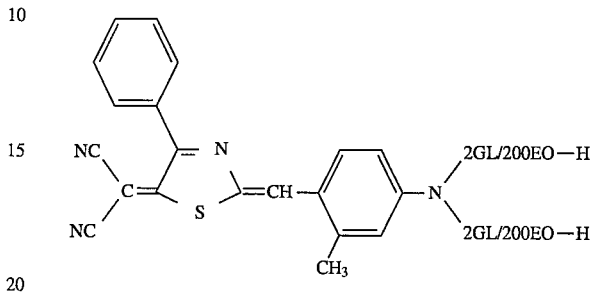

Four hundred and fifty grams of aldehyde (0.025 mole), 5.6 grams (0.025 mole) of thiazole intermediate, one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a bluish-green liquid with a maximum absorbance at 658 nm.

EXAMPLE 46

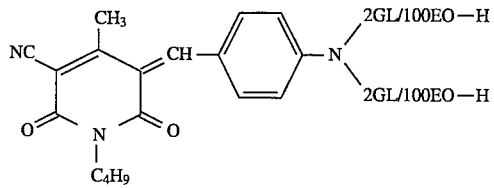

Four hundred and sixty-two grams of aldehyde (0.05 mole), 10.3 grams of dione (0.05 mole), one drop of piperidine catalyst and 300 milliliters of toluene are charged into a 1000 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a violet liquid with a maximum absorbance at 557 nm.

EXAMPLE 47

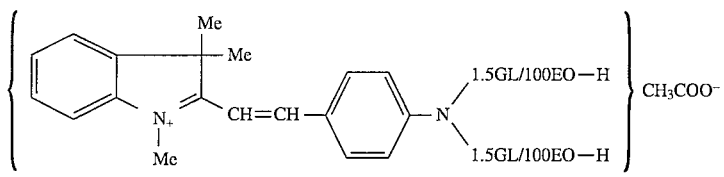

Two hundred grams of acetic acid, 8.8 grams (0.05 mole) 2-methylene-1,3,3-trimethylindoline, and 461 grams (0.05 mole) of formylaniline 3GL/200EO-H intermediate are charged into a 1000 milliliter three necked flask equipped with a reflux condenser, thermometer, heating mantle, and mechanical stirrer. This mixture is heated to 95° C. with the heating mantle and is maintained at 95°–100° C. for an additional 6 hours. The reaction mixture is cooled and transferred to a 1000 milliliter round bottom flask and stripped of acetic acid. The pH of the resulting product is adjusted with 25% sodium hydroxide to 7 to give a bluish-red liquid with a maximum absorbance of 546 nm.

EXAMPLE 48

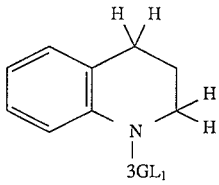

In a dry 1000 ml three-neck flask equipped with nitrogen purge, heating mantle, mechanical stirrer, temperature controller and addition funnel are charged 180 grams of 1,2,3,4-tetrahydroquinoline (1.34 moles) and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate.

After all of the glycidol is charged, the reaction mixture is to post-heated for one hour. At this time the hydroxyl number is run for the tetrahydroquinoline 3 glycidol intermediate and is found to be 673 (theory is 632).

EXAMPLE 48A

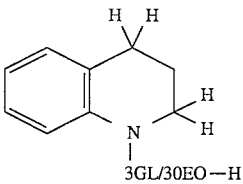

In a one gallon autoclave are charged 487 grams (1.37 moles) of tetrahydroquinoline 3 glycidol intermediate of Example 48 and 5 grams of potassium hydroxide catalyst. The reactor is purged three times to 60 psi with nitrogen and is then heated to 250° F. under 5 psi nitrogen pressure. Next, 1808 grams (41.1 moles) of ethylene oxide are added at a rate to maintain a vapor pressure reading less than 80 psi.

After the EO addition, the reaction mixture is post-heated at 120° C. for 2 hours.

After vacuum stripping at 200° F. for 15 minutes, the tetrahydroquinoline 3GL/30EO-H intermediate has an average gram molecular weight of 1675 and is ready for use.

EXAMPLE 48B

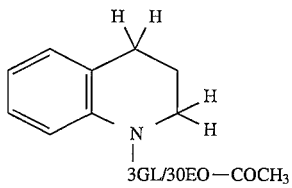

A mixture is prepared by charging 838 grams (0.5 mole) of tetrahydroquinoline 3GL/30EO-H intermediate of Example 48A in 6 moles of acetic anhydride. The mixture is stirred mechanically and five drops of N-methylimidazole catalyst are added. After the initial exotherm, the reaction mixture is heated to 100°–120° C. and is maintained at 110°–110° C. for an additional two hours to insure complete reaction. The mixture is cooled and the product is isolated by removing the excess acetic acid and acetic anhydride by reduced pressure at 90° C. An IR spectrum of the resulting liquid product displays an absence of hydroxyl absorbance and characteristic carbonyl absorbance of the corresponding acetate intermediate.

EXAMPLE 48C

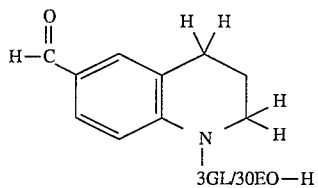

A dry 2000 ml three-neck flask is charged with 45 grams of N,N-dimethylformamide under nitrogen and cooled to 0° C. Forty-eight grams of phosphorous oxychloride are added dropwise with mechanical stirring and cooling over one hour. The resulting mixture is stirred for an additional two hours at 0°–5° C. Then 471 grams (0.25 mole) of tetrahydroquinoline 3GL/10PO/10EO acetate intermediate of Example 48B are added dropwise. The reaction mixture is gradually heated to 90° C. and held at this temperature for an additional two hours to insure complete reaction. After cooling, the mixture is diluted with an equal amount of ice and 0.65 mole of sodium hydroxide (50 percent by weight). The resulting mixture is heated to 50°–60° C. until the formylated acetate intermediate is hydrolyzed. The resulting mixture is then neutralized with acetic acid and the product extracted into methylene chloride. The methylene chloride layer is phase separated and dried over anhydrous magnesium sulfate. The methylene chloride solution is filtered and the solvent is removed by reduced pressure at 90° C. An IR spectrum of the resulting liquid product displays both the presence of hydroxyl absorbance and characteristic carbonyl absorbance of the corresponding formyl intermediate.

EXAMPLE 48D

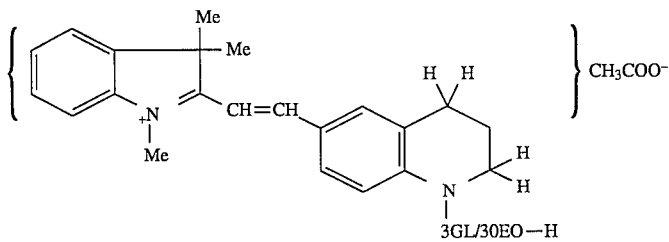

Four hundred grams of acetic acid, 17.3 grams (0.1 mole) 2-methylene-1,3,3-trimethylindoline, and 170.2 grams (0.1 mole) of formyl-tetramethyltetrahydroquinoline 3GL/100EO-H intermediate (prepared in example 48C) are charged into a 1000 milliliter three necked flask equipped with a reflux condenser, thermometer, heating mantle, and mechanical stirrer. This mixture is heated to 95° C. with the heating mantle and is maintained at 95°–100° C. for an additional 6 hours. The reaction mixture is cooled and transferred to a 1000 milliliter round bottom flask and stripped of acetic acid. The pH of the resulting product is adjusted with 25% sodium hydroxide to 7 to give a bluish-red liquid.

EXAMPLE 49

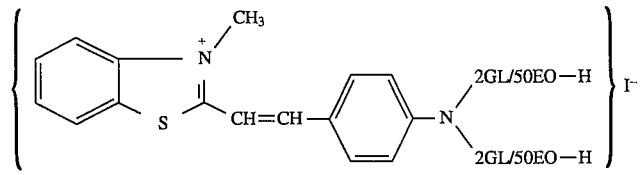

Twenty-one grams (0.07 mole) methylium methyl benzothiazole iodide, 337 grams (0.07 mole) of formylaniline 4GL/100EO-H intermediate and 0.2 gram of morpholine catalyst are charged into a 1000 milliliter three necked flask equipped with a reflux condenser, thermometer, heating mantle, and mechanical stirrer. This mixture is heated to 85° C. with the heating mantle and is maintained at 85° C. for an additional 3 hours. The reaction mixture is cooled and transferred to a 1000 milliliter round bottom flask and stripped of all volatiles and collected to give a red liquid.

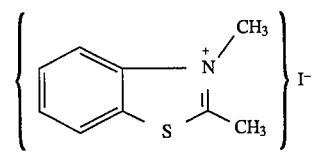

Seventy grams (0.47 mole) of 2-methylbenzothiazole are quickly added to a plastic encased bottle along with 133.2 grams (0.94 mole) methyl iodide at 5° C. The bottle is sealed with a stopper and copper wire and is placed in a steam bath for approximately two hours. At the end of this reaction period, the bottle is uncapped and any excess methyl iodide volatilized off. The product is isolated as a crushed solid.

EXAMPLE 50

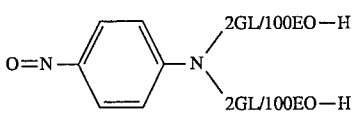

A mixture is prepared by charging 2203 grams (0.25 mole) of aniline 4GL/200EO-H intermediate of Example 1A, along with 100 ml of concentrated hydrochloric acid and 25 ml of water in a 3000 ml three neck flask. The mixture is stirred mechanically and cooled to 0° C. A solution of 19 grams (0.28 mole) of sodium nitrite dissolved in 75 ml of water is then added dropwise over one and a half hours maintaining the temperature below 0° C. The mixture is allowed to warm to room temperature and stirred for an additional two hours. The excess nitrite is then destroyed by pulling a vacuum for an additional 30 minutes. After cooling to 0° C., the mixture is neutralized with dilute sodium hydroxide solution and the product extracted into methylene chloride. The methylene chloride layer is phase separated and dried over anhydrous magnesium sulfate. The methylene chloride solution is filtered and the solvent is removed by reduced pressure at 90° C. The resulting liquid has a maximum absorbance at 400 nm. An IR spectrum of the resulting liquid product displays a characteristic nitroso absorbance.

EXAMPLE 50A

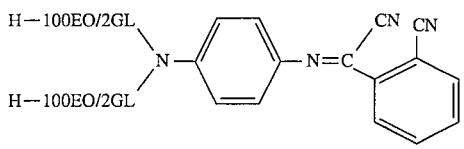

Four hundred and sixty grams (0.05 mole) of nitrosoaniline 4GL/200EO-H intermediate (0.05 mole) of example 50, 7.1 grams of homophthalonitrile (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give an orange colored product with a maximum absorbance at 489 nm.

COMPARATIVE EXAMPLE 50B

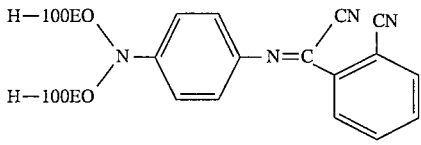

Four hundred and forty-six grams (0.05 mole) of nitrosoaniline 200EO-H intermediate (0.05 mole), 7.1 grams of homophthalonitrile (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give an orange colored product with a maximum absorbance at 489 nm.

EXAMPLE 51

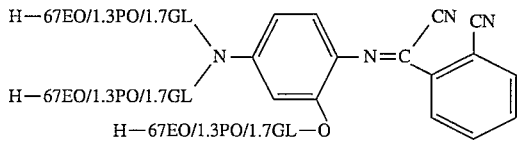

Four hundred and seventy-six grams (0.05 mole) of nitroso-m-oxyaniline 5GL/4PO/200EO-H intermediate (0.05 mole), 7.1 grams of homophthalonitrile (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a red colored product with a maximum absorbance at 505.5 nm.

COMPARATIVE EXAMPLE 51A

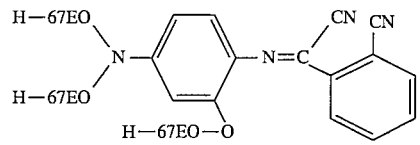

Four hundred and forty-seven grams (0.05 mole) of nitroso-m-oxyaniline 200EO-H intermediate (0.05 mole), 7.1 grams of homophthalonitrile (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a red colored product with a maximum absorbance at 505.5 nm.

EXAMPLE 52

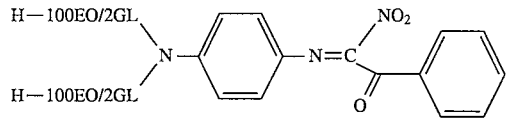

Four hundred and sixty grams (0.05 mole) of nitrosoaniline 4GL/200EO-H intermediate (0.05 mole) of Example 50, 8.3 grams of benzoylnitromethane (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a yellow colored product with a maximum absorbance at 427 nm.

COMPARATIVE EXAMPLE 52A

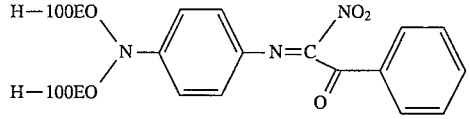

Four hundred and forty-six grams (0.05 mole) of nitrosoaniline 200EO-H intermediate (0.05 mole), 8.3 grams of benzoylnitromethane (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a yellow colored product with a maximum absorbance at 427 nm.

EXAMPLE 53

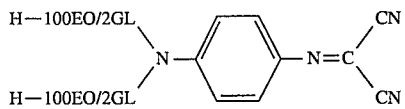

Four hundred and sixty grams (0.05 mole) of nitrosoaniline 4GL/200EO-H intermediate (0.05 mole) of Example 50, 3.3 grams of malononitrile (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give an orange colored product with a maximum absorbance at 503 nm.

COMPARATIVE EXAMPLE 53A

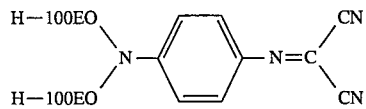

Four hundred and forty-six grams (0.05 mole) of nitrosoaniline 200EO-H intermediate (0.05 mole), 3.3 grams of malononitrile (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give an red colored product with a maximum absorbance at 503 nm.

EXAMPLE 54

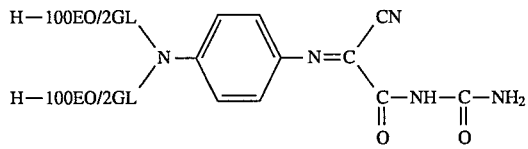

Four hundred and sixty grams (0.05 mole) of nitrosoaniline 4GL/200EO-H intermediate (0.05 mole) of Example 50, 6.4 grams of cyanoacetyl urea (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a yellow colored product with a maximum absorbance at 416 nm.

COMPARATIVE EXAMPLE 54A

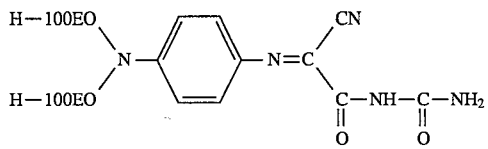

Four hundred and forty-six grams (0.05 mole) of nitrosoaniline 200EO-H intermediate (0.05 mole), 6.4 grams of cyanoacetyl urea (0.05 mole) and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a yellow colored product with a maximum absorbance at 416 nm.

EXAMPLE 55

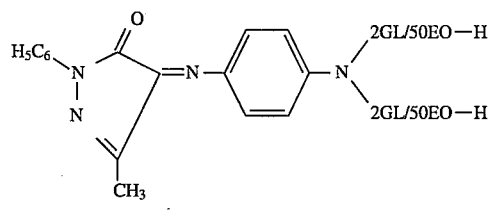

Two hundred and forty-one grams (0.05 mole) of nitrosoaniline 4GL/100EO-H intermediate, 8.7 grams (0.05 mole) of 3-methyl-1-phenyl-2-pyrazolone and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a red liquid with a maximum absorbance at 522 nm.

EXAMPLE 56

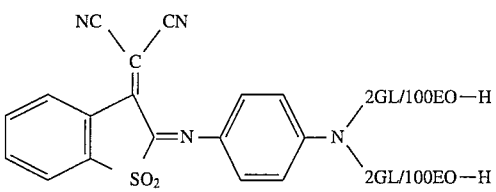

Four hundred and sixty grams (0.05 mole) of nitrosoaniline 4GL/200EO-H intermediate of Example 50, 11.3 grams (0.05 mole) of the substituted 3(2H)-thianaphthalidene and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a bluish-green liquid with a maximum absorbance at 650 nm.

EXAMPLE 57

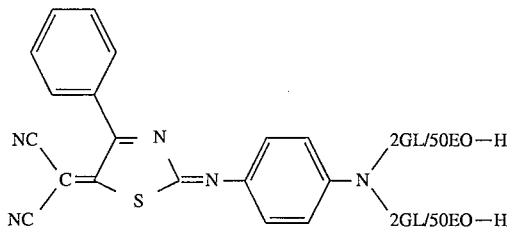

Two hundred and forty-one grams (0.05 mole) of nitrosoaniline 4GL/100EO-H intermediate, 11.3 grams (0.05 mole) of thiazole intermediate and 300 milliliters of toluene are charged into a 1000 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a bluish-green liquid with a maximum absorbance at 672 nm.

EXAMPLE 58

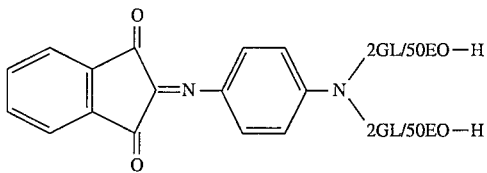

Two hundred and forty-one grams (0.05 mole) of nitrosoaniline 4GL/100EO-H intermediate, 7.3 grams (0.05 mole) of 1,3-indandione and 300 milliliters of toluene are charged into a 1000 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a red liquid with a maximum absorbance at 520 nm.

EXAMPLE 59

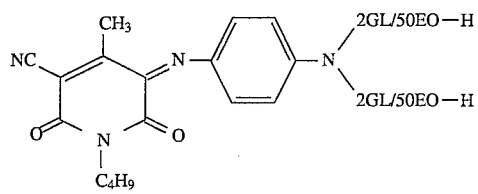

Two hundred and forty-one grams (0.05 mole) of nitrosoaniline 4GL/100EO-H intermediate, 11.3 grams (0.05 mole) of dione intermediate and 300 milliliters of toluene are charged into a 1000 milliliter three necked flask equipped with thermometer, reflux condenser, Dean-Stark trap, mechanical stirrer, and heating mantle. This mixture is heated at reflux until no more water condensed in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a blue liquid with a maximum absorbance at 618 nm.

EXAMPLE 60

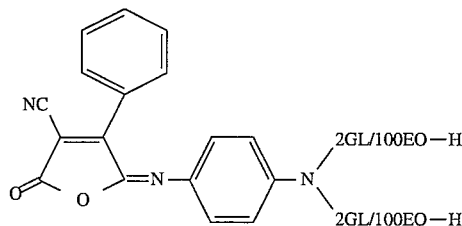

Four hundred and sixty grams (0.05 mole) of nitrosoaniline 4GL/200EO-H intermediate of Example 50, 9.3 grams (0.05 mole) of 3-cyano-4-phenyl-1-2-(5H)-furanone and 300 milliliters of toluene are charged into a 1000 milliliter three necked flask equipped with thermometer, reflux condenser, Dean-Stark trap, mechanical stirrer, and heating mantle. This mixture is heated at reflux until no more water condenses in the trap which takes about four hours. The resulting mixture is dissolved in methylene chloride and is washed with water three times. The resulting methylene chloride solution is then dried over magnesium sulfate and filtered into a 1000 milliliter round bottom flask. The solution is then stripped of all volatiles under reduced pressure to give a blue-violet liquid with a maximum absorbance at 565 nm.

EXAMPLE 61

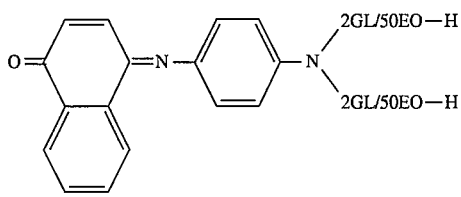

Two hundred and forty-one grams (0.05 mole) of nitrosoaniline 4GL/100EO-H intermediate, 7.2 grams (0.05 mole) of 1-naphthol and 50 milliliters of water are changed into a 500 milliliter three necked flask equipped with thermometer, reflux condenser, Dean-Stark trap, mechanical stirrer, and heating mantle. The pH of the mixture is adjusted to 6.0 with sodium bicarbonate solution and 2 grams of morpholine catalyst are added. Next, the mixture is heated at 75° C. about seven hours. The resulting mixture gives a blue-green colored product with maximum absorbance at 613 nm.

EXAMPLE 62

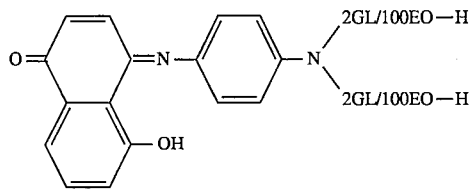

Four hundred sixty grams (0.05 mole) of nitrosoaniline 4GL/200EO-H intermediate of Example 50, 8 grams (0.05 mole) of 1,5-naphthalenediol and 50 milliliters of water are charged into a 1000 milliliter three necked flask equipped with thermometer, reflux condenser, Dean-Stark trap, mechanical stirrer, and heating mantle. The pH of the mixture is adjusted to 6.0 with sodium bicarbonate solution and 2 grams of morpholine catalyst are added. Next, the mixture is heated at 75° C. about seven hours. The resulting mixture gives a blue colored product with maximum absorbance at 605 nm.

COMPARATIVE EXAMPLE 62 A

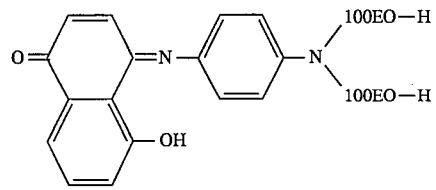

Four hundred and forty-six grams (0.05 mole) of nitrosoaniline 200EO-H intermediate, 8 grams (0.05 mole) of 1,5-naphthalenediol and 50 milliliters of water are charged into a 1000 milliliter three necked flask equipped with thermometer, reflux condenser, Dean-Stark trap, mechanical stirrer, and heating mantle. The pH of the mixture is adjusted to 6.0 with sodium bicarbonate solution and 2 grams of morpholine catalyst are added. Next, the mixture is heated at 75° C. about seven hours. The resulting mixture gives a blue colored product with maximum absorbance at 605 nm.

EXAMPLE 63

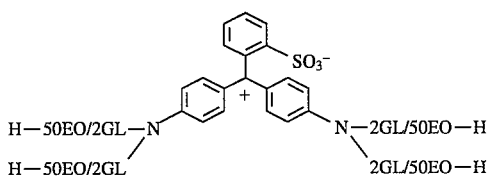

Thirteen grams (0.05 mole) 80% of o-formylbenzenesulfonic acid sodium salt (80% assay), 479 grams (0.1 mole) of the aniline 4GL/100EO-H, 1 gram of urea, and 6 grams of dilute mineral acid are dissolved in a 1000 milliliter flask. The contents are then heated to 90° C. for three hours. Eight grams of chloranil are added and the mixture is heated for an additional two hours. The heat is then removed and the mixture is then cooled to room temperature. The resulting mixture is stirred for several hours and allowed to stand overnight, after which sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue-green colored product with maximum absorbance at 635 nm.

EXAMPLE 64

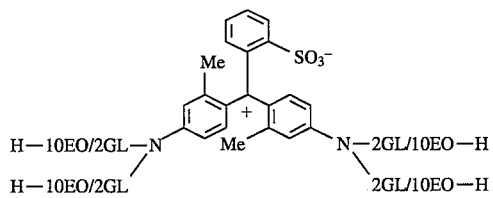

Twenty-six grams (0.1 mole) 80% of o-formylbenzenesulfonic acid sodium salt (80% assay), 254 grams (0.2 mole) of the m-toluidine 4GL/20EO-H intermediate, 1.4 grams of urea, and 6 grams of dilute mineral acid are dissolved in a 500 milliliter flask. The contents are then heated to 90° C. for three hours. Sixteen grams of chloranil are added and the mixture is heated for an additional two hours. The heat is then removed and the mixture is then cooled to room temperature. The resulting mixture is stirred for several hours and allowed to stand overnight, after which sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue-green colored product with maximum absorbance at 655 nm.

EXAMPLE 65

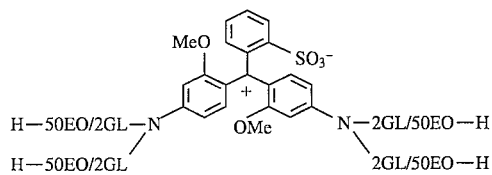

Thirteen grams (0.05 mole) 80% of o-formylbenzenesulfonic acid sodium salt (80% assay), 482 grams (0.1 mole) of the m-anisidine 4GL/100EO-H intermediate, 1 gram of urea, and 6 grams of dilute mineral acid are dissolved in a 1000 milliliter flask. The contents are then heated to 90° C. for three hours. Eight grams of chloranil are added and the mixture is heated for an additional two hours. The heat is then removed and the mixture is then cooled to room temperature. The resulting mixture is stirred for several hours and allowed to stand overnight, after which sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue-green colored product with maximum absorbance at 635 nm.

COMPARATIVE EXAMPLE 65A

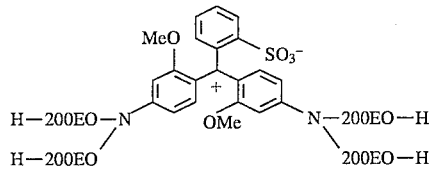

Thirteen grams (0.05 mole) 80% of o-formylbenzenesulfonic acid sodium salt (80% assay), 896 grams (0.1 mole) of the m-anisidine 200EO-H intermediate, 1 gram of urea, and 6 grams of dilute mineral acid are dissolved in a 1000 milliliter flask. The contents are then heated to 90° C. for three hours. Eight grams of chloranil are added and the mixture is heated for an additional two hours. The heat is then removed and the mixture is then cooled to room temperature. The resulting mixture is stirred for several hours and allowed to stand overnight, after which sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue-green colored product with maximum absorbance at 635 nm.

EXAMPLE 66

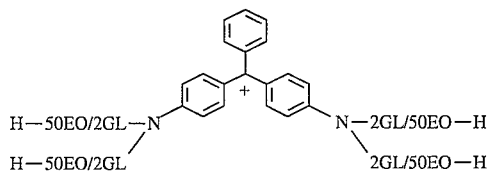

Five and three-tenths grams (0.05 mole) benzaldehyde, 479 grams (0.1 mole) of the aniline 4GL/100EO-H intermediate, 1 gram of urea, and 6 grams of dilute mineral acid are dissolved in a 1000 milliliter flask. The contents are then heated to 90° C. for three hours. Eight grams of chloranil are added and the mixture is heated for an addition two hours. The heat is then removed and the mixture is then cooled to room temperature. The resulting mixture is stirred for several hours and allowed to stand overnight, after which sodium hydroxide is added to neutralize excess acid to a pH of about 7 keeping the temperature below 20° C. The bottom salt layer is removed and the product is dissolved in methylene chloride. The methylene chloride solution is washed four times with water and then dried over sodium sulfate. The methylene chloride solvent is then filtered and stripped to give a blue-violet colored product.

EXAMPLE 67

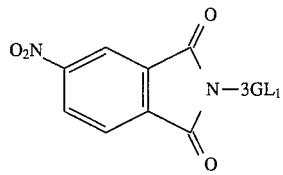

In a dry 1000 ml three-neck flask equipped with nitrogen purge, heating mantle, mechanical stirrer, temperature controller and addition funnel are charged 257 grams of 4-nitrophthalimide (1.34 mole), 400 grams of xylenes and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate. After all of the glycidol is charged, the reaction mixture is post-heated for one hour.

EXAMPLE 67A

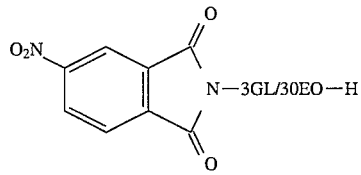

In a two liter autoclave are charged 414 grams (1 mole) of 4-nitrophthalimide 3 glycidol intermediate of Example 67 and 4 grams of potassium hydroxide catalyst. The reactor is purged three times to 60 psi with nitrogen and is then heated to 250° F. under 5 psi nitrogen pressure.

Next, 1320 grams (30 moles) of ethylene oxide are added at a rate to maintain a vapor pressure reading less than 80 psi. After the EO addition, the reaction mixture is post-heated at 120° C. for 2 hours.

After vacuum stripping at 200° F. for 15 minutes, the 4-nitrophthalimide 3GL/30EO-H intermediate has an average gram molecular weight of 1734 and is ready for use.

EXAMPLE 67B

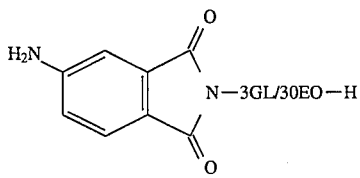

In a 2000 milliliter autoclave are charged 867 grams (0.5 moles) of 4-nitrophthalimide 3GL/30EO-H intermediate of Example 67A, 800 milliliters of ethyl alcohol and 65 grams of wet Raney nickel catalyst. The autoclave is then purged three times with hydrogen gas and heated to 85°-90° C. at a pressure of about 1300 psi. After about two hours the hydrogen uptake ceases. A sample is removed and vacuum stripped of solvent. The IR spectrum of this sample shows no nitro bands and the presence of an amine band indicating that the reaction is complete. The autoclave is cooled and vented. The product is isolated by filtering the reaction mixture and stripping away the solvent under reduced pressure.

EXAMPLE 68

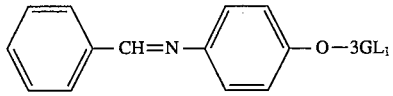

In a dry 1000 ml three-neck flask equipped with nitrogen purge, heating mantle, mechanical stirrer, temperature controller and addition funnel are charged 363 grams of N-benzylidene-4-hydroxyaniline (1.34 mole), 400 grams of xylenes and 0.6 gram of potassium hydroxide. The mixture is heated to 110° C. with stirring by means of the heating mantle and temperature controller.

Two hundred ninety-eight grams (4.03 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°-125° C. by the addition rate.

After all of the glycidol is charged, the reaction mixture is post-heated for one hour. At this time the hydroxyl number is run for the N-benzylidene-4-hydroxyaniline 3 glycidol intermediate and is found to be 637 (theory is 671).

EXAMPLE 68A

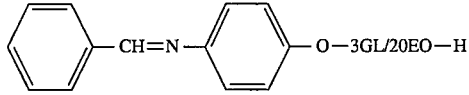

In a two liter autoclave are charged 418 grams (1 mole) of N-benzylidene-4-hydroxyaniline 3 glycidol intermediate of Example 68 and 4 grams of potassium hydroxide catalyst. The reactor is purged three times to 60 psi with nitrogen and is then heated to 250° F. under 5 psi nitrogen pressure.

Next, 880 grams (20 moles) of ethylene oxide are added at a rate to maintain a vapor pressure reading less than 80 psi. After the EO addition, the reaction mixture is post-heated at 120° C. for 2 hours. At this time the hydroxyl number is run for the reaction mixture and is found to be 214 (theory is 225).

After vacuum stripping at 200° F. for 15 minutes, the N-benzylidene-4-hydroxyaniline 3GL/20EO-H intermediate has an average gram molecular weight of 1234 and is ready for use.

EXAMPLE 69

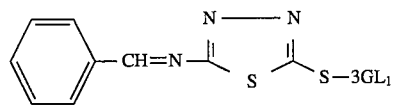

In a dry 1000 ml three-neck flask equipped with nitrogen purge, heating mantle, mechanical stirrer, temperature controller and addition funnel are charged 176 grams of N-benzylidene-2-amino-5-mercapto-1,3,4-thiadiazole (0.8 mole), 400 grams of xylenes and 0.6 gram of potassium hydroxide. The mixture is heated to 110° C. with stirring with by means of the heating mantle and temperature controller.

One hundred seventy-seven grams (2.4 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°-125° C. by the addition rate. After all of the glycidol is charged the reaction mixture is post-heated for one hour.

EXAMPLE 69A

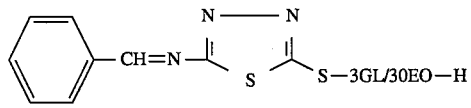

In a one gallon autoclave are charged 443 grams (1 mole) of N-benzylidene-2-amino-5-mercapto-1,3,4-thiadiazole 3 glycidol intermediate of Example 69 and 4 grams of potassium hydroxide catalyst. The reactor is purged three times to 60 psi with nitrogen and is then heated to 250° F. under 5 psi nitrogen pressure.

Next, 1320 grams (30 moles) of ethylene oxide are added at a rate to maintain a vapor pressure reading less than 80 psi. After the EO addition, the reaction mixture is post-heated at 120° C. for 2 hours.

After vacuum stripping at 200° F. for 15 minutes, the N-benzylidene-2-amino-5-mercapto-1,3,4-thiadiazole 3GL/30EO-H intermediate has an average gram molecular weight of 1763 and is ready for use.

EXAMPLE 70

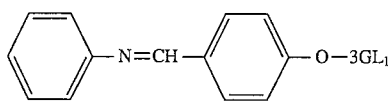

In a dry 100 ml three-neck flask equipped with nitrogen purge, heating mantle, mechanical stirrer, temperature controller and addition funnel are charged 98.5 grams of N-(hydroxybenzylidene) aniline (0.5 mole), 200 grams of xylenes and 0.6 gram of potassium hydroxide. The mixture is heated to 110° C. with stirring by means of the heating mantle and temperature controller.

One hundred eleven grams (1.5 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate. After all of the glycidol is charged, the reaction mixture is post-heated for one hour.

EXAMPLE 70A

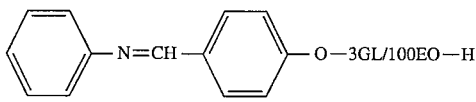

In a two liter autoclave are charged 419 grams (1 mole) of N-(hydroxybenzylidene)aniline 3 glycidol intermediate of Example 70 and 4 grams of potassium hydroxide catalyst. The reactor is purged three times to 60 psi with nitrogen and is then heated to 250° F. under 5 psi nitrogen pressure.

Next, 4400 grams (100 moles) of ethylene oxide are added at a rate to maintain a vapor pressure reading less than 80 psi. After the EO addition, the reaction mixture is post-heated at 120° C. for 2 hours.

After vacuum stripping at 200° F. for 15 minutes, the N-(hydroxybenzylidene)aniline 3GL/100EO-H intermediate has an average gram molecular weight of 4819 and is ready for use.

EXAMPLE 71

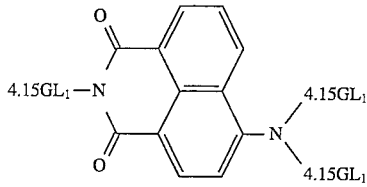

In a dry 1000 ml three-neck flask equipped with nitrogen purge, heating mantle, mechanical stirrer, temperature controller and addition funnel are charged 42.4 grams of 4-aminonaphthalimide (0.2 mole), 300 grams of xylenes and 0.3 gram of potassium hydroxide. The mixture is heated to 110° C. with stirring by means of the heating mantle and temperature controller.

One hundred eighty-seven grams (2.5 moles) of glycidol are slowly dropwise added through the addition funnel. The first few milliliters cause a slight temperature drop before the exotherm begins. Once it starts, the heating mantle may be removed and the exotherm controlled by the addition rate. The temperature is maintained between 110°–125° C. by the addition rate. After all of the glycidol is charged, the reaction mixture is post-heated for one hour.

EXAMPLE 71A

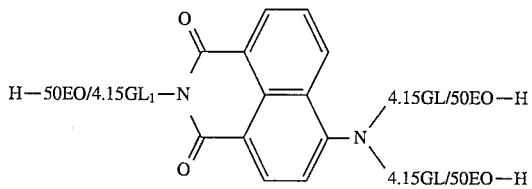

In a two gallon autoclave are charged 1137 grams (1 mole) of 4-aminonaphthalimide 12.5 glycidol intermediate of Example 71 and 4 grams of potassium hydroxide catalyst. The reactor is purged three times to 60 psi with nitrogen and is then heated to 250° F. under 5 psi nitrogen pressure.

Next, 6600 grams (150 moles) of ethylene oxide are added at a rate to maintain a vapor pressure reading less than 80 psi. After the EO addition, the reaction mixture is post-heated at 120° C. for 2 hours.

After vacuum stripping at 200° F. for 15 minutes, the 4-aminonaphthalimide 12.5GL/150EO-H intermediate has an average gram molecular weight of 7737 and is ready for use.

EXAMPLE 72

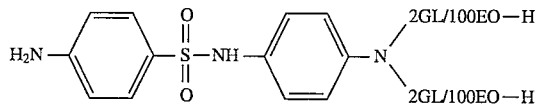

A mixture is prepared by adding 2297 grams (0.5 mole) of the aminoaniline 4GL/200EO-H intermediate of Example 19B to 39 grams (0.3 mole) sodium carbonate in 300 ml of water. The mixture is cooled to 10°–15° C. and 58.3 grams (0.25 mole) of 4-acetamidobenzenesulfonyl chloride are added to the mixture over one half hour. After the addition is complete, the mixture is warmed to 50° C. for an additional two hours to insure complete reaction. Ten grams (0.25 mole) of sodium hydroxide are added to the mixture and the mixture is heated to reflux one hour. Afterwards, the mixture is cooled and the product is extracted into methylene chloride. The methylene chloride solution is separated from the salt water solution, further washed several times with water to neutral pH, and dried over anhydrous magnesium sulfate. The dried solution is filtered and stripped under reduced pressure at 90° C. to give the intermediate.

EXAMPLE 73

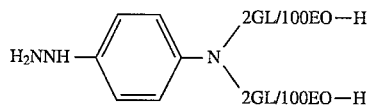

Five hundred and fifty-five grams (0.125 mole) of amine 4GL/200EO-H intermediate of Example 19B are added to a flask along with 45 milliliters of concentrated hydrochloric acid, and 90 milliliters of water. The mixture is cooled to 0°–5° C. Ten grams of sodium nitrite are added maintaining the mixture below 10° C. After several hours, the excess nitrite is destroyed with sulfamic acid. The diazo solution is then dripped into a solution of 94 grams of sodium sulfite in 250 grams of water, stirred for one hour at room temperature and then 50 grams of concentrated sulfuric acid are added and the mixture heated for one hour at 100° C. After cooling, the pH is adjusted with sodium hydroxide to 10. The organic layer is separated and extracted into methylene chloride. The methylene chloride solution is separated from the salt water solution, further washed several times with water to neutral pH, and dried over anhydrous magnesium sulfate. The dried solution is filtered and stripped under reduced pressure at 90° C. to give the intermediate.

EXAMPLE 74

Fugitivity Testing of Glycidol Polymeric Colorants Versus Their Linear Analogues This test simulates the actual processing conditions that nylon yarn encounter during heat setting, tufting, and continuous dyeing and is used to determine the fugitivity of various tints when they are subjected to these conditions.

First, 4 inch by 4 inch squares of undyed squares of nylon carpet are cut and the level of color on them is determined using a Hunter Labscan Colorimeter. The samples are then sprayed with a tint solution such that about 0.5 percent by weight of colorant is applied to the carpet square. The samples are allowed to dry overnight and are then read on the colorimeter again. The samples are then heat set in an autoclave using the conditions that the customer would normally use. The samples are read again on the colorimeter, and are allowed to age in the dark for one week. The samples are then dipped in a pH 5 solution for 30 seconds and then vacuumed. They are then dipped in a pH 2.2 solution and allowed to drain and are then sprayed twice and vacuumed again. These samples are then steamed for four minutes and vacuumed again. The wet samples are dried at 60° C. for one hour in an oven. the samples are read one last time on the colorimeter, and the results are then compared to the first reading. A five point scale is developed in which a value of 5.00 indicates that all the colorant is removed and the carpet square returned to its totally white shade. Below, the results for the glycidol polymeric colorants are compared to their linear analogues which contain no glycidol but have polymers of roughly equal weight.

| Entry | Example | E Glycidol Colorant | E Analog |
|---|---|---|---|
| 1 | Example#51 | 3.60 | — |
| 2 | Example#51A | — | 2.84 |
| 3 | Example#65 | 3.88 | — |
| 4 | Example#65A | — | 2.49 |
| 5 | Example#19C | 2.34 | — |
| 6 | Example#19D | — | 1.39 |
| 7 | Example#52 | 2.00 | — |
| 8 | Example#52A | — | 0.13 |
| 9 | Example#50A | 2.79 | — |
| 10 | Example#50B | — | 2.22 |
| 11 | Example#62 | 2.62 | — |
| 12 | Example#62A | — | 2.03 |
| 13 | Example#54 | 2.69 | — |
| 14 | Example#54A | — | 1.19 |

In every case tested, the glycidol polymeric colorant is better than its linear analog.

EXAMPLE 75

Extractability of Glycidol vs Nonglycidol Based Colorants from Polyolefins

This example demonstrates the improved non-extractability of glycidol polymeric colorants over their linear analogs. The polymeric colorant of Example #6 and its linear analog (Example #6A) are evaluated in the following formulations:

| Ingredient* | Formulation A | Formulation B |
|---|---|---|
| 12 MF Polypropylene (Norchem 831060, 25–35% ethylene | 5000 g | 5000 g |
| Irganox 168 (Ciba-Geigy) | 5.0 g | 5.0 g |
| Calcium stearate | 2.5 g | 2.5 g |
| Glycidol based colorant (Example#6) | 2.5 g | — |
| Linear analog (Example#6A) | — | 2.5 g |

*For comparison purposes, the colorant concentrations shown were used to obtain about the same depth of shade in each formulation.

The additives are mixed mechanically, melt compounded at 440° F. through a one inch extruder, and chopped into pellets. Injection molded step plaques are prepared from each formulation. These plaques measure 2 inches by 3 inches with a step thickness of 0.05 inch and 0.85 inch. Each plaque has a total surface area of 12.5 square inches.

Eight ounce glass jars are used as extraction vessels in this study. The jars have a diameter of 2.2 inches and a height of 3.5 inches. The total volume of the container is 218 milliliters. Four plaques are placed in the extraction vessel. Two hundred milliliters of isopropanol are added and the jars are sealed. The vessels are placed in a 50° C. oven for 23 days. At the end of this period the vessels are removed. The isopropanol is decanted and concentrated to 20 milliliters. The UV/Vis absorption spectra of these concentrated solutions are then recorded on a Beckman UV/Vis Spectrophotometer. A 1 centimeter path length cell on a Beckman DU-7 Spectrophotometer is employed. The linear analog colorant formulation "B" exhibited an absorbance at 512 nm (vs. baseline) of 0.04AU. The glycidol Colorant formulation "A" exhibited an absorbance at 512 nm of 0.01 AU. Both the glycidol and linear colorants have the same chromophore. Colorant "B" has four times more absorbance at the maximum wavelength than did colorant A. Therefore, colorant formulation "A" has four times lower extractability than does colorant formulation "B".

TABLE 1

| Entry | $R_2$ | $R_{16}$ | $R_{17}$ | $R_{18}$ |
|---|---|---|---|---|
| 1 | 4-$NO_2$ | H | $C_2H_5$ | 3GL/100EO—H |
| 2 | 4-$SO_2CH_3$ | H | $C_6H_{11}$ | 4GL/75EO—H |
| 3 | 2-Cl,4-$NO_2$ | 3-$CH_3$ | $CH_2CH=CH_2$ | 2GL/30EO—H |
| 4 | 2-Cl,4-$SO_2CH_3$ | 3-$CH_3$ | 2GL/50EO—H | 2GL/50EO—H |
| 5 | 2,4-di-$NO_2$ | 3-$CH_3$ | $CH_2C_6H_5$ | 3GL/200EO—H |
| 6 | 2-Br,4,6-di-$NO_2$ | 2-$CH_3$ | $CH_3$ | 4GL/95EO—H |
| 7 | 2-Br,4-CN | 2-$OCH_3$ | $C_2H_4C_6H_5$ | 4GL/40EO—H |
| 8 | 2-$CF_3$,4-$NO_2$ | 2-$OCH_3$,5-$CH_3$ | 1.5GL/20EO—H | 1.5GL/20EO—H |
| 9 | 2-$SO_2CH_3$,4-$NO_2$ | 3-$OCH_3$ | 2GL/50EO—H | 2GL/50EO—H |
| 10 | 2-Br,4-$CO_2C_2H_5$ | 3-$CF_3$ | 2GL/10EO—H | 2GL/10EO—H |
| 11 | 2-CN,4-$NO_2$ | 3-Cl | 2GL/25EO—H | 2GL/25EO—H |
| 12 | 2-CN,4-$NO_2$,6-Cl | H | $C_6H_{10}$-4-$CH_3$ | 4GL/20EO/5PO—H |
| 13 | 2-$OCH_3$,4-$NO_2$ | H | $C_6H_4$-4-$OCH_3$ | 3GL/40EO/10PO—H |
| 14 | 2,4-di-$SO_2CH_3$ | 3-$CH_3$ | $C_6H_4$-3-Cl | 2GL/16EO/2BO—H |
| 15 | 2,4-di-CN | 3-$CH_3$ | $C_6H_4$-3-$CO_2C_2H_5$ | 2GL/6EO/2GL/30EO—H |
| 16 | 2,6-di-Br,4-$SO_2CH_3$ | 3-$CH_3$ | $C_6H_4$-4-CN | 2EO/4GL/60EO—H |
| 17 | H | H | $C_2H_4C_6H_5$ | 2EO/4GL/75EO—H |
| 18 | 4-$CH_3$ | H | $C_2H_4OC_6H_5$ | 3EO/3GL/150EO—H |
| 19 | 4-$OCH_3$ | H | $C_2H_4SC_6H_5$ | 1EO/3GL/65EO—H |
| 20 | 2,5-di-Cl | H | $C_2H_4OC_2H_5$ | 3GL/55EO—H |
| 21 | 2,4-diBr | H | $C_2H_4SC_2H_5$ | 3GL/75EO—H |
| 22 | 2-F,4-$NO_2$ | 3-$OC_6H_5$ | $C_3H_6SO_2CH_3$ | 3GL/80EO—H |
| 23 | 2-I,6-CN,4-$NO_2$ | 3-$SC_6H_5$ | $C_2H_4OC_2H_4OC_2H_5$ | 5GL/150EO—H |
| 24 | 4-CN | 2,5-di-Cl | $C_2H_4CN$ | 4GL/100EO—H |
| 25 | 4-CHO | 2,5-di-$CH_3$ | $CH_2C_6H_{11}$ | 2GL/200EO—H |
| 26 | 2-$SO_2NHC_2H_5$,4-$NO_2$ | H | $CH_2CH_2Cl$ | 2GL/30EO—H |
| 27 | 2-$COC_6H_5$,4,6-di-$NO_2$ | 3-$CH_3$ | $C_4H_4OCOCH_3$ | 3GL/20EO—H |
| 28 | 2-$NO_2$,4-SCN | 3-$CH_3$ | $C_2H_4N(SO_2CH_3)CH_3$ | 3GL/40EO—H |
| 29 | 4-$SO_2C_6H_5$ | 3-$CH_3$ | $C_2H_4CON(C_2H_5)_2$ | 4GL/100EO—H |
| 30 | 4-$SO_2N(CH_3)C_6H_5$ | 3-$CH_3$ | $C_2H_4SO_2N(CH_3)_2$ | 5GL/50EO—H |
| 31 | 4-$SO_2N(C_6H_5)C_6H_{11}$ | 3-$CH_3$ | $C_2H_4SO_2N(CH_3)C_6H_5$ | 4GL/150EO—H |
| 32 | 4-$SO_2N(C_2H_5)_2$ | 3-$CH_3$ | $C_2H_4SO_2(CH_3)C_6H_{11}$ | 3GL/60EO/5PO—H |
| 33 | 2-$SCH_3$,4-$NO_2$ | 3-$CH_3$ | $C_2H_4N(SO_2C_6H_5)C_2H_5$ | 3GL/200EO—H |
| 34 | 2-Br,4-$SO_2NH_2$ | 3-$CH_3$ | $C_2H_4OCONHC_6H_5$ | 4GL/100EO—H |
| 35 | 4-$CONH_2$ | 3-$CH_3$ | $C_2H_4SO_2C_6H_5$ | 3GL/45EO—H |
| 36 | 2-$CONHC_2H_4OH$ | 3-$CH_3$ | $C_2H_4OCO_2C_2H_5$ | 3GL/90EO—H |
| 37 | 2,6-di-CN,4-$NO_2$ | 3-$CH_3$ | $C_2H_4SO_2CH=CH_2$ | 3GL/80EO—H |
| 38 | 2-$SO_2CH_3$,4,6-di-$NO_2$ | 3-$CH_3$ | $C_2H_4OCOC_6H_5$ | 3GL/40EO—H |
| 39 | 2-$SO_2C_6H_5$ | 3-$CH_3$ | $CH_2CH(OCH_3)CH_2OCH_3$ | 3GL/45EO—H |
| 40 | 3,5-di-$CO_2C_2H_5$ | 3-$CH_3$ | $C_2H_4OCON(CH_3)_2$ | 4GL/60EO/10PO—H |

TABLE 2

| Entry | $R_2$ | $R_{16}$ | $R_{25}$ | $R_{26}$ | $R_{27}$ | $R_{17}$ |
|---|---|---|---|---|---|---|
| 1 | 4-$NO_2$ | H | H | H | H | 2GL/100EO—H |
| 2 | 4-$SO_2CH_3$ | H | $CH_3$ | H | H | 1EO/3GL/75EO—H |
| 3 | 2-Cl,4-$NO_2$ | H | $C_2H_5$ | H | H | 3GL/60EO—H |
| 4 | 2-Cl,4-$SO_2CH_3$ | H | $CH_3$ | H | H | 5GL/15EO—H |
| 5 | 2,4-di-$NO_2$ | H | $CH_3$ | $CH_3$ | $CH_3$ | 3GL/100EO/5PO—H |
| 6 | 2-Br,4,6-di-$NO_2$ | 7-$CH_3$ | $CH_3$ | H | H | 4GL/50EO—H |
| 7 | 2-Br,4-CN | 7-$CH_3$ | $CH_3$ | H | H | 2GL/5EO/3GL/50EO—H |
| 8 | 2-$CF_3$,4-$NO_2$ | 7-$CH_3$ | $CH_3$ | $CH_3$ | $CH_3$ | 2GL/140EO—H |
| 9 | 2-$SO_2CH_3$,4-$NO_2$ | 5-$CH_3$,8-$OCH_3$ | $CH_3$ | H | H | 3GL/40EO—H |
| 10 | 2-Br,4-$CO_2C_2H_5$ | 5-$CH_3$,8-$OCH_3$ | $CH_3$ | $CH_3$ | $CH_3$ | 2GL/90EO—H |
| 11 | 2-CN,4-$NO_2$ | 8-$OCH_3$ | $CH_3$ | H | H | 2GL/200EO—H |
| 12 | 2-CN,4-$NO_2$,6-Cl | 8-$OCH_3$ | $CH_3$ | $CH_3$ | $CH_3$ | 4GL/250EO—H |
| 13 | 2-$OCH_3$,4-$NO_2$ | 5,8-di-$OCH_3$ | $CH_3$ | H | H | 3GL/40EO—H |

TABLE 2-continued

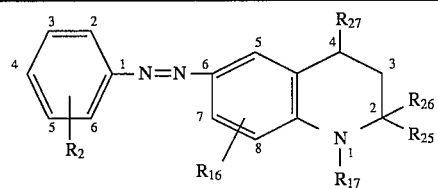

| Entry | $R_2$ | $R_{16}$ | $R_{25}$ | $R_{26}$ | $R_{27}$ | $R_{17}$ |
|---|---|---|---|---|---|---|
| 14 | 2,4-di-$SO_2CH_3$ | 5,8-di-$OCH_3$ | $CH_3$ | H | H | 4GL/150EO—H |
| 15 | 2,4-di-CN | 7-Cl | $CH_3$ | H | H | 2GL/200EO—H |
| 16 | 2,6-di-Br,4-$SO_2CH_3$ | 7-$OCH_3$ | $CH_3$ | H | H | 2GL/300EO—H |
| 17 | 4-CN | 7-$OC_2H_5$ | $CH_3$ | H | H | 3GL/400EO—H |
| 18 | 4-$CH_3$ | 7-$CF_3$ | $CH_3$ | H | H | 3GL/75EO—H |
| 19 | 4-$SO_2C_6H_5$ | 7-$CH_3$ | $CH_3$ | H | H | $C_2H_4SO_2NHC_6H_4$—O-3GL/75EO—H |
| 20 | 2,5-di-Cl | 7-$CH_3$ | $CH_3$ | H | H | $CH_2C_6H_4SO_2C_6H_4$—O-4GL/50EO—H |

TABLE 3

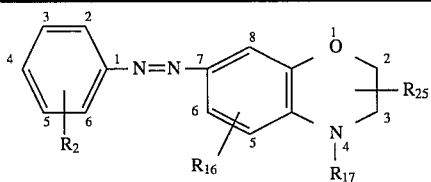

| Entry | $R_2$ | $R_{16}$ | $R_{25}$ | $R_{17}$ |
|---|---|---|---|---|
| 1 | 4-$NO_2$ | H | H | 2GL/100EO—H |
| 2 | 4-$SO_2CH_3$ | H | 2-$CH_3$ | 1PO/4GL/50EO—H |
| 3 | 2,4-diBr | H | 2-$CH_3$ | 3GL/65EO—H |
| 4 | 2-Cl,4-$NO_2$ | H | H | 3GL/40EO—H |
| 5 | 2-Br,6-CN,4-$NO_2$ | 6-$CH_3$ | H | 3GL/70EO—H |
| 6 | 4-CN | 6-$CH_3$ | 3-$CH_3$ | 2GL/150EO—H |
| 7 | 2-Br,4-CN | 6-$CH_3$ | 3-$CH_3$ | 2GL/200EO—H |
| 8 | 4-$SO_2CH_3$ | 6-$CH_3$ | 3-$CH_3$ | 3GL/80EO—H |
| 9 | 2-$COC_6H_5$,4,6-di-$NO_2$ | 6-$CH_3$ | H | 3GL/50EO/5PO—H |
| 10 | 2-$NO_2$,4-SCN | H | H | 3GL/150EO/50PO—H |
| 11 | 4-$SO_2C_6H_5$ | H | 3-$CH_3$ | 2GL/60EO—H |
| 12 | 4-$SO_2N(CH_3)C_6H_5$ | 6-$OCH_3$ | 3-$CH_3$ | 2GL/90EO—H |
| 13 | 4-$SO_2N(C_6H_5)C_6H_{11}$ | 6-Cl | 3-$CH_3$ | 3GL/25EO/5BO—H |
| 14 | 4-$SO_2N(C_2H_5)_2$ | H | H | 3GL/200EO—H |
| 15 | 2-$SCH_3$,4-$NO_2$ | 6,8-di-$CH_3$ | 3-$CH_3$ | 3GL/30EO—H |
| 16 | 2,4-di-CN | H | 3-$CH_3$ | 2GL/45EO—H |
| 17 | 2-CN,4-$NO_2$ | 6-$CH_3$ | 3-$CH_3$ | 3GL/250EO—H |
| 18 | 2-$CONHC_2H_4OH$ | H | 3-$CH_3$ | 3GL/65EO—H |
| 19 | 2,6-di-CN,4-$NO_2$ | H | 3-$CH_3$ | 2GL/35EO—H |
| 20 | 2-$SO_2CH_3$,4,6-di-$NO_2$ | H | 3-$CH_3$ | 3GL/85EO—H |
| 21 | 2-$SO_2C_6H_5$ | 6-$CH_3$ | 3-$CH_3$ | $C_2H_4SO_2N(CH_3)$-3GL/200EO—H |
| 22 | 3,5-di-$CO_2C_2H_5$ | 6-$CH_3$ | 3-$CH_3$ | $C_2H_4S$-2GL/150EO—H |

TABLE 4

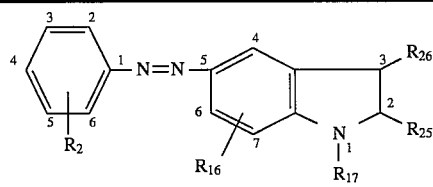

| Entry | $R_2$ | $R_{16}$ | $R_{25}$ | $R_{26}$ | $R_{17}$ |
|---|---|---|---|---|---|
| 1 | 4-$NO_2$ | H | H | H | 2GL/50EO—H |
| 2 | 4-$SO_2CH_3$ | H | $CH_3$ | H | 3GL/70EO—H |

TABLE 4-continued

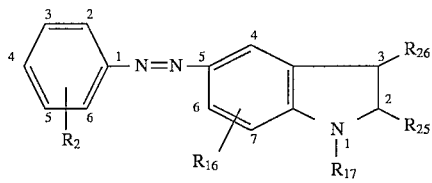

| Entry | $R_2$ | $R_{16}$ | $R_{25}$ | $R_{26}$ | $R_{17}$ |
|---|---|---|---|---|---|
| 3 | 2-Cl,4-NO$_2$ | H | CH$_3$ | H | 3GL/55EO—H |
| 4 | 2-Cl,4-SO$_2$CH$_3$ | H | CH$_3$ | H | 3GL/65EO—H |
| 5 | 2,4-di-NO$_2$ | H | CH$_3$ | H | 3GL/95EO—H |
| 6 | 2-Br,4,6-di-NO$_2$ | 6-CH$_3$ | CH$_3$ | CH$_3$ | 3GL/125EO—H |
| 7 | 2-Br,4-CN | 6-CH$_3$ | CH$_3$ | H | 2GL/200EO—H |
| 8 | 2-CF$_3$,4-NO$_2$ | 6-CH$_3$ | CH$_3$ | H | 2GL/80EO—H |
| 9 | 2-SO$_2$CH$_3$,4-NO$_2$ | 4,6-di-CH$_3$ | CH$_3$ | H | 3GL/50EO/10PO—H |
| 10 | 2-Br,4-CO$_2$C$_2$H$_5$ | 6-OCH$_3$ | CH$_3$ | H | 2GL/40EO—H |
| 11 | 2-CN,4-NO$_2$ | 6-Cl | CH$_3$ | H | 2GL/45EO—H |
| 12 | 2-CN,4-NO$_2$,6-Cl | 6-C$_2$H$_5$ | CH$_3$ | H | 3GL/175EO—H |
| 13 | 2-OCH$_3$,4-NO$_2$ | 6-CH$_3$ | CH$_3$ | H | 3GL/75EO—H |
| 14 | 2,4-di-SO$_2$CH$_3$ | 6-CH$_3$ | CH$_3$ | H | 3GL/100EO—H |
| 15 | 2,4-di-CN | H | CH$_3$ | H | 2GL/150EO—H |
| 16 | 2,6-di-Br,4-SO$_2$CH$_3$ | H | CH$_3$ | H | 3GL/130EO—H |
| 17 | 4-CN | H | CH$_3$ | H | 2GL/90EO—H |
| 18 | 4-CH$_3$ | H | CH$_3$ | H | C$_2$H$_4$OC$_6$H$_4$-3GL/80EO—H |
| 19 | 4-SO$_2$C$_6$H$_5$ | H | CH$_3$ | H | CH$_2$CH(CH$_3$)O-3GL/130EO—H |
| 20 | 2,5-di-Cl | H | CH$_3$ | H | C$_3$H$_6$O-2GL/60EO—H |

TABLE 5

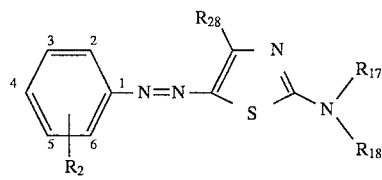

| Entry | $R_2$ | $R_{17}$ | $R_{18}$ | $R_{28}$ |
|---|---|---|---|---|
| 1 | 4-NO$_2$ | 2GL/50EO—H | 2GL/50EO—H | C$_6$H$_5$ |
| 2 | 4-SO$_2$CH$_3$ | 1.5GL/100EO—H | 1.5GL/100EO—H | C$_6$H$_5$ |
| 3 | 2-Cl,4-NO$_2$ | 3GL/75EO—H | 3GL/75EO—H | CH$_3$ |
| 4 | 2-Cl,4-SO$_2$CH$_3$ | 2GL/25EO—H | 2GL/25EO—H | CH$_3$ |
| 5 | 2,4-di-NO$_2$ | 2GL/40EO—H | 2GL/40EO—H | C$_6$H$_{11}$ |
| 6 | 4-CN | 2GL/30EO—H | 2GL/30EO—H | C$_6$H$_4$-4-CH$_3$ |
| 7 | 2-Br,4-CN | C$_6$H$_5$ | 2GL/200EO—H | C$_6$H$_4$-4-CH$_3$ |
| 8 | 2-CF$_3$,4-NO$_2$ | CH$_2$C$_6$H$_5$ | 3GL/150EO—H | C$_6$H$_4$-4-OCH$_3$ |
| 9 | 2-SO$_2$CH$_3$,4-NO$_2$ | CH$_3$ | 3GL/125EO—H | C$_6$H$_4$-4-Cl |
| 10 | 2-Br,4-CO$_2$C$_2$H$_5$ | CH$_3$ | 2GL/75EO—H | C$_6$H$_5$ |
| 11 | 2-CN,4-NO$_2$ | 2GL/25EO—H | 2GL/25EO—H | C$_6$H$_5$ |
| 12 | 2-CN,4-NO$_2$,6-Cl | CH$_3$ | 4GL/45EO—H | CH$_3$ |
| 13 | 2-OCH$_3$,4-NO$_2$ | C$_2$H$_5$ | 3GL/40EO/4BO—H | 2-thienyl |
| 14 | 2,4-di-SO$_2$CH$_3$ | CH$_3$ | 3GL/65EO—H | 5-Cl-2-thienyl |
| 15 | 2,4-di-CN | CH$_3$ | C$_6$H$_4$-4-C$_2$H$_4$O-3GL/100EO—H | CH$_3$ |
| 16 | 2,6-di-Br,4-SO$_2$CH$_3$ | CH$_3$ | C$_2$H$_4$O-2GL/80EO—H | CH$_3$ |
| 17 | 2,4-di-Br | H | C$_2$H$_4$N(SO$_2$CH$_3$)-3GL/100EO—H | C$_6$H$_5$ |
| 18 | 4-CH$_3$ | 2GL/100EO—H | 2GL/100EO—H | C$_6$H$_5$ |
| 19 | 4-OCH$_3$ | 2GL/45EO—H | 2GL/45EO—H | CH$_3$ |
| 20 | 2,5-di-Cl | C$_2$H$_5$ | 3GL/250EO—H | C$_6$H$_5$ |

TABLE 6

| Entry | R$_2$ | R$_{16}$ | R$_{17}$ | X | R$_{29}$ |
|---|---|---|---|---|---|
| 1 | 4-NO$_2$ | H | 2GL/100EO—H | CB* | H |
| 2 | 4-SO$_2$CH$_3$ | H | 3GL/150EO—H | CB* | H |
| 3 | 2-Cl,4-NO$_2$ | 8-CH$_3$ | 3GL/200EO—H | CB* | H |
| 4 | 2-Cl,4-SO$_2$CH$_3$ | 8-CH$_3$ | 3GL/175EO—H | CB* | H |
| 5 | 2,4-di-NO$_2$ | 8-CH$_3$ | 3GL/75EO—H | CB* | 4-OCH$_3$ |
| 6 | 2-Br,4,6-di-NO$_2$ | H | 2GL/50EO—H | O | 3,4-di-Cl |
| 7 | 2-Br,4-CN | H | 2GL/50EO/5PO—H | O | 2-Cl |
| 8 | 2-CF$_3$,4-NO$_2$ | 8-CH$_3$ | 2GL/60EO/10PO—H | O | 3-OCH$_3$ |
| 9 | 2-SO$_2$CH$_3$,4-NO$_2$ | 8-CH$_3$ | 3GL/90EO—H | S | H |
| 10 | 2-Br,4-CO$_2$C$_2$H$_5$ | 8-CH$_3$ | 2GL/100EO—H | S | H |
| 11 | 2-CN,4-NO$_2$ | 5,8-di-CH$_3$ | 2GL/140EO—H | S | H |
| 12 | 2-CN,4-NO$_2$,6-Cl | H | 3GL/160EO—H | S | H |
| 13 | 2-OCH$_3$,4-NO$_2$ | 8-CH$_3$ | 3GL/180EO—H | O | H |
| 14 | 2,4-di-SO$_2$CH$_3$ | 8-CH$_3$ | 3GL/50EO—H | O | 4-OCH$_3$ |
| 15 | 2,4-di-CN | H | 3GL/80EO—H | O | H |
| 16 | 2,6-di-Br,4-SO$_2$CH$_3$ | H | 6GL/400EO—H | O | H |
| 17 | 4-CN | H | 4GL/200EO—H | O | H |
| 18 | 4-CH$_3$ | 8-CH$_3$ | 5GL/100EO—H | O | H |
| 19 | 4-SO$_2$C$_6$H$_5$ | 8-CH$_3$ | C$_2$H$_4$O-2GL/75EO—H | O | H |
| 20 | 2,5-di-Cl | 8-CH$_3$ | 4GL/60EO—H | O | H |

*covalent bond

TABLE 7

| Entry | R$_2$ | R$_{16}$ | R$_{17}$ | R$_{18}$ |
|---|---|---|---|---|
| 1 | 4-NO$_2$ | H | 2GL/50EO—H | 2GL/50EO—H |
| 2 | 4-SO$_2$CH$_3$ | H | C$_2$H$_5$ | 4GL/100EO—H |
| 3 | 2-Cl,4-NO$_2$ | 2-CH$_3$ | CH$_2$CH=CH$_2$ | 3GL/150EO—H |
| 4 | 2-Cl,4-SO$_2$CH$_3$ | 2-CH$_3$ | 3GL/40EO—H | 3GL/40EO—H |
| 5 | 4-CN | 5-O-3GL/150EO—H | C$_2$H$_5$ | H |
| 6 | 2-Br,4,6-di-NO$_2$ | 2-CH$_3$ | CH$_3$ | 4GL/200EO—H |
| 7 | 2-Br,4-CN | 2-OCH$_3$ | C$_2$H$_4$C$_6$H$_5$ | 2GL/30EO—H |
| 8 | 2-CF$_3$,4-NO$_2$ | 2-OCH$_3$,6-CH$_3$ | 2GL/20EO—H | 2GL/20EO—H |
| 9 | 2-SO$_2$CH$_3$,4-NO$_2$ | 3-OCH$_3$ | 3GL/25EO—H | 3GL/25EO—H |
| 10 | 2-Br,4-CO$_2$C$_2$H$_5$ | H | H | C$_2$H$_4$SO$_2$NH-2GL/100EO—H |
| 11 | 2-CN,4-NO$_2$ | H | 2GL/35EO—H | 2GL/35EO—H |
| 12 | 2-CN,4-NO$_2$,6-Cl | H | C$_6$H$_{10}$-4-CH$_3$ | 4GL/70EO—H |
| 13 | 2-OCH$_3$,4-NO$_2$ | H | C$_6$H$_4$-4-OCH$_3$ | 3GL/125EO—H |
| 14 | 2,4-di-SO$_2$CH$_3$ | 2-CH$_3$ | C$_6$H$_4$-3-Cl | 4GL/200EO—H |
| 15 | 2,4-di-CN | 2-CH$_3$ | 2GL/50EO—H | 2GL/50EO—H |
| 16 | 2,6-di-Br,4-SO$_2$CH$_3$ | 5-OCH$_3$ | 3GL/75EO—H | 3GL/75EO—H |
| 17 | H | H | 2GL/55EO—H | 2GL/55EO—H |
| 18 | 4-CH$_3$ | H | C$_2$H$_4$OC$_6$H$_5$ | 3GL/150EO—H |
| 19 | 4-OCH$_3$ | H | C$_2$H$_4$SC$_6$H$_5$ | 2.5GL/125EO—H |
| 20 | 2,5-di-Cl | H | C$_2$H$_4$OC$_2$H$_5$ | 3GL/90EO—H |

TABLE 8

| Entry | R₂ | R₁₇ | R₁₈ | R₃₀ | R₃₁ |
|---|---|---|---|---|---|
| 1 | 4-NO₂ | 2GL/50EO—H | 2GL/50EO—H | H | H |
| 2 | 4-SO₂CH₃ | 2GL/20EO—H | 2GL/20EO—H | H | H |
| 3 | 2-Cl,4-NO₂ | 2GL/30EO—H | 2GL/30EO—H | H | CH₃ |
| 4 | 2-Cl,4-SO₂CH₃ | 2GL/75EO—H | 2GL/75EO—H | H | C₆H₅ |
| 5 | 4-SO₂N(CH₃)-3GL/100EO—H | H | H | H | CH₃ |
| 6 | 4-SO₂-4GL/90EO—H | H | H | CO₂C₂H₅ | CH₃ |
| 7 | 3-O-4GL/150EO—H | H | H | CN | CH₃ |
| 8 | 3-S-3GL/125EO—H | H | C₂H₅ | SO₂CH₃ | CH₃ |
| 9 | 4-N=N—C₆H₄-4-O-3GL/80EO—H | H | CH₃ | CONH₂ | CH₃ |
| 10 | 4-N=N—C₆H₄-4-S-3GL/100EO—H | H | H | SO₂C₆H₅ | C₆H₅ |
| 11 | 2-CN,4-NO₂ | 3GL/140EO—H | CH₃ | CONHC₂H₅ | CH₃ |
| 12 | 2-CN,4-NO₂,6-Cl | 3GL/60EO—H | 3GL/60EO—H | H | C₆H₅ |
| 13 | 2-OCH₃,4-NO₂ | 3GL/120EO—H | C₂H₅ | CONHC₂H₄OH | C₆H₅ |
| 14 | 2,4-di-SO₂CH₃ | 2GL/45EO—H | 2GL/45EO—H | H | CH₃ |
| 15 | 2,4-di-CN | 3GL/125EO—H | CH₃ | H | CH₃ |
| 16 | 2,6-di-Br,4-SO₂2GL/75EO—H | CH₂C₆H₅ | H | H | C₆H₅ |
| 17 | 4-CN | 2GL/60EO—H | 2GL/60EO—H | H | C₆H₅ |
| 18 | 4-CH₃ | 3GL/30EO—H | 3GL/30EO—H | H | CH₃ |
| 19 | 4-SO₂C₆H₅ | 3GL/40EO—H | 5GL/40EO—H | H | CH₃ |
| 20 | 2,5-di-Cl | 2GL/30EO/5PO—H | CH₃ | H | C₆H₅ |

TABLE 9

| Entry | R₂ | R₁₆ | R₃₂ | R₃₃ |
|---|---|---|---|---|
| 1 | 4-NO₂ | H | O-2GL/100EO—H | H |
| 2 | 4-SO₂CH₃ | H | O-4GL/150EO—H | H |
| 3 | 2-Cl,4-NO₂ | 2-CH₃ | O-3GL/200EO—H | H |
| 4 | 2-Cl,4-SO₂CH₃ | 2-CH₃ | O-5GL/125EO—H | H |
| 5 | 2,4-di-NO₂ | 2-CH₃ | O-3GL/75EO—H | H |
| 6 | 2-Br,4,6-di-NO₂ | 2-OCH₃ | O-4GL/50EO/5PO—H | CH₃ |
| 7 | 4-CN | 2-Cl | O-3GL/60EO—H | CH₃ |
| 8 | 2-CF₃,4-NO₂ | 2-CH₃ | O-3GL/30EO—H | O-3GL/30EO—H |
| 9 | 2-SO₂CH₃,4-NO₂ | 2-OCH₃ | O-3GL/40EO—H | O-3GL/40EO—H |
| 10 | 2-Br,4-CO₂C₂H₅ | 2-CH₃ | O-2GL/25EO—H | O-2GL/25EO—H |
| 11 | 2-CN,4-NO₂ | 2,9-di-CH₃ | O-2GL/75EO/25PO—H | OCH₃ |
| 12 | 2-CN,4-NO₂,6-Cl | H | O-3GL/100EO/10BO—H | OCH₃ |
| 13 | 2-OCH₃,4-NO₂ | H | O-3GL/200EO—H | Cl |
| 14 | 2,4-di-SO₂CH₃ | 2-CH₃ | O-4GL/35EO—H | Cl |
| 15 | 2,4-di-CN | 2-CH₃ | O-2GL/55EO—H | H |
| 16 | 2,6-di-Br,4-SO₂CH₃ | 2-CH₃ | O-2GL/40EO—H | O-2GL/40EO—H |
| 17 | O-4GL/100EO—H | H | H | H |
| 18 | O-3GL/120EO—H | H | H | H |
| 19 | S-2GL/200EO—H | H | H | Cl |
| 20 | S-3GL/400EO—H | H | H | C₂H₅ |

TABLE 10

| Entry | R₃ | R₁₆ | R₁₇ | R₁₈ |
|---|---|---|---|---|
| 1 | 4-$CH_3$ | H | $C_2H_5$ | 2GL/30EO—H |
| 2 | 4-$C_6H_5$ | H | $C_6H_{11}$ | 3GL/45EO—H |
| 3 | 4-N=N—$C_6H_5$ | 3-$CH_3$ | $CH_2CH=CH_2$ | 3GL/55EO—H |
| 4 | 4-$CH_3$,5-$CO_2C_2H_5$ | 3-$CH_3$ | 5GL/5PO/5EO—H | 2GL/75EO—H |
| 5 | 5-CN | 3-$CH_3$ | $CH_2C_6H_5$ | 3GL/125EO—H |
| 6 | 5-CHO | 2-$CH_3$ | $CH_3$ | 2GL/150EO—H |
| 7 | 5-$SO_2CH_3$ | 2-$OCH_3$ | $C_2H_4C_6H_5$ | 2GL/175EO—H |
| 8 | 5-$NO_2$ | 2-$OCH_3$,5-$CH_3$ | 2GL/125EO—H | 2GL/125EO—H |
| 9 | 4-$SO_2CH_3$,5-$NO_2$ | 3-$OCH_3$ | 3GL/50EO—H | 3GL/50EO—H |
| 10 | 5-$COCH_3$ | 3-$CF_3$ | 2GL/100EO—H | 2GL/100EO—H |
| 11 | 5-$COC_6H_5$ | 3-Cl | 2GL/60EO—H | 2GL/60EO—H |
| 12 | 5-Cl | H | $C_6H_{10}$-4-$CH_3$ | 4GL/40EO/4PO—H |
| 13 | 5-Br | H | $C_6H_4$-4-$OCH_3$ | 3GL/70EO—H |
| 14 | 4-$CF_3$ | 3-$CH_3$ | $C_6H_4$-3-Cl | 4GL/80EO—H |
| 15 | 5-SCN | 3-$CH_3$ | $C_6H_4$-3-$CO_2C_2H_5$ | 3GL/95EO—H |
| 16 | 5-$SO_2N(C_2H_5)_2$ | 3-$CH_3$ | $C_6H_4$-4-CN | 3GL/125EO—H |
| 17 | 5-$CON(CH_3)_2$ | H | $C_2H_4C_6H_5$ | 3GL/200EO—H |
| 18 | 5-$CONH_2$ | H | $C_2H_4OC_6H_5$ | 3GL/125EO—H |
| 19 | 5-$CONHC_2H_4OH$ | H | $C_2H_4SC_6H_5$ | 2.5GL/150EO—H |
| 20 | 5-$SO_2NHC_2H_4OH$ | H | $C_2H_4OC_2H_5$ | 3GL/45EO—H |

TABLE 11

| Entry | R₄ | R₁₆ | R₁₇ | R₁₈ |
|---|---|---|---|---|
| 1 | H | H | $C_2H_5$ | 2GL/125EO—H |
| 2 | 4-Cl | H | $C_6H_{11}$ | 4GL/200EO—H |
| 3 | 5,6-di-Cl | 3-$CH_3$ | $CH_2CH=CH_2$ | 3GL/150EO—H |
| 4 | 6-$CH_3$ | 3-$CH_3$ | 2GL/50EO—H | 2GL/50EO—H |
| 5 | 6-$OCH_3$ | 3-$CH_3$ | $CH_2C_6H_5$ | 3GL/150EO—H |
| 6 | 6-CN | 2-$CH_3$ | $CH_3$ | 4GL/100EO—H |
| 7 | 6-$CO_2CH_3$ | 2-$OCH_3$ | $C_2H_4C_6H_5$ | 2GL/80EO—H |
| 8 | 6-$SO_2CH_3$ | 2-$OCH_3$,5-$CH_3$ | 2GL/25EO—H | 2GL/25EO—H |
| 9 | 4-$CF_3$ | 3-$OCH_3$ | 3GL/20EO—H | 3GL/20EO—H |
| 10 | 6-$SO_2C_6H_5$ | 3-$CF_3$ | 2GL/15EO—H | 2GL/15EO—H |
| 11 | 6-$COC_6H_5$ | 3-Cl | 2GL/40EO—H | 2GL/40EO—H |
| 12 | 6-$COCH_3$ | H | $C_6H_{10}$-4-$CH_3$ | 4GL/50EO—H |
| 13 | 6-$CON(CH_3)_2$ | H | $C_6H_4$-4-$OCH_3$ | 3GL/75EO—H |
| 14 | 6-$SO_2N(C_2H_5)_2$ | 3-$CH_3$ | $C_6H_4$-3-Cl | 4GL/60EO—H |
| 15 | 6-SCN | 3-$CH_3$ | $C_6H_4$-3-$CO_2C_2H_5$ | 6GL/70EO—H |
| 16 | 6-$SCH_3$ | 3-$CH_3$ | $C_6H_4$-4-CN | 2GL/50EO—H |
| 17 | 6-$SC_2H_4CN$ | H | $C_2H_4C_6H_5$ | 4GL/30EO—H |
| 18 | 6-$SO_2C_2H_4CN$ | H | $C_2H_4OC_6H_5$ | 3GL/100EO—H |
| 19 | 6-$NHCOCH_3$ | H | $C_2H_4SC_6H_5$ | 2.5GL/200EO—H |
| 20 | 6-N=N-$C_6H_5$ | H | $C_2H_4OC_2H_5$ | 3GL/150EO—H |
| 21 | 6-O-3GL/100EO/5PO—H | H | $C_2H_4SC_2H_5$ | 3GL/50EO—H |
| 22 | 6-S-4GL/40EO/3BO—H | H | $C_3H_6SO_2CH_3$ | 3GL/75EO—H |
| 23 | 5-$NO_2$ | H | $C_2H_4OC_2H_4OC_2H_5$ | 3GL/200EO—H |
| 24 | 6-Cl,5-$NO_2$ | H | $C_2H_4CN$ | 3GL/125EO—H |
| 25 | 4-CHO | 2,5-di-$CH_3$ | $CH_2C_6H_{11}$ | 4GL/100EO—H |

TABLE 12

| Entry | $R_5$ | $R_{16}$ | $R_{17}$ | $R_{18}$ |
|---|---|---|---|---|
| 1 | H | H | $C_2H_5$ | 2GL/100EO—H |
| 2 | $CH_3$ | H | $C_6H_{11}$ | 2GL/75EO—H |
| 3 | $C_6H_5$ | 3-$CH_3$ | $CH_2CH=CH_2$ | 3GL/60EO—H |
| 4 | $C_2H_5S$ | 3-$CH_3$ | 2GL/40EO—H | 2GL/40EO—H |
| 5 | $NCCH_2S$ | 3-$CH_3$ | $CH_2C_6H_5$ | 3GL/50EO—H |
| 6 | $C_2H_5SO_2$ | 2-$CH_3$ | $CH_3$ | 4GL/150EO—H |
| 7 | $C_6H_5O$ | 2-$OCH_3$ | $C_2H_4C_6H_5$ | 2GL/125EO—H |
| 8 | $CH_2=CHCH_2S$ | 2-$OCH_3$,5-$CH_3$ | 2GL/75EO—H | 2GL/75EO—H |
| 9 | $C_6H_5CH_2$ | 3-$OCH_3$ | 3GL/30EO—H | 3GL/30EO—H |
| 10 | Cl | 3-$CF_3$ | 2GL/90EO—H | 2GL/90EO—H |
| 11 | NCS | 3-Cl | 2GL/50EO—H | 2GL/50EO—H |
| 12 | $SO_2N(C_2H_5)_2$ | H | $C_6H_{10}$-4-$CH_3$ | 3GL/90EO—H |
| 13 | $CH_3CONH$ | H | $C_6H_4$-4-$OCH_3$ | 3GL/80EO—H |
| 14 | $C_6H_{11}$ | 3-$CH_3$ | $C_6H_4$-3-Cl | 3GL/175EO—H |
| 15 | $C_6H_4$-4-$CO_2CH_3$ | 3-$CH_3$ | $C_6H_4$-3-$CO_2C_2H_5$ | 4GL/200EO—H |
| 16 | $SO_2NH_2$ | 3-$CH_3$ | $C_6H_4$-4-CN | 2GL/60EO—H |
| 17 | $CO_2C_4H_9$-n | H | $C_2H_4C_6H_5$ | 3GL/150EO—H |
| 18 | Br | H | $C_2H_4OC_6H_5$ | 3GL/140EO—H |
| 19 | S-4GL/10PO/10EO—H | H | $C_2H_4SC_6H_5$ | 2.5GL/75EO—H |
| 20 | $SC_2H_4O$-3GL/10PO/5EO—H | H | $C_2H_4OC_2H_5$ | 3GL/40EO—H |

TABLE 13

| Entry | $R_6$ | $R_{16}$ | $R_{17}$ | $R_{18}$ |
|---|---|---|---|---|
| 1 | H | H | $C_2H_5$ | 2GL/100EO—H |
| 2 | $CH_3$ | H | $C_6H_{11}$ | 4GL/125EO—H |
| 3 | $C_6H_5$ | 3-$CH_3$ | $CH_2CH=CH_2$ | 3GL/75EO—H |
| 4 | $CH_3S$ | 3-$CH_3$ | 2GL/50EO—H | 2GL/50EO—H |
| 5 | Cl | 3-$CH_3$ | $CH_2C_6H_5$ | 3GL/125EO—H |
| 6 | $C_6H_4$-2-CN | 2-$CH_3$ | $CH_3$ | 2GL/60EO—H |
| 7 | $C_2H_5SO_2$ | 2-$OCH_3$ | $C_2H_4C_6H_5$ | 2GL/200EO—H |
| 8 | NC | 2-$OCH_3$,5-$CH_3$ | 2GL/30EO—H | 2GL/30EO—H |
| 9 | $CH_3O_2CC_2H_5$ | 3-$OCH_3$ | 3GL/40EO—H | 3GL/40EO—H |
| 10 | $C_6H_5CH_2S$ | 3-$CF_3$ | 2GL/50EO—H | 2GL/50EO—H |
| 11 | $C_2H_5SO_2$ | 3-Cl | 2GL/75EO—H | 2GL/75EO—H |
| 12 | H | H | $C_6H_{10}$-4-$CH_3$ | 3GL/140EO—H |
| 13 | $C_2H_5$ | H | $C_6H_4$-4-$OCH_3$ | 3GL/160EO—H |
| 14 | $C_6H_5CH_2S$ | 3-$CH_3$ | $C_6H_4$-3-Cl | 2GL/100EO—H |
| 15 | $C_2H_5S$ | 3-$CH_3$ | $C_6H_4$-3-$CO_2C_2H_5$ | 3GL/80EO—H |
| 16 | Br | 3-$CH_3$ | $C_6H_4$-4-CN | 3GL/50EO—H |
| 17 | H | H | $C_2H_4C_6H_5$ | 4GL/75EO—H |
| 18 | H | H | $C_2H_4OC_6H_5$ | 3GL/50EO—H |
| 19 | $CH_3$ | H | $C_2H_4SC_6H_5$ | 2GL/100EO/10PO—H |
| 20 | $C_6H_5$ | H | $C_2H_4OC_2H_5$ | 3GL/250EO—H |

TABLE 14

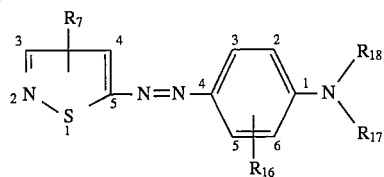

| Entry | $R_7$ | $R_{16}$ | $R_{17}$ | $R_{18}$ |
|---|---|---|---|---|
| 1 | H | H | $C_2H_5$ | 2GL/100EO—H |
| 2 | 3-$CH_3$ | H | $C_6H_{11}$ | 4GL/75EO—H |
| 3 | 3-$C_6H_5$ | 3-$CH_3$ | $CH_2CH=CH_2$ | 3GL/50EO—H |
| 4 | 3-$CH_3$,4-Cl | 3-$CH_3$ | 2GL/30EO—H | 2GL/30EO—H |
| 5 | 3-$CH_3$,4-Br | 3-$CH_3$ | $CH_2C_6H_5$ | 3GL/100EO—H |
| 6 | 3-$CH_3$,4-CN | 2-$CH_3$ | $CH_3$ | 4GL/200EO—H |
| 7 | 3-$CH_3$,4-$SO_2CH_3$ | 2-$OCH_3$ | $C_2H_4C_6H_5$ | 2GL/250EO—H |
| 8 | 3-$CH_3$,4-$SC_2H_5$ | 2-$OCH_3$,5-$CH_3$ | 2GL/20EO—H | 2GL/20EO—H |
| 9 | 3-$CH_3$,4-$SO_2C_6H_5$ | 3-$OCH_3$ | 2GL/40EO—H | 2GL/40EO—H |
| 10 | 3-$CH_3$,4-$NO_2$ | 3-$CF_3$ | 2GL/75EO—H | 2GL/75EO—H |
| 11 | 3-$CH_3$,4-$CO_2C_2H_5$ | 3-Cl | 2GL/15EO—H | 2GL/15EO—H |
| 12 | 3-$CH_3$,4-$SC_2H_4OH$ | H | $C_6H_{10}$-4-$CH_3$ | 4GL/50EO—H |
| 13 | 3-$CH_3$,4-$S_6H_5$ | H | $C_6H_4$-4-$OCH_3$ | 3GL/40EO—H |
| 14 | 3-Cl,4-CN | 3-$CH_3$ | $C_6H_4$-3-Cl | 4GL/150EO—H |
| 15 | 3-$CH_3$,4-$CONHCH_3$ | 3-$CH_3$ | $C_6H_4$-3-$CO_2C_2H_5$ | 3GL/65EO—H |
| 16 | 3-$CH_3$,4-$OC_6H_5$ | 3-$CH_3$ | $C_6H_4$-4-CN | 2GL/40EO—H |
| 17 | 3-$CH_3$,4-$OCH_3$ | H | $C_2H_4C_6H_5$ | 2GL/90EO—H |
| 18 | 3-$C_2H_5$ | H | $C_2H_4OC_6H_5$ | 3GL/100EO—H |
| 19 | 3-$CH_3$,4-SCN | H | $C_2H_4SC_6H_5$ | 2GL/55EO—H |
| 20 | 3-$CH_3$,4-$SCH_3$ | H | $C_2H_4OC_2H_5$ | 2GL/30EO—H |

TABLE 15

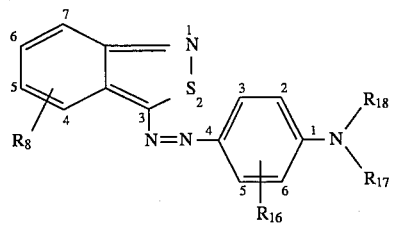

| Entry | $R_8$ | $R_{16}$ | $R_{17}$ | $R_{18}$ |
|---|---|---|---|---|
| 1 | H | H | $C_2H_5$ | 2GL/30EO—H |
| 2 | 5-Cl | H | $C_6H_{11}$ | 2GL/50EO—H |
| 3 | 5-Br | 3-$CH_3$ | $CH_2CH=CH_2$ | 3GL/70EO—H |
| 4 | 5-$CH_3$ | 3-$CH_3$ | 2GL/50EO—H | 2GL/50EO—H |
| 5 | 5-$CH_3$ | 3-$CH_3$ | $CH_2C_6H_5$ | 3GL/150EO—H |
| 6 | 6-Cl | 2-$CH_3$ | $CH_3$ | 2GL/200EO—H |
| 7 | 6-Cl | 2-$OCH_3$ | $C_2H_4C_6H_5$ | 2GL/100EO—H |
| 8 | 5-$NO_2$ | 2-$OCH_3$,5-$CH_3$ | 2GL/15EO—H | 2GL/15EO—H |
| 9 | 5-Cl,7-$SO_2N(CH_3)_2$ | 3-$OCH_3$ | 2GL/20EO—H | 3GL/20EO—H |
| 10 | 5-$OCH_3$ | 3-$CF_3$ | 2GL/40EO—H | 2GL/40EO—H |
| 11 | 5-Br,7-$SO_2NH_2$ | 3-Cl | 2GL/60EO—H | 2GL/60EO—H |
| 12 | 5-$SO_2CH_3$ | H | $C_6H_{10}$-4-$CH_3$ | 4GL/125EO—H |
| 13 | 5-$CF_3$ | H | $C_6H_4$-4-$OCH_3$ | 3GL/50EO/5PO—H |
| 14 | 5-$CO_2CH_3$ | 3-$CH_3$ | $C_6H_4$-3-Cl | 4GL/100EO—H |
| 15 | 5-$COCH_3$ | 3-$CH_3$ | $C_6H_4$-3-$CO_2C_2H_5$ | 3GL/200EO—H |
| 16 | 5-$CONH_2$ | 3-$CH_3$ | $C_6H_4$-4-CN | 3GL/175EO—H |
| 17 | 4,5-di-Cl | H | $C_2H_4C_6H_5$ | 2GL/50EO—H |
| 18 | 5-$SO_2C_6H_5$ | H | $C_2H_4OC_6H_5$ | 3GL/60EO—H |
| 19 | 5-$SO_2NHC_2H_5$ | H | $C_2H_4SC_6H_5$ | 2GL/80EO—H |
| 20 | 5-Cl | H | $C_2H_4OC_2H_5$ | 3GL/150EO—H |

TABLE 16

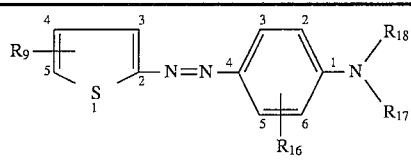

| Entry | R9 | R16 | R17 | R18 |
|---|---|---|---|---|
| 1 | 3-CO$_2$CH$_3$,5-COCH$_3$ | H | C$_2$H$_5$ | 2GL/200EO—H |
| 2 | 3,5-di-CO$_2$CH$_3$,4-CH$_3$ | H | C$_6$H$_{11}$ | 4GL/150EO—H |
| 3 | 3,5-di-CN,4-CH$_3$ | 3-CH$_3$ | CH$_2$CH=CH$_2$ | 2GL/125EO—H |
| 4 | 3-CO$_2$CH$_3$,5-COC$_6$H$_5$ | 3-CH$_3$ | 2GL/25EO—H | 2GL/25EO—H |
| 5 | 3-CN,5-CHO | 3-CH$_3$ | CH$_2$C$_6$H$_5$ | 3GL/80EO—H |
| 6 | 3-CN,5-N=N-C$_6$H$_5$ | 2-CH$_3$ | CH$_3$ | 2GL/120EO—H |
| 7 | 3-CONHC$_2$H$_4$OH,5-COCH$_3$ | 2-OCH$_3$ | C$_2$H$_4$C$_6$H$_5$ | 2GL/40EO—H |
| 8 | 3,5-di-SO$_2$CH$_3$ | 2-OCH$_3$,5-CH$_3$ | 2GL/20EO—H | 2GL/20EO—H |
| 9 | 3-CN,4-CH$_3$,5-CO$_2$C$_2$H$_5$ | 3-OCH$_3$ | 2GL/30EO—H | 3GL/30EO—H |
| 10 | 3-CO$_2$C$_2$H$_5$,4-CH$_3$,5-CN | 3-CF$_3$ | 2GL/15EO—H | 2GL/15EO—H |
| 11 | 3-CO$_2$CH$_3$,4-C$_6$H$_5$,5-CONH$_2$ | H | 2GL/50-H | 2GL/50-H |
| 12 | 3-SO$_2$C$_6$H$_5$,5-CH$_3$ | H | C$_6$H$_{10}$-4-CH$_3$ | 2GL/200EO—H |
| 13 | 3-CO$_2$C$_4$H$_9$-n,5-SCN | H | C$_6$H$_4$-4-OCH$_3$ | 3GL/250EO—H |
| 14 | 3-CO$_2$C$_2$H$_5$,5-SO$_2$CH$_3$ | 3-CH$_3$ | C$_6$H$_4$-3-Cl | 4GL/400EO—H |
| 15 | 3-CO$_2$CH$_3$,5-SCH$_3$ | 3-CH$_3$ | C$_6$H$_4$-3-CO$_2$C$_2$H$_5$ | 3GL/75EO—H |
| 16 | 3-CN,5-NO$_2$ | 3-CH$_3$ | C$_6$H$_4$-4-CN | 2GL/100EO—H |
| 17 | 3-NO$_2$,5-CN | H | C$_2$H$_4$C$_6$H$_5$ | 3GL/75EO—H |
| 18 | 3,5-di-NO$_2$ | H | C$_2$H$_4$OC$_6$H$_5$ | 3GL/50EO—H |
| 19 | 3-NO$_2$,5-COCH$_3$ | H | C$_2$H$_4$SC$_6$H$_5$ | 2GL/60EO—H |
| 20 | 3-CO$_2$CH$_3$,5-CONH(CH$_3$)$_2$ | H | C$_2$H$_4$OC$_2$H$_5$ | 3GL/80EO/10PO—H |
| 21 | 3-CO$_2$C$_2$H$_5$,5-Br | H | C$_2$H$_4$SC$_2$H$_5$ | 3GL/100EO/10BO—H |
| 22 | 3-CO$_2$CH$_3$,COCH=CHC$_6$H$_5$ | H | C$_3$H$_6$SO$_2$CH$_3$ | 3GL/85EO—H |

TABLE 17

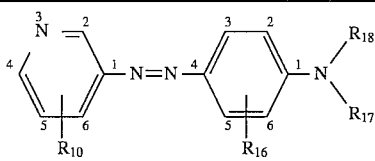

| Entry | R10 | R16 | R17 | R18 |
|---|---|---|---|---|
| 1 | H | H | C$_2$H$_5$ | 2GL/100EO—H |
| 2 | 2-Cl | H | C$_6$H$_{11}$ | 2GL/60EO—H |
| 3 | 2-CN | 3-CH$_3$ | CH$_2$CH=CH$_2$ | 3GL/40EO—H |
| 4 | 2,4-di-Br | 3-CH$_3$ | 2GL/20EO—H | 2GL/20EO—H |
| 5 | 2,4-di-CN | 3-CH$_3$ | CH$_2$C$_6$H$_5$ | 3GL/150EO—H |
| 6 | 2,4-di-SO$_2$CH$_3$ | 2-CH$_3$ | CH$_3$ | 2GL/200EO—H |
| 7 | 2,4-di-SO$_2$C$_6$H$_5$ | 2-OCH$_3$ | C$_2$H$_4$C$_6$H$_5$ | 2GL/40EO—H |
| 8 | 2-S-CH$_3$ | 2-OCH$_3$,5-CH$_3$ | 2GL/15EO—H | 2GL/15EO—H |
| 9 | 2-CO$_2$CH$_3$,4-OC$_2$H$_5$ | 3-OCH$_3$ | 2GL/30EO—H | 2GL/30EO—H |
| 10 | 2-SO$_2$C$_6$H$_3$(3,4-di-Cl) | 3-CF$_3$ | 2GL/75EO—H | 2GL/75EO—H |
| 11 | 2-CH$_3$,6-NO$_2$ | 3-Cl | 2GL/10EO—H | 2GL/10EO—H |
| 12 | 2-SC$_4$H$_9$-n | H | C$_6$H$_{10}$-4-CH$_3$ | 2GL/150EO—H |
| 13 | 2-CON(C$_2$H$_5$)$_2$,4,6-di-CN | H | C$_6$H$_4$-4-OCH$_3$ | 3GL/200EO—H |
| 14 | 2-SO$_2$NH$_2$,4,6-di-SO$_2$CH$_3$ | H | C$_6$H$_4$-3-Cl | 2GL/60EO—H |
| 15 | 2-benzothiazol-2-yl | 3-CH$_3$ | C$_6$H$_4$-3-CO$_2$C$_2$H$_5$ | 3GL/85EO—H |
| 16 | 2-benzoxazol-2-yl | 3-CH$_3$ | C$_6$H$_4$-4-CN | 3GL/175EO—H |
| 17 | 2-triazol-3-yl | H | C$_2$H$_4$C$_6$H$_5$ | 4GL/250EO—H |
| 18 | 2-C$_6$H$_5$,6-SC$_6$H$_5$ | H | C$_2$H$_4$OC$_6$H$_5$ | 3GL/60EO/10PO—H |
| 19 | 2-CHO,5-CN,6-CO$_2$CH$_3$ | H | C$_2$H$_4$SC$_6$H$_5$ | 2GL/100EO—H |
| 20 | 2-SC$_2$H$_4$OH | H | C$_2$H$_4$OC$_2$H$_5$ | 3GL/60EO—H |
| 21 | 2-SO$_2$C$_2$H$_4$OH | H | C$_2$H$_4$SC$_2$H$_5$ | 3GL/75EO—H |
| 22 | 2-SO$_2$CH$_3$ | H | C$_3$H$_6$SO$_2$CH$_3$ | 3GL/100EO—H |
| 23 | 5-NO$_2$ | H | C$_2$H$_4$OC$_2$H$_4$OC$_2$H$_5$ | 3GL/150EO—H |
| 24 | 6-Cl,5-NO$_2$ | H | C$_2$H$_4$CN | 3GL/80EO—H |
| 25 | 4-CHO | 2,5-di-CH$_3$ | CH$_2$C$_6$H$_{11}$ | 2GL/125EO—H |

TABLE 18

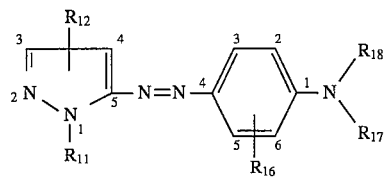

| Entry | $R_{11}$ | $R_{12}$ | $R_{16}$ | $R_{17}$ | $R_{18}$ |
|---|---|---|---|---|---|
| 1 | H | 4-CN | H | $CH_3$ | 2GL/50EO—H |
| 2 | $CH_3$ | 4-CN | H | $C_6H_{11}$ | 2GL/45EO—H |
| 3 | $C_6H_5$ | 4-CN | 3-$CH_3$ | $CH_2CH=CH_2$ | 2GL/30EO—H |
| 4 | $CH_3$ | 4-$CO_2C_2H_5$ | 3-$CH_3$ | 2GL/20EO—H | 2GL/20EO—H |
| 5 | $CH_3$ | 4-$CO_2CH_3$ | 2-$CH_3$ | $CH_2C_6H_5$ | 3GL/125EO—H |
| 6 | $SO_2CH_3$ | 4-CN | 2-$OCH_3$ | $CH_3$ | 4GL/150EO—H |
| 7 | $SO_2C_2H_5$ | 4-CN | 2-$OCH_3$,5-$CH_3$ | $C_2H_4C_6H_5$ | 2GL/200EO—H |
| 8 | $SO_2C_6H_5$ | 4-CN | 3-$OCH_3$ | 2GL/40EO—H | 2GL/40EO—H |
| 9 | $SO_2CH_3$ | 4-$SO_2CH_3$ | 3-$CF_3$ | 2GL/60EO—H | 2GL/60EO—H |
| 10 | $CH_3$ | 3-$CH_2CN$,4-CN | 3-Cl | 2GL/15EO—H | 2GL/15EO—H |
| 11 | $C_6H_4$-4-Cl | 4-$CONHC_2H_4OH$ | H | 2GL/10EO—H | 2GL/10EO—H |
| 12 | $C_6H_5$ | 4-$CONH_2$ | H | $C_6H_{10}$-4-$CH_3$ | 2GL/200EO—H |
| 13 | $CH_2C_6H_5$ | 3-S-$C_6H_5$,4-$CO_2CH_3$ | 3-$CH_3$ | $C_6H_4$-4-CN | 3GL/150EO—H |
| 14 | $CH_2C_6H_5$ | 3-S-$C_6H_5$,4-$CO_2C_2H_5$ | 3-$CH_3$ | $C_2H_4C_6H_5$ | 4GL/250EO—H |
| 15 | $CH_3$ | 3-$CH_3$,4-$CO_2C_2H_5$ | 3-$CH_3$ | 2GL/80EO—H | 2GL/80EO—H |
| 16 | $C_2H_5$ | 3-$CH_3$,4-$CO_2CH_3$ | H | 2GL/100EO—H | 2GL/100EO—H |
| 17 | $CH_3$ | 4-$CONH_2$ | H | 2GL/40EO—H | 2GL/40EO—H |
| 18 | $C_6H_5$ | 4-$CONH_2$ | H | 2GL/30EO—H | 2GL/30EO—H |
| 19 | $C_6H_5$ | 4-$CONHC_2H_4OH$ | 3-$CH_3$ | 2GL/45EO—H | 2GL/45EO—H |
| 20 | $CH_3$ | 4-$CON(C_2H_5)_2$ | 3-$CH_3$ | 2GL/55EO—H | 2GL/55EO—H |

TABLE 19

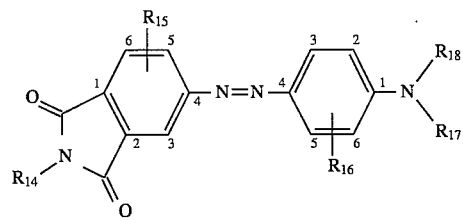

| Entry | $R_{14}$ | $R_{15}$ | $R_{16}$ | $R_{17}$ | $R_{18}$ |
|---|---|---|---|---|---|
| 1 | H | H | H | $CH_3$ | 2GL/60EO—H |
| 2 | $C_2H_5$ | H | H | $C_2H_5$ | 2GL/80EO—H |
| 3 | $C_6H_{11}$ | H | 3-$CH_3$ | 2GL/15EO—H | 2GL/15EO—H |
| 4 | $C_6H_5$ | H | 3-$CH_3$ | 2GL/20EO—H | 2GL/20EO—H |
| 5 | $C_4H_9$-n | 5-Br | 2-$CH_3$ | $CH_2C_6H_5$ | 3GL/200EO—H |
| 6 | $C_2H_4OH$ | 5-Cl | 2,5-di-Cl | 2GL/100EO—H | 2GL/100EO—H |
| 7 | $C_3H_6OCH_3$ | 3,5-di-Br | 2-$OCH_3$,5-$OCH_3$ | $C_2H_4C_6H_5$ | 2GL/200EO—H |
| 8 | $CH_2C_6H_5$ | 3,5-di-$SO_2C_6H_5$ | 3-$OCH_3$ | 2GL/60EO—H | 2GL/60EO—H |
| 9 | $CH_2C_6H_{11}$ | 5-$SO_2C_6H_5$ | 3-$CF_3$ | 2GL/75EO—H | 2GL/75EO—H |
| 10 | $C_2H_4CN$ | 3,5-di-$SO_2CH_3$ | 3-Cl | 2GL/150EO—H | 2GL/150EO—H |
| 11 | $C_2H_4C_6H_5$ | 3,5-di-CN | H | 2GL/45EO—H | 2GL/45EO—H |
| 12 | $C_2H_4Cl$ | 5-$NO_2$ | H | $C_6H_{10}$-4$CH_3$ | 3GL/70EO—H |
| 13 | $C_2H_4OCOCH_3$ | 5-$OC_6H_5$ | 3-$CH_3$ | $C_2H_5$ | 2GL/60EO—H |
| 14 | 3GL/150EO—H | H | 3-$CH_3$ | $C_2H_4OH$ | $C_2H_4OH$ |
| 15 | $C_2H_4O$-2GL/200EO—H | 2-Br | 3-$CH_3$ | $CH_3$ | $CH_3$ |
| 16 | $C_6H_4$-4-$CH_3$ | 5-$OCH_3$ | H | 2GL/40EO—H | 2GL/40EO—H |
| 17 | $C_2H_5$ | 5-$SC_6H_5$ | H | 2GL/50EO—H | 2GL/50EO—H |
| 18 | n-$C_4H_9$ | 5-$SC_2H_5$ | H | 2GL/60EO—H | 2GL/60EO—H |
| 19 | $CH_3$ | 3-CN,5-$CH_3$ | 3-$CH_3$ | 2GL/100EO—H | 2GL/100EO—H |
| 20 | $C_2H_5$ | 3-Br,5-$CH_3$ | 3-$CH_3$ | 2GL/150EO—H | 2GL/150EO—H |

TABLE 20

[Structure: phthalimide-azo-aniline with R14 on N of imide, R15 on positions 4-6 of phthalimide ring, R16 on positions 5-6 of aniline, R17 and R18 on terminal N]

| Entry | R$_{14}$ | R$_{15}$ | R$_{16}$ | R$_{17}$ | R$_{18}$ |
|---|---|---|---|---|---|
| 1 | H | H | H | CH$_3$ | 2GL/50EO—H |
| 2 | C$_2$H$_5$ | H | H | C$_2$H$_5$ | 4GL/60EO—H |
| 3 | C$_6$H$_{11}$ | H | 3-CH$_3$ | 2GL/10EO—H | 2GL/10EO—H |
| 4 | C$_6$H$_5$ | H | 3-CH$_3$ | 2GL/15EO—H | 2GL/15EO—H |
| 5 | C$_4$H$_9$-n | 4,6-di-Br | 2-CH$_3$ | CH$_2$C$_6$H$_5$ | 3GL/140EO—H |
| 6 | C$_2$H$_4$OH | 4-CN,6-Br | 2,5-di-CH$_3$ | 2GL/20EO—H | 2GL/20EO—H |
| 7 | C$_3$H$_6$OCH$_3$ | 4-SO$_2$CH$_3$,6-Br | H | C$_2$H$_4$C$_6$H$_5$ | 4GL/100EO—H |
| 8 | CH$_2$C$_6$H$_5$ | 6-NO$_2$ | 3-OCH$_3$ | 2GL/50EO—H | 2GL/50EO—H |
| 9 | CH$_2$C$_6$H$_{11}$ | 4-Br,6-NO$_2$ | 3-CF$_3$ | 2GL/25EO—H | 2GL/25EO—H |
| 10 | C$_2$H$_4$CN | H | 3-Cl | 2GL/70EO—H | 2GL/70EO—H |
| 11 | C$_2$H$_4$C$_6$H$_5$ | H | H | 2GL/30EO—H | 2GL/30EO—H |
| 12 | C$_2$H$_4$Cl | H | H | C$_6$H$_{10}$-4CH$_3$ | 2GL/150EO—H |
| 13 | C$_2$H$_4$OCOCH$_3$ | 4,6-di-Br | 3-CH$_3$ | C$_2$H$_5$ | 3GL/200EO—H |
| 14 | 3GL/250EO—H | 4,6-di-Cl | 3-CH$_3$ | C$_2$H$_4$OH | C$_2$H$_4$OH |
| 15 | C$_2$H$_4$O-3GL/100EO/10PO—H | H | 3-CH$_3$ | CH$_3$ | CH$_3$ |
| 16 | C$_6$H$_4$-4-CH$_3$ | H | H | 3GL/40EO—H | 3GL/40EO—H |
| 17 | C$_2$H$_5$ | H | H | 2GL/100EO—H | 2GL/100EO—H |
| 18 | n-C$_4$H$_9$ | H | H | 2GL/40EO—H | 2GL/40EO—H |
| 19 | CH$_3$ | H | 3-CH$_3$ | 2GL/35EO—H | 2GL/35EO—H |
| 20 | C$_2$H$_5$ | H | 3-CH$_3$ | 2GL/50EO—H | 2GL/50EO—H |

TABLE 21

[Structure: 5,5-dimethyl-3-thiazolyl-cyclohexenone linked via azo to aniline with R16, R17, R18 substituents]

| Entry | R$_{16}$ | R$_{17}$ | R$_{18}$ |
|---|---|---|---|
| 1 | H | C$_2$H$_5$ | 2GL/50EO—H |
| 2 | H | C$_6$H$_{11}$ | 4GL/40EO—H |
| 3 | 3-CH$_3$ | CH$_2$CH=CH$_2$ | 3GL/30EO—H |
| 4 | 3-CH$_3$ | 5GL/5PO/5EO—H | 5GL/100EO—H |
| 5 | 3-CH$_3$ | CH$_2$C$_6$H$_5$ | 3GL/150EO—H |
| 6 | 2-CH$_3$ | CH$_3$ | 4GL/200EO—H |
| 7 | 2-OCH$_3$ | C$_2$H$_4$C$_6$H$_5$ | 2GL/70EO/10BO—H |
| 8 | 2-OCH$_3$,5-CH$_3$ | 2GL/20EO—H | 2GL/20EO—H |
| 9 | 3-OCH$_3$ | 2GL/15EO—H | 2GL/15EO—H |
| 10 | 3-CF$_3$ | 2GL/10EO—H | 2GL/10EO—H |
| 11 | 3-Cl | 2GL/20EO—H | 2GL/20EO—H |
| 12 | H | C$_6$H$_{10}$-4-CH$_3$ | 4GL/60EO—H |
| 13 | H | C$_6$H$_4$-4-OCH$_3$ | 3GL/80EO—H |
| 14 | 3-CH$_3$ | C$_6$H$_4$-3-Cl | 4GL/200EO—H |
| 15 | 3-CH$_3$ | C$_6$H$_4$-3-CO$_2$C$_2$H$_5$ | 2GL/125EO—H |
| 16 | 3-CH$_3$ | C$_6$H$_4$-4-CN | 2GL/100EO—H |
| 17 | H | C$_2$H$_4$C$_6$H$_5$ | 2GL/75EO—H |
| 18 | H | C$_2$H$_4$OC$_6$H$_5$ | 2GL/30EO—H |
| 19 | H | C$_2$H$_4$SC$_6$H$_5$ | 2GL/140EO—H |
| 20 | H | C$_2$H$_4$OC$_2$H$_5$ | 3GL/60EO/10PO—H |

TABLE 22

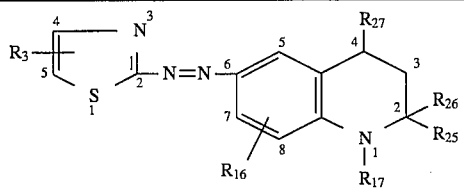

| Entry | R₃ | R₁₆ | R₂₅ | R₂₆ | R₂₇ | R₁₇ |
|---|---|---|---|---|---|---|
| 1 | 4-CH$_3$ | H | H | H | H | 2GL/100EO—H |
| 2 | 4-C$_6$H$_5$ | H | CH$_3$ | H | H | 3GL/150EO—H |
| 3 | 4-N=N—C$_6$H$_5$ | H | C$_2$H$_5$ | H | H | 2GL/125EO—H |
| 4 | 4-CH$_3$,5-CO$_2$C$_2$H$_5$ | H | CH$_3$ | H | H | 2GL/75EO—H |
| 5 | 5-CH | H | CH$_3$ | CH$_3$ | CH$_3$ | 3GL/200EO—H |
| 6 | 5-CHO | 7-CH$_3$ | CH$_3$ | H | H | 4GL/60EO—H |
| 7 | 5-SO$_2$CH$_3$ | 7-CH$_3$ | CH$_3$ | H | H | 2GL/50EO—H |
| 8 | 5-NO$_2$ | 7-CH$_3$ | CH$_3$ | CH$_3$ | CH$_3$ | 2GL/140EO—H |
| 9 | 4-SO$_2$CH$_3$,5-NO$_2$ | 5-CH$_3$,8-OCH$_3$ | CH$_3$ | H | H | 3GL/160EO—H |
| 10 | 5-COCH$_5$ | 5-CH$_3$,8-OCH$_3$ | CH$_3$ | CH$_3$ | CH$_3$ | 2GL/250EO—H |
| 11 | 5-COC$_6$H$_5$ | 8-OCH$_3$ | CH$_3$ | H | H | 2GL/40EO—H |
| 12 | 5-Cl | 8-OCH$_3$ | CH$_3$ | CH$_3$ | CH$_3$ | 2GL/30EO—H |
| 13 | 5-Br | 5,8-di-OCH$_3$ | CH$_3$ | H | H | 3GL/100EO—H |
| 14 | 4-CF$_3$ | 5,8-di-OCH$_3$ | CH$_3$ | H | H | 2GL/80EO/10PO—H |
| 15 | 5-SO$_2$N(C$_2$H$_3$)$_2$ | 7-Cl | CH$_3$ | H | H | 2GL/55EO—H |
| 16 | 5-SCN | 7-OCH$_3$ | CH$_3$ | H | H | 3GL/150EO—H |
| 17 | 5-CON(CH$_3$)$_2$ | 7-OC$_2$H$_5$ | CH$_3$ | H | H | 2GL/50EO—H |
| 18 | 5-CONH$_2$ | 7-CF$_3$ | CH$_3$ | H | H | 3GL/200EO—H |
| 19 | 5-CONHC$_2$H$_4$OH | 7-CH$_3$ | CH$_3$ | H | H | C$_2$H$_4$SO$_2$NHC$_6$H$_4$-O-3GL/25EO—H |
| 20 | 5-SO$_2$NHC$_2$H$_4$OH | 7-CH$_3$ | CH$_3$ | H | H | CH$_2$C$_6$H$_4$SO$_2$C$_6$H$_4$-O-2GL/55EO—H |

TABLE 23

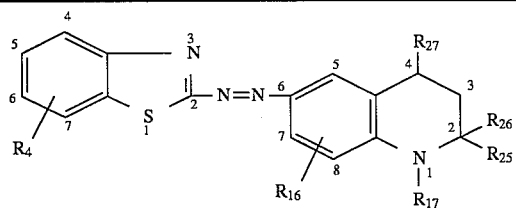

| Entry | R₄ | R₁₆ | R₂₅ | R₂₆ | R₂₇ | R₁₇ |
|---|---|---|---|---|---|---|
| 1 | H | H | H | H | H | 2GL/75EO—H |
| 2 | 4-Cl | H | CH$_3$ | H | H | 2GL/20EO—H |
| 3 | 5,6-di-Cl | H | C$_2$H$_5$ | H | H | 3GL/60EO—H |
| 4 | 6-CH$_3$ | H | CH$_3$ | H | H | 4GL/30EO—H |
| 5 | 6-OCH$_3$H | CH$_3$ | CH$_3$ | H | CH$_3$ | 2GL/100EO—H |
| 6 | 6-CN | 7-CH$_3$ | CH$_3$ | H | H | 2GL/150EO—H |
| 7 | 6-CO$_2$CH$_3$ | 7-CH$_3$ | CH$_3$ | H | H | 2GL/200EO—H |
| 8 | 6-SO$_2$CH$_3$ | 7-CH$_3$ | CH$_3$ | CH$_3$ | CH$_3$ | 3GL/40EO—H |
| 9 | 4-CF$_3$ | 5-CH$_3$,8-OCH$_3$ | CH$_3$ | H | H | 2GL/50EO—H |
| 10 | 6-SO$_2$C$_6$H$_5$ | 5-CH$_3$,8-OCH$_3$ | CH$_3$ | CH$_3$ | CH$_3$ | 2GL/75EO—H |
| 11 | 6-COC$_6$H$_5$ | 8-OCH$_3$ | CH$_3$ | H | H | 2GL/60EO/5PO—H |
| 12 | 6-COCH$_3$ | 8-OCH$_3$ | CH$_3$ | CH$_3$ | CH$_3$ | 2GL/45EO—H |
| 13 | 6-CON(CH$_3$)$_2$ | 5,8-di-OCH$_3$ | CH$_3$ | H | H | 2GL/80EO—H |
| 14 | 6-SO$_2$N(C$_2$H$_5$)$_2$ | 5,8-di-OCH$_3$ | CH$_3$ | H | H | 2GL/125EO—H |
| 15 | 6-SCN | 7-Cl | CH$_3$ | H | H | 2GL/85EO—H |
| 16 | 6-SCH$_3$ | 7-OCH$_3$ | CH$_3$ | H | H | 2GL/100EO—H |
| 17 | 6-SC$_2$H$_4$CN | 7-OC$_2$H$_5$ | CH$_3$ | H | H | 2GL/40EO/10PO—H |
| 18 | 6-SO$_2$C$_2$N$_4$CN | 7-CF$_3$ | CH$_3$ | H | H | 2GL/30EO/5PO—H |
| 19 | 6-NHCOCH$_3$ | 7-CH$_3$ | CH$_3$ | H | H | C$_2$H$_4$SO$_2$NHC$_6$H$_4$-O-3GL/50EO—H |
| 20 | 6-N=N-C$_6$H$_5$ | 7-CH$_3$ | CH$_3$ | H | H | CH$_2$C$_6$H$_4$SO$_2$C$_6$H$_4$-O-4GL/100EO—H |

TABLE 24

| Entry | R$_5$ | R$_{16}$ | R$_{25}$ | R$_{26}$ | R$_{27}$ | R$_{17}$ |
|---|---|---|---|---|---|---|
| 1 | H | H | H | H | H | 2GL/200EO—H |
| 2 | CH$_3$ | H | CH$_3$ | H | H | 3GL/25EO—H |
| 3 | C$_6$H$_5$ | H | C$_2$H$_5$ | H | H | 2GL/100EO—H |
| 4 | C$_2$H$_5$ | H | CH$_3$ | H | H | 2GL/150EO—H |
| 5 | NCCH$_2$S | CH$_3$ | CH$_3$ | H | CH$_3$ | 2GL/75EO—H |
| 6 | C$_2$H$_5$SO$_2$ | 7-CH$_3$ | CH$_3$ | H | H | 3GL/50EO—H |
| 7 | C$_6$H$_5$ | 7-CH$_3$ | CH$_3$ | H | H | 2GL/40EO—H |
| 8 | CH$_2$=CHCH$_2$S | 7-CH$_3$ | CH$_3$ | CH$_3$ | CH$_3$ | 3GL/40EO—H |
| 9 | C$_6$H$_5$O | 5-CH$_3$,8-OCH$_3$ | CH$_3$ | H | H | 3GL/80EO—H |
| 10 | Cl | 5-CH$_3$,8-OCH$_3$ | CH$_3$ | CH$_3$ | CH$_3$ | 2GL/200EO—H |
| 11 | NCS | 8-OCH$_3$ | CH$_3$ | H | H | 2GL/400EO—H |
| 12 | SO$_2$N(C$_2$H$_5$)$_2$ | 8-OCH$_3$ | CH$_3$ | CH$_3$ | CH$_3$ | 2GL/300EO—H |
| 13 | CH$_3$CONH | 5,8-di-OCH$_3$ | CH$_3$ | H | H | 3GL/250EO—H |
| 14 | C$_6$H$_{11}$ | 5,8-di-OCH$_3$ | CH$_3$ | H | H | 2GL/40EO—H |
| 15 | C$_6$H$_4$-4-CO$_2$CH$_3$ | 7-Cl | CH$_3$ | H | H | 2GL/30EO—H |
| 16 | SO$_2$NH$_2$ | 7-OCH$_3$ | CH$_3$ | H | H | 3GL/90EO—H |
| 17 | CO$_2$C$_4$H$_9$-n | 7-OC$_2$H$_5$ | CH$_3$ | H | H | 2GL/150EO—H |
| 18 | Br | 7-CF$_3$ | CH$_3$ | H | H | 2GL/75EO—H |
| 19 | S-3GL/15PO/10EO—H | 7-CH$_3$ | CH$_3$ | H | H | C$_2$H$_4$SO$_2$NHC$_6$H$_4$—O-3GL/100EO—H |
| 20 | SC$_2$H$_4$-5GL/20BO/10EO—H | 7-CH$_3$ | CH$_3$ | H | H | CH$_2$C$_6$H$_4$SO$_2$C$_6$H$_4$—S-2GL/90EO—H |

TABLE 25

| Entry | R$_6$ | R$_{16}$ | R$_{25}$ | R$_{26}$ | R$_{27}$ | R$_{17}$ |
|---|---|---|---|---|---|---|
| 1 | H | H | H | H | H | 2GL/30EO—H |
| 2 | CH$_3$ | H | CH$_3$ | H | H | 3GL/20EO—H |
| 3 | C$_6$H$_5$ | H | C$_2$H$_5$ | H | H | 3GL/40EO—H |
| 4 | CH$_3$S | H | CH$_3$ | H | H | 2GL/50EO—H |
| 5 | Cl | CH$_3$ | CH$_3$ | H | CH$_3$ | 3GL/60EO—H |
| 6 | C$_6$H$_4$-2-CN | 7-CH$_3$ | CH$_3$ | H | H | 3GL/80EO—H |
| 7 | C$_2$H$_5$SO$_2$ | 7-CH$_3$ | CH$_3$ | H | H | 2GL/200EO—H |
| 8 | NC | 7-CH$_3$ | CH$_3$ | CH$_3$ | CH$_3$ | 2GL/100EO—H |
| 9 | CH$_3$O$_2$C$_2$H$_4$S | 5-CH$_3$,8-OCH$_3$ | CH$_3$ | H | H | 2GL/150EO—H |
| 10 | C$_6$H$_5$CH$_2$S | 5-CH$_3$,8-OCH$_3$ | CH$_3$ | CH$_3$ | CH$_3$ | 2GL/125EO—H |
| 11 | C$_2$H$_5$SO$_2$ | 8-OCH$_3$ | CH$_3$ | H | H | 2GL/80EO—H |
| 12 | H | 8-OCH$_3$ | CH$_3$ | CH$_3$ | CH$_3$ | 3GL/45EO—H |
| 13 | C$_2$H$_5$ | 5,8-di-OCH$_3$ | CH$_3$ | H | H | 2GL/75EO—H |
| 14 | C$_6$H$_5$CH$_2$S | 5,8-di-OCH$_3$ | CH$_3$ | H | H | 3GL/55EO—H |
| 15 | C$_2$H$_5$S | 7-Cl | CH$_3$ | H | H | 3GL/35EO—H |
| 16 | Br | 7-OCH$_3$ | CH$_3$ | H | H | 6GL/25EO—H |
| 17 | H | 7-OC$_2$H$_5$ | CH$_3$ | H | H | 2GL/50EO/5PO—H |
| 18 | H | 7-CF$_3$ | CH$_3$ | H | H | 3GL/60EO/10PO—H |
| 19 | CH$_3$ | 7-CH$_3$ | CH$_3$ | H | H | C$_2$H$_4$SO$_2$NHC$_6$H$_4$—O-3GL/100EO—H |
| 20 | C$_6$H$_5$ | 7-CH$_3$ | CH$_3$ | H | H | CH$_2$C$_6$H$_4$SO$_2$C$_6$H$_4$—O-4GL/150EO—H |

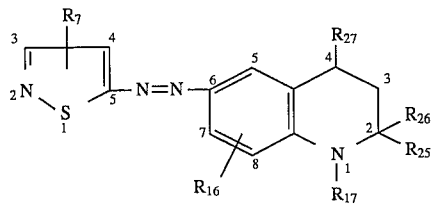

| Entry | $R_7$ | $R_{16}$ | $R_{25}$ | $R_{26}$ | $R_{27}$ | $R_{17}$ |
|---|---|---|---|---|---|---|
| 1 | H | H | H | H | H | 2GL/10EO—H |
| 2 | 3-$CH_3$ | H | $CH_3$ | H | H | 4GL/50EO—H |
| 3 | 3-$C_6H_5$ | H | $C_2H_5$ | H | H | 3GL/25EO—H |
| 4 | 3-$CH_3$,4-Cl | H | $CH_3$ | H | H | 5GL/75EO—H |
| 5 | 3-$CH_3$,4-CN | $CH_3$ | $CH_3$ | H | $CH_3$ | 3GL/50EO—H |
| 6 | 3-$CH_3$,4-$SO_2CH_3$ | 7-$CH_3$ | $CH_3$ | H | H | 2GL/30EO—H |
| 7 | 3-$CH_3$,4-$SC_2H_5$ | 7-$CH_3$ | $CH_3$ | H | H | 2GL/40EO—H |
| 8 | 3-$CH_3$,4-$SO_2C_6H_5$ | 7-$CH_3$ | $CH_3$ | $CH_3$ | $CH_3$ | 2GL/60EO—H |
| 9 | 3-$CH_3$,4-Br | 5-$CH_3$,8-$OCH_3$ | $CH_3$ | H | H | 3GL/20EO—H |
| 10 | 3-$CH_3$,4-$NO_2$ | 5-$CH_3$,8-$OCH_3$ | $CH_3$ | $CH_3$ | $CH_3$ | 2GL/25EO—H |
| 11 | 3-$CH_3$,4-$CO_2C_2H_5$ | 8-$OCH_3$ | $CH_3$ | H | H | 2GL/40EO—H |
| 12 | 3-$CH_3$,4-$C_2H_4OH$ | 8-$OCH_3$ | $CH_3$ | $CH_3$ | $CH_3$ | 4GL/200EO—H |
| 13 | 3-$CH_3$,4-$SC_6H_5$ | 5,8-di-$OCH_3$ | $CH_3$ | H | H | 3GL/300EO—H |
| 14 | 3-Cl,4-CN | 5,8-di-$OCH_3$ | $CH_3$ | H | H | 3GL/55EO—H |
| 15 | 3-$CH_3$,4-$CONHCH_3$ | 7-Cl | $CH_3$ | H | H | 2GL/65EO—H |
| 16 | 3-$CH_3$,4-$OC_6H_5$ | 7-$OCH_3$ | $CH_3$ | H | H | 2GL/35EO—H |
| 17 | 3-$CH_3$,4-$OHH_3$ | 7-$OC_2H_5$ | $CH_3$ | H | H | 3GL/45EO—H |
| 18 | 3-$C_2H_5$ | 7-$CF_3$ | $CH_3$ | H | H | 3GL/20EO—H |
| 19 | 3-$CH_3$,4-SCN | 7-$CH_3$ | $CH_3$ | H | H | $C_2H_4SO_2NHC_6H_4$—O-2GL/75EO—H |
| 20 | 3-$CH_3$,4-$SCH_3$ | 7-$CH_3$ | $CH_3$ | H | H | $CH_2C_6H_4SO_2C_6H_4$—O-3GL/125EO—H |

TABLE 27

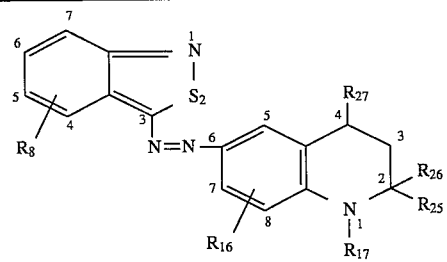

| Entry | $R_8$ | $R_{16}$ | $R_{25}$ | $R_{26}$ | $R_{27}$ | $R_{17}$ |
|---|---|---|---|---|---|---|
| 1 | H | H | H | H | H | 2GL/100EO—H |
| 2 | 5-Cl | H | $CH_3$ | H | H | 2GL/35EO—H |
| 3 | 5-Br | H | $C_2H_5$ | H | H | 2GL/15EO—H |
| 4 | 5-$CH_3$ | H | $CH_3$ | H | H | 2GL/50EO—H |
| 5 | 5-$CH_3$ | $CH_3$ | $CH_3$ | H | $CH_3$ | 2GL/25EO—H |
| 6 | 6-Cl | 7-$CH_3$ | $CH_3$ | H | H | 2GL/75EO—H |
| 7 | 6-Cl | 7-$CH_3$ | $CH_3$ | H | H | 2GL/40EO—H |
| 8 | 5-$NO_2$ | 7-$CH_3$ | $CH_3$ | $CH_3$ | $CH_3$ | 2GL/35EO—H |
| 9 | 5-$OCH_3$ | 5-$CH_3$,8-$OCH_3$ | $CH_3$ | H | H | 2GL/20EO—H |
| 10 | 5-$SO_2CH_3$ | 5-$CH_3$,8-$OCH_3$ | $CH_3$ | $CH_3$ | $CH_3$ | 2GL/185EO—H |
| 11 | 5-Cl,7-$SO_2N(CH_3)_2$ | 8-$OCH_3$ | $CH_3$ | H | H | 4GL/120EO—H |
| 12 | 5-Br,7-$SO_2NH_2$ | 8-$OCH_3$ | $CH_3$ | $CH_3$ | $CH_3$ | 2GL/160EO—H |
| 13 | 5-$CF_3$ | 5,8-di-$OCH_3$ | $CH_3$ | H | H | 2GL/100EO—H |
| 14 | 5-$CO_2CH_3$ | 5,8-di-$OCH_3$ | $CH_3$ | H | H | 2GL/180EO—H |
| 15 | 5-$COCH_3$ | 7-Cl | $CH_3$ | H | H | 3GL/200EO—H |
| 16 | 5-$CONH_2$ | 7-$OCH_3$ | $CH_3$ | H | H | 4GL/65EO—H |
| 17 | 4,5-di-Cl | 7-$OC_2H_5$ | $CH_3$ | H | H | 2GL/140EO—H |
| 18 | 5-$SO_2C_6H_5$ | 7-$CF_3$ | $CH_3$ | H | H | 3GL/180EO—H |
| 19 | 5-$SO_2NHC_2H_5$ | 7-$CH_3$ | $CH_3$ | H | H | $C_2H_4SO_2NHC_6H_4$—O-3GL/100EO—H |
| 20 | 5-Cl | 7-$CH_3$ | $CH_3$ | H | H | $CH_2C_6H_4SO_2C_6H_4$—O-4GL/75EO—H |

TABLE 28

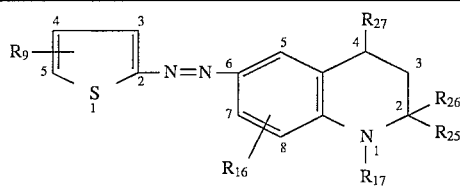

| Entry | R9 | R16 | R25 | R26 | R27 | R17 |
|---|---|---|---|---|---|---|
| 1 | 3-CO$_2$CH$_3$,5-COCH$_3$ | H | H | H | H | 2GL/100EO—H |
| 2 | 3,5-di-CO$_2$CH$_3$,4-CH$_3$ | H | CH$_3$ | H | H | 3GL/125EO—H |
| 3 | 3,5-di-CN,4-CH$_3$ | H | C$_2$H$_5$ | H | H | 2GL/75EO—H |
| 4 | 3-COCH$_3$,5-COC$_6$H$_5$ | H | CH$_3$ | H | H | 3GL/80EO—H |
| 5 | 3-CN,5-CHO | CH$_3$ | CH$_3$ | H | CH$_3$ | 2GL/125EO—H |
| 6 | 3-CN,5-N=N-C$_6$H$_5$ | 7-CH$_3$ | CH$_3$ | H | H | 4GL/100EO—H |
| 7 | 3-CONHC$_2$H$_4$OH,5-COCH$_3$ | 7-CH$_3$ | CH$_3$ | H | H | 3GL/30EO—H |
| 8 | 3,5-di-SO$_2$CH$_3$ | 7-CH$_3$ | CH$_3$ | CH$_3$ | CH$_3$ | 2GL/50EO—H |
| 9 | 3-SO$_2$C$_6$H$_5$,5-CH$_3$ | 5-CH$_3$,8-OCH$_3$ | CH$_3$ | H | H | 2GL/40EO—H |
| 10 | 3-SO$_2$CH$_3$,5-SCN | 5-CH$_3$,8-OCH$_3$ | CH$_3$ | CH$_3$ | CH$_3$ | 3GL/150EO—H |
| 11 | 3-CN,4-CH$_3$,5-CO$_2$C$_2$H$_5$ | 8-OCH$_3$ | CH$_3$ | H | H | 2GL/160EO—H |
| 12 | 3-CO$_2$CH$_3$,4-CH$_3$,5-CN | 8-OCH$_3$ | CH$_3$ | CH$_3$ | CH$_3$ | 2GL/140EO—H |
| 13 | 3-CN,5-NO$_2$ | 5,8-di-OCH$_3$ | CH$_3$ | H | H | 2GL/70EO—H |
| 14 | 3-NO$_2$,5-CN | 5,8-di-OCH$_3$ | CH$_3$ | H | H | 2GL/65EO—H |
| 15 | 3-CO$_2$CH$_3$,4-C$_6$H$_5$,5-CONH$_2$ | 7-Cl | CH$_3$ | H | H | 3GL/90EO—H |
| 16 | 3-SO$_2$C$_6$H$_5$,5-CH$_3$ | 7-OCH$_3$ | CH$_3$ | H | H | 5GL/55EO—H |
| 17 | 3-CO$_2$C$_2$H$_5$,5-SCN | 7-OC$_2$H$_5$ | CH$_3$ | H | H | 2GL/45EO—H |
| 18 | 3-CO$_2$C$_2$H$_5$,5-SO$_2$CH$_3$ | 7-CF$_3$ | CH$_3$ | H | H | 3GL/110EO—H |
| 19 | 3-CO$_2$CH$_3$,5-SCH$_3$ | 7-CH$_3$ | CH$_3$ | H | H | C$_2$H$_4$SO$_2$NHC$_6$H$_4$—O-2GL/100EO—H |
| 20 | 3,5-di-NO$_2$ | 7-CH$_3$ | CH$_3$ | H | H | CH$_2$C$_6$H$_4$SO$_2$C$_6$H$_4$—O-3GL/30EO—H |

TABLE 29

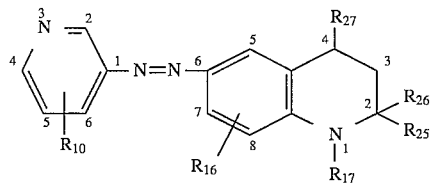

| Entry | R10 | R16 | R25 | R26 | R27 | R17 |
|---|---|---|---|---|---|---|
| 1 | H | H | H | H | H | 2GL/40EO—H |
| 2 | 2-Cl | H | CH$_3$ | H | H | 3GL/60EO—H |
| 3 | 2-CN | H | C$_2$H$_5$ | H | H | 2GL/70EO—H |
| 4 | 2,4-di-Br | H | CH$_3$ | H | H | 2GL/50EO—H |
| 5 | 2,4-di-CN | CH$_3$ | CH$_3$ | H | CH$_3$ | 3GL/80EO—H |
| 6 | 2,4-di-SO$_2$CH$_3$ | 7-CH$_3$ | CH$_3$ | H | H | 2GL/100EO—H |
| 7 | 2,4-di-SO$_2$C$_6$H$_5$ | 7-CH$_3$ | CH$_3$ | H | H | 2GL/55EO—H |
| 8 | 2-S-CH$_3$ | 7-CH$_3$ | CH$_3$ | CH$_3$ | CH$_3$ | 2GL/65EO—H |
| 9 | 2-CO$_2$CH$_3$,4-OC$_2$H$_5$ | 5-CH$_3$,8-OCH$_3$ | CH$_3$ | H | H | 3GL/90EO—H |
| 10 | 2-CH$_3$,6-NO$_2$ | 5-CH$_3$,8-OCH$_3$ | CH$_3$ | CH$_3$ | CH$_3$ | 2GL/150EO—H |
| 11 | 2-SO$_2$C$_6$H$_3$(3,4-di-Cl) | 8-OCH$_3$ | CH$_3$ | H | H | 3GL/125EO—H |
| 12 | 2-SC$_4$H$_9$-n | 8-OCH$_3$ | CH$_3$ | CH$_3$ | CH$_3$ | 2GL/200EO—H |
| 13 | 2-benzothiazol-2-yl | 5,8-di-OCH$_3$ | CH$_3$ | H | H | 2GL/35EO—H |
| 14 | 2-benzoxazol-2-yl | 5,8-di-OCH$_3$ | CH$_3$ | H | H | 4GL/50EO—H |
| 15 | 2-triazol-3-yl | 7-Cl | CH$_3$ | H | H | 2GL/20EO—H |
| 16 | 2-CON(CH$_3$)$_2$,4,6-di-CN | 7-CH$_3$ | CH$_3$ | H | H | 2GL/30EO—H |
| 17 | 2-SO$_2$NH$_2$,2,4-di-SO$_2$CH$_3$ | 7-CH$_3$ | CH$_3$ | H | H | 4GL/110EO—H |
| 18 | 2-C$_6$H$_5$,6-SC$_6$H$_5$ | 7-CF$_3$ | CH$_3$ | H | H | 3GL/160EO—H |
| 19 | 2-CHO,5-CN,6-CO$_2$CH$_3$ | 7-CH$_3$ | CH$_3$ | H | H | C$_2$H$_4$SO$_2$NHC$_6$H$_4$—O-3GL/50EO—H |
| 20 | 2-SC$_2$H$_4$OH | 7-CH$_3$ | CH$_3$ | H | H | CH$_2$C$_6$H$_4$SO$_2$C$_6$H$_4$—O-4GL/100EO—H |

TABLE 30

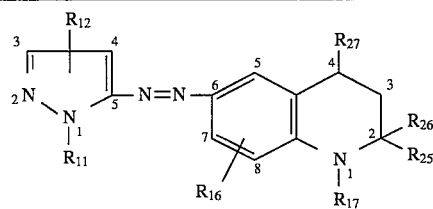

| Entry | $R_{11}$ | $R_{12}$ | $R_{16}$ | $R_{25}$ | $R_{26}$ | $R_{27}$ | $R_{17}$ |
|---|---|---|---|---|---|---|---|
| 1 | H | 4-CN | H | H | H | H | 2GL/6EO/3GL/3PO/3GL/50EO—H |
| 2 | $CH_3$ | 4-CN | H | $C_2H_5$ | H | H | 3GL/150EO—H |
| 3 | $C_6H_5$ | 4-CN | 7-$CH_3$ | $CH_3$ | H | H | 2GL/20EO—H |
| 4 | $CH_3$ | 4-$CO_2C_2H_5$ | 7-$CH_3$ | $CH_3$ | H | H | 2GL/40EO—H |
| 5 | $CH_3$ | 4-$CO_2CH_3$ | 7-$CH_3$ | $CH_3$ | H | $CH_3$ | 2GL/60EO—H |
| 6 | $SO_2CH_3$ | 4-CN | 7-$CH_3$ | $CH_3$ | H | H | 3GL/125EO—H |
| 7 | $SO_2C_2H_5$ | 4-CN | 7-$CH_3$ | $CH_3$ | H | H | 2GL/30EO—H |
| 8 | $SO_2C_6H_5$ | 4-CN | 7-$CH_3$ | $CH_3$ | $CH_3$ | H | 4GL/200EO—H |
| 9 | $SO_2CH_3$ | 4-$SO_2CH_3$ | 5-$CH_3$,8-$OCH_3$ | $CH_3$ | H | H | 2GL/70EO—H |
| 10 | $CH_3$ | 3-$CH_2CN$,4-CN | 5-$CH_3$,8-$OCH_3$ | $CH_3$ | $CH_3$ | H | 2GL/80EO—H |
| 11 | $C_6H_4$-4-Cl | 4-$CONHC_2H_4OH$ | 8-$OCH_3$ | $CH_3$ | H | H | 3GL/160EO—H |
| 12 | $C_6H_5$ | 4-$CONH_2$ | 8-$OCH_3$ | $CH_3$ | $CH_3$ | H | 2GL/70EO/5PO—H |
| 13 | $CH_2C_6H_5$ | 3-S-$C_6H_5$,4-$CO_2CH_3$ | 5,8-di-$OCH_3$ | $CH_3$ | H | H | 3GL/90EO/10PO—H |
| 14 | $CH_2C_6H_5$ | 4-$CONH_2$ | 5,8-di-$OCH_3$ | $CH_3$ | H | H | 2GL/200EO—H |
| 15 | $CH_3$ | 3-S-$C_6H_5$,4-$CO_2C_2H_5$ | 7-Cl | $CH_3$ | H | H | 2GL/180EO—H |
| 16 | $C_2H_5$ | 3-S-$CH_3$,4-$CO_2CH_3$ | 7-$OCH_3$ | $CH_3$ | H | H | 3GL/50EO—H |
| 17 | $CH_3$ | 4-$CONH_2$ | 7-$OC_2H_5$ | $CH_3$ | H | H | 2GL/40EO—H |
| 18 | $C_6H_5$ | 4-$CONH_2$ | 7-$CF_3$ | $CH_3$ | H | H | 3GL/125EO—H |
| 19 | $C_6H_5$ | 4-$CONHC_2H_4OH$ | 7-$CH_3$ | $CH_3$ | H | H | $C_2H_4SO_2NHC_6H_4$—O-3GL/100EO—H |
| 20 | $C_6H_5$ | 4-$CON(C_2H_5)_2$ | 7-$CH_3$ | $CH_3$ | H | H | $CH_2C_6H_4SO_2C_6H_4$—O-4GL/200EO—H |

TABLE 31

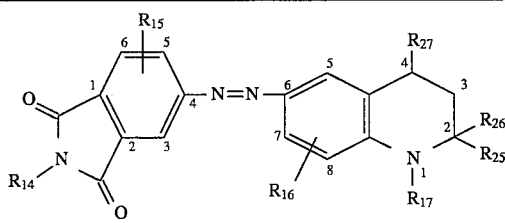

| Entry | $R_{14}$ | $R_{15}$ | $R_{16}$ | $R_{25}$ | $R_{26}$ | $R_{27}$ | $R_{17}$ |
|---|---|---|---|---|---|---|---|
| 1 | H | H | H | H | H | H | 2GL/100EO—H |
| 2 | $C_2H_5$ | H | H | $C_2H_5$ | H | H | 3GL/90EO—H |
| 3 | $C_6H_{11}$ | H | 7-$CH_3$ | $CH_3$ | H | H | 3GL/110EO—H |
| 4 | $C_6H_5$ | H | 7-$CH_3$ | $CH_3$ | H | H | 2GL/50EO—H |
| 5 | $C_4H_9$-n | 5-Br | 7-$CH_3$ | $CH_3$ | H | $CH_3$ | 2GL/40EO—H |
| 6 | $C_2H_4OH$ | 5-Cl | 7-$CH_3$ | $CH_3$ | H | H | 2GL/30EO—H |
| 7 | $C_3H_6OCH_3$ | 3,5-di-Br | 7-$CH_3$ | $CH_3$ | H | H | 2GL/60EO—H |
| 8 | $CH_2C_6H_5$ | 3,5-di$SO_2CH_3$ | 7-$CH_3$ | $CH_3$ | $CH_3$ | H | 2GL/80EO—H |
| 9 | $CH_2C_6H_{11}$ | 5-$SO_2C_2H_5$ | 5-$CH_3$,8-$OCH_3$ | $CH_3$ | H | H | 5GL/125EO—H |
| 10 | $C_2H_4C_6H_5$ | 3,5-di-CN | 5-$CH_3$,8-$OCH_3$ | $CH_3$ | $CH_3$ | H | 4GL/150EO—H |
| 11 | $C_2H_4CN$ | 5-$NO_2$ | 8-$OCH_3$ | $CH_3$ | H | H | 2GL/25EO—H |
| 12 | $C_2H_4Cl$ | 5-$OC_6H_5$ | 8-$OCH_3$ | $CH_3$ | $CH_3$ | H | 2GL/60EO—H |
| 13 | $C_2H_4OCOCH_3$ | 3,5-di-CN | 5,8-di-$OCH_3$ | $CH_3$ | H | H | 3GL/100EO/10PO—H |
| 14 | 3GL/10PO/10EO—H | H | 5,8-di-$OCH_3$ | $CH_3$ | H | H | 2GL/55EO—H |
| 15 | $C_2H_4O$-4GL/10PO/5EO—H | 2-Br | 7-Cl | $CH_3$ | H | H | 2GL/70EO—H |
| 16 | $C_6H_4$-4-$CH_3$ | 5-$OCH_3$ | 7-$OCH_3$ | $CH_3$ | H | H | 3GL/160EO—H |
| 17 | $C_2H_5$ | 5-$SC_2H_5$ | 7-$OC_2H_5$ | $CH_3$ | H | H | 2GL/125EO—H |
| 18 | n-$C_4H_9$ | 5-$SCH_3$ | 7-$CF_3$ | $CH_3$ | H | H | 3GL/200EO—H |
| 19 | $CH_3$ | 3-CN,5-$CH_3$ | 7-$CH_3$ | $CH_3$ | H | H | $C_2H_4SO_2NHC_6H_4$—O-3GL/50EO—H |
| 20 | $C_2H_5$ | 3-Br,5-$CH_3$ | 7-$CH_3$ | $CH_3$ | H | H | $CH_2C_6H_4SO_2C_6H_4$—O-2GL/60EO—H |

TABLE 32

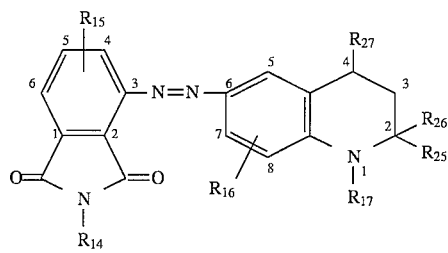

| Entry | R14 | R15 | R16 | R25 | R26 | R27 | R17 |
|---|---|---|---|---|---|---|---|
| 1 | H | H | H | H | H | H | 2GL/100EO—H |
| 2 | $C_2H_5$ | H | H | $C_2H_5$ | H | H | 4GL/150EO—H |
| 3 | $C_6H_{11}$ | H | 7-$CH_3$ | $CH_3$ | H | H | 3GL/200EO—H |
| 4 | $C_6H_5$ | H | 7-$CH_3$ | $CH_3$ | H | H | 5GL/300EO—H |
| 5 | $C_4H_9$-n | 4,6-di-Br | 7-$CH_3$ | $CH_3$ | H | $CH_3$ | 2GL/50EO—H |
| 6 | $C_2H_4OH$ | 4-CN,6-Br | 7-$CH_3$ | $CH_3$ | H | H | 2GL/30EO—H |
| 7 | $C_3H_6OCH_3$ | 4-$SO_2CH_3$,6-Br | 7-$CH_3$ | $CH_3$ | H | H | 2GL/25EO—H |
| 8 | $CH_2C_6H_5$ | 6-$NO_2$ | 7-$CH_3$ | $CH_3$ | $CH_3$ | H | 2GL/60EO/5PO—H |
| 9 | $CH_2C_6H_{11}$ | H | 7-$CH_3$ | $CH_3$ | $CH_3$ | H | 2GL/80EO/10PO—H |
| 10 | $C_2H_4C_6H_5$ | H | 5-$CH_3$,8-$OCH_3$ | $CH_3$ | $CH_3$ | H | 2GL/100EO—H |
| 11 | $C_2H_4CN$ | 4-Br,6-$NO_2$ | 8-$OCH_3$ | $CH_3$ | H | H | 2GL/75EO—H |
| 12 | $C_2H_4Cl$ | 4,6-di-Br | 8-$OCH_3$ | $CH_3$ | $CH_3$ | H | 2GL/120EO—H |
| 13 | $C_2H_4OCOCH_3$ | H | 5,8-di-$OCH_3$ | $CH_3$ | H | H | 2GL/140EO—H |
| 14 | 3GL/10PO/10EO—H | H | 5,8-di-$OCH_3$ | $CH_3$ | H | H | 2GL/50EO—H |
| 15 | $C_2H_4O$-4GL/10PO/5EO—H | H | 7-Cl | $CH_3$ | H | H | 2GL/30EO—H |
| 16 | $C_6H_4$-4-$CH_3$ | H | 7-$OCH_3$ | $CH_3$ | H | H | 3GL/150EO—H |
| 17 | $C_2H_5$ | H | 7-$OC_2H_5$ | $CH_3$ | H | H | 4GL/200EO—H |
| 18 | n-$C_4H_9$ | H | 7-$CF_3$ | $CH_3$ | H | H | 5GL/400EO—H |
| 19 | $CH_3$ | H | 7-$CH_3$ | $CH_3$ | H | H | $C_2H_4SO_2NHC_6H_4$—O-3GL/100EO—H |
| 20 | $C_2H_5$ | H | 7-$CH_3$ | $CH_3$ | H | H | $CH_2C_6H_4SO_2C_6H_4$—O-2GL/50EO—H |

TABLE 33

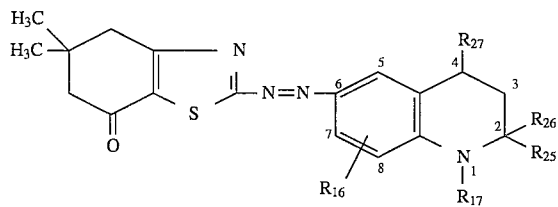

| Entry | R16 | R25 | R26 | R27 | R17 |
|---|---|---|---|---|---|
| 1 | H | H | H | H | 2GL/50EO—H |
| 2 | H | $CH_3$ | $CH_3$ | H | 4GL/80EO—H |
| 3 | H | $C_2H_5$ | H | H | 3GL/100EO—H |
| 4 | H | $CH_3$ | H | H | 2GL/30EO—H |
| 5 | H | $CH_3$ | $CH_3$ | $CH_3$ | 3GL/60EO—H |
| 6 | 7-$CH_3$ | $CH_3$ | H | H | 4GL/150EO—H |
| 7 | 7-$CH_3$ | $CH_3$ | H | H | 2GL/100EO—H |
| 8 | 7-$CH_3$ | $CH_3$ | $CH_3$ | $CH_3$ | 2GL/200EO—H |
| 9 | 5-$CH_3$,8-$OCH_3$ | $CH_3$ | H | H | 3GL/160EO—H |
| 10 | 5-$CH_3$,8-$OCH_3$ | $CH_3$ | $CH_3$ | $CH_3$ | 2GL/125EO—H |
| 11 | 8-$OCH_3$ | $CH_3$ | H | H | 2GL/40EO/5PO—H |
| 12 | 8-$OCH_3$ | $CH_3$ | $CH_3$ | $CH_3$ | 4GL/80EO/10PO—H |
| 13 | 5,8-di-$OCH_3$ | $CH_3$ | H | H | 3GL/75EO—H |
| 14 | 5,8-di-$OCH_3$ | $CH_3$ | H | H | 2GL/50EO—H |
| 15 | 7-Cl | $CH_3$ | H | H | 3GL/30EO—H |
| 16 | 7-$CH_3$ | 7-$OCH_3$ | $CH_3$ | H | 2GL/90EO—H |
| 17 | 7-$OC_2H_5$ | $CH_3$ | H | H | 2GL/150EO—H |
| 18 | 7-$CF_3$ | $CH_3$ | H | H | 3GL/160EO—H |
| 19 | 7-$CH_3$ | $CH_3$ | H | H | $C_2H_4SO_2NHC_6H_4$—O-3GL/100EO—H |
| 20 | 7-$CH_3$ | $CH_3$H | H | H | $CH_2C_6H_4SO_2C_6H_4$—O-2GL/80EO—H |

TABLE 34

Q—N=N—[benzene ring with R16, and N(R17)(R18) para to Q-N=N]

| Entry | Q | R16 | R17 | R18 |
|---|---|---|---|---|
| 1 | 4-methylphenyl-N=N– | 3-CH₃ | 3-CH₃-C₆H₄– (3-methylphenyl) | 3GL/50EO—H |
| 2 | 4-bromo-3-methyl-5-(4-methylphenylazo)isothiazole | 3-CH₃ | 4-(O-2Gl/25EO—H)phenyl-CH₃ | 2Gl/25EO—H |
| 3 | 4-cyano-3-methyl-5-(4-methylphenylazo)isothiazole | 3-OC₂H₅ | CH(CH₃)C₂H₅ | 4Gl/150EO—H |
| 4 | 3-methyl-5-(4-methylphenylazo)-1,2,4-thiadiazole | 3-C₂H₅ | –CH₂–C₆H₄–CO₂C₂H₅ (4-) | 4Gl/200EO—H |
| 5 | 3-methyl-5-(4-methylphenylazo)-1,2,4-thiadiazole (isomer) | H | –CH₂–C₆H₄–Cl (3-) | 3Gl/250EO—H |
| 6 | 2-acetyl-3-methoxycarbonyl-5-(4-methylphenylazo)thiophene | H | –CH₂–C₆H₄–Cl (4-) | 4Gl/80EO—H |

TABLE 34-continued
Q—N=N—⟨aryl with R16⟩—N(R17)(R18)
| Entry | Q | R16 | R17 | R18 |
|---|---|---|---|---|
| 7 | 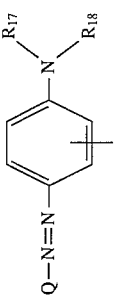 4-benzoylphenyl | 3-CH2—O-3GL/75EO—H | C2H5 | C2H5 |
| 8 |  4-Cl, 3-CH3, (CH3)2NSO2- phenyl | 3-O—C2H4—O-3GL/100EO—H | C2H5 | C2H5 |
| 9 | 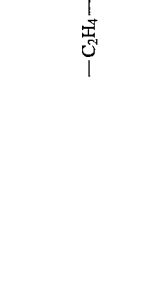 2-CH3, 3'-CH3 azobenzene | 3-CH3 | —C2H4—O—C(O)—C6H5 | —CH2 (benzyl) 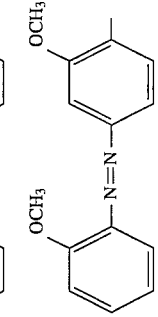 |
| 10 | 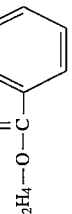 2-OCH3, 3'-OCH3 azobenzene | 3-CH3 | —CH2CH(Cl)CH2Cl | 5GL/50EO/5PO—H |
| 11 |  3-Br, 4-CH3, O2N- phenyl | H | —CH2CH2—N(succinimide) 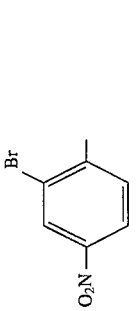 | 3GL/120EO—H |
|   |   |   |   | 3GL/200EO—H |

TABLE 34-continued
| Entry | Q | $R_{16}$ | $R_{17}$ | $R_{18}$ |
|---|---|---|---|---|
| 12 | 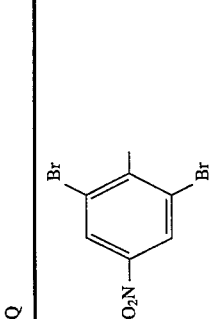 | H | $-CH_2CH_2-N$  | 4GL/175EO—H |
| 13 |  | H | $-CH_2CH_2-N$  | 3GL/85EO—H |
| 14 | 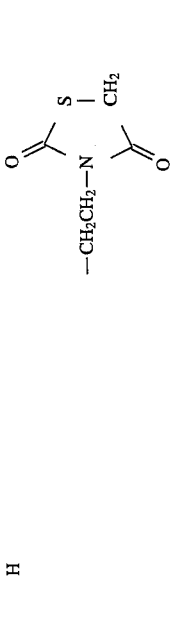 | H | $-CH_2CH_2-N$ 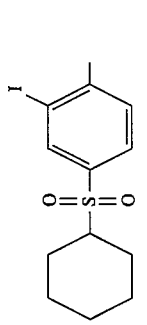 | 6GL/100EO/10BO—H |
| 15 | 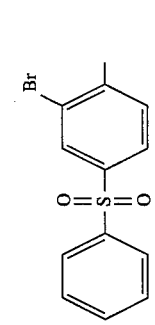 | 3-$CH_3$ | $-CH_2CH_2-N$  | 5GL/150EO—H |

TABLE 34-continued
| Entry | Q | R$_{16}$ | R$_{17}$ | R$_{18}$ |
|---|---|---|---|---|
| 16 | 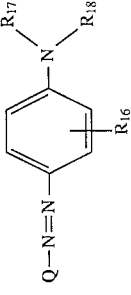 | 3-CH$_3$ | 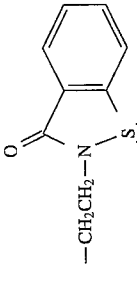 | 3GL/200EO—H |
| 17 |  | 3-CH$_3$ | 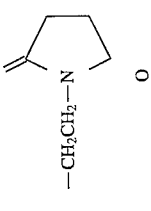 | 3GL/150EO—H |
| 18 | 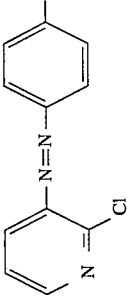 | 3-CH$_3$ | 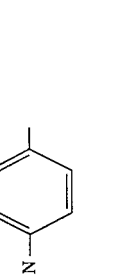 | 3GL/60EO—H |
| 19 | 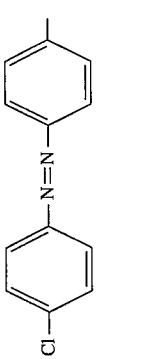 | 3-CH$_3$ | —C$_2$H$_4$—N(COCH$_3$)SO$_2$CH$_3$ | 3GL/80EO—H |
| 20 | 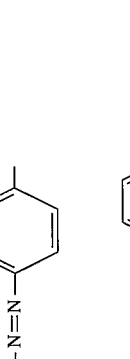 | H | 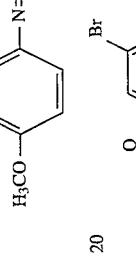 | C$_2$H$_5$ |

TABLE 34-continued

Q—N=N—[phenyl with R16]—N(R17)(R18)

| Entry | Q | R16 | R17 | R18 |
|---|---|---|---|---|
| 21 | 4-methyl-3-(SO₂N(C₂H₅)₂)-phenyl with N(C₂H₅)(CH₃)SO₂- | H | —CH₂—C₆H₄—O-4GL/100EO—H | CH₃ |
| 22 | 2-chloro-phenyl-N=N-(4-methylphenyl) | H | —CH₂C₆H₄NHC₆H₄-3(O-3GL/200EO—H) | C₆H₁₁ |
| 23 | 2-methyl-3,5-di(CN)-phenyl with CN | H | 4-methylphenyl-O-5Gl/60EO—H | CH₃ |
| 24 | 4-methyl-3,5-di(SO₂CH₃)-phenyl with SO₂CH₃ | H | 4-methylphenyl-O—C₂H₄-3GL/55EO/5PO—H | CH₃ |
| 25 | 4-methyl-3,5-di(CF₃)-phenyl with O₂N | H | —C₂H₄—SO₂—(4-phenyl)-2GL/150DEO—H | CH₃ |

TABLE 34-continued
| Entry | Q | $R_{16}$ | $R_{17}$ | $R_{18}$ |
|---|---|---|---|---|
| 32 |  | 3-CH$_3$ | —CH$_2$CH$_2$SO$_2$CH$_2$CH$_2$—S—CH$_3$ | 4GL/60EO—H |

TABLE 35
| | | Q—N=N—Ar—(Z) | |
|---|---|---|---|
| Entry | Q | Ar | Z |
| 1 | 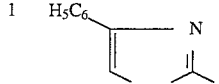 | 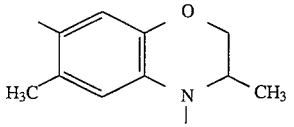 | 3GL/10PO/10EO—H |
| 2 | 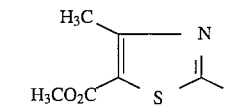 | 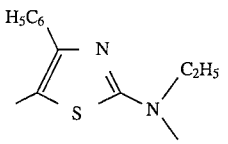 | 4GL/10PO/15EO—H |
| 3 | 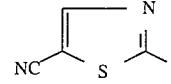 | 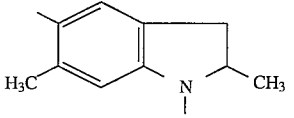 | 3GL/12PO/15EO—H |
| 4 | 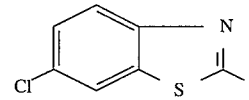 | 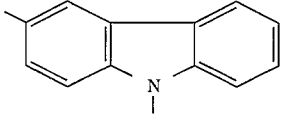 | 4GL/10PO/10EO—H |
| 5 | 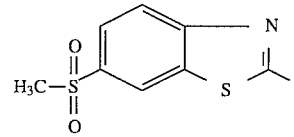 | 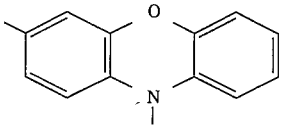 | 3GL/10PO/10EO—H |
| 6 | 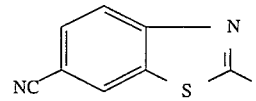 | 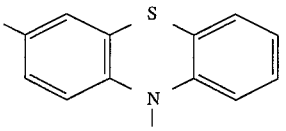 | 3GL/10PO/10EO—H |
| 7 | 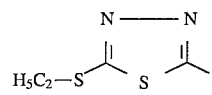 | 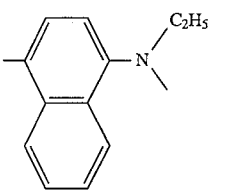 | 3GL/10PO/10EO—H |
| 8 | 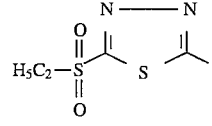 | 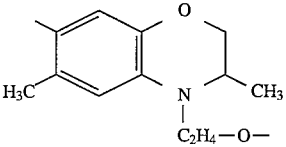 | 5GL/10PO/10EO—H |
| 9 | 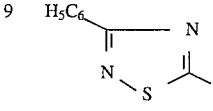 | 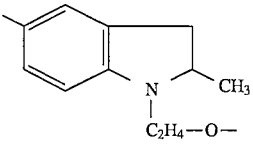 | 3GL/100EO—H |

TABLE 35-continued

Q—N=N—Ar—(Z)

| Entry | Q | Ar | Z |
|---|---|---|---|
| 10 | H-10EO/10PO/3GL—C₂H₄—S—C(=N—N)—S— (with acetone hydrazone) | tetrahydroquinoline-O— | 3GL/50EO—H |
| 11 | 5-chloro-benzisothiazol-3-yl | carbazol-3-yl, N—C₂H₄—O— | 2GL/200EO—H |
| 12 | benzisothiazol-3-yl | C(C₆H₅)=C(CH₃)—S— linked to N(C₂H₅)(4-O—C₆H₄)— | 3GL/150EO—H |
| 13 | 2-chloropyridin-3-yl | 4-methyl-1-(N,N-dimethylamino)naphthyl | (2GL/40EO—H)₂ |
| 14 | 2,6-dibromopyridin-3-yl | 2,4-dimethylphenyl-N(CH(CH₃)CH₂—O—)— | 4GL/75EO—H |
| 15 | N-ethyl-phthalimid-4-yl | 2,5-dimethyl-4-methylphenyl-N(CH(CH₃)CH₂—O—)(C₂H₄—O—) | 5GL/160EO—H |
| 16 | N-ethyl-phthalimid-4-yl | 2,4-dimethylphenyl-N(CH₂CH₂—O—)(C₂H₄—O—) | 3GL/90EO—H |

TABLE 36

$$M=CH-\underset{R_{16}}{\underset{|}{\bigcirc}}-N\underset{R_{18}}{\overset{R_{17}}{<}}$$

| Entry | M | $R_{16}$ | $R_{17}$ | $R_{18}$ |
|---|---|---|---|---|
| 1 | $\underset{NC}{\overset{NC}{>}}C=$ | H | $C_2H_5$ | 1EO/3GL/30EO—H |
| 2 | $\underset{H_3CO_2C}{\overset{NC}{>}}C=$ | H | $C_6H_{11}$ | 2GL/40EO—H |
| 3 | $\underset{H_3CO_2C}{\overset{NC}{>}}C=$ | 3-$CH_3$ | $CH(CH_3)C_2H_5$ | 4GL/25EO—H |
| 4 | $\underset{H_2NOC}{\overset{NC}{>}}C=$ | 3-$CH_3$ | $CH_2CH=CH_2$ | 4GL/45EO—H |
| 5 | $\underset{H_5C_8OC}{\overset{NC}{>}}C=$ | 3-$CH_3$ | $-CH_2-\bigcirc-Cl$ (3-Cl) | 3GL/75EO—H |
| 6 | $\underset{H_5C_6O_2C}{\overset{NC}{>}}C=$ | H | $-CH_2-\bigcirc-Cl$ (4-Cl) | 6GL/200EO—H |
| 7 | $\underset{H_{11}C_6O_2C}{\overset{NC}{>}}C=$ | 3-Cl | $C_2H_5$ | 3GL/150EO/5BO—H |
| 8 | $\underset{(C_2H_5)_2NOC}{\overset{NC}{>}}C=$ | 3-O—$C_2H_4$—O-3GL/100EO—H | $C_2H_5$ | $-CH_2-\bigcirc$ |
| 9 | $\underset{NC}{\overset{NC}{>}}C=C\underset{C=}{\overset{C_6H_5}{<}}$ (with H) | 3-$CH_3$ | $-C_2H_4-O-\overset{O}{\underset{\|}{C}}-\bigcirc$ | 2GL/5EO/1GL/50EO—H |
| 10 | (methyl-cyano-dioxo-pyridine with $C_2H_4$—OH on N) | 3-$OCH_3$ | $-CH_2CH(Cl)CH_2Cl$ | 2GL/150EO—H |
| 11 | (NC, $C_6H_5$ substituted furanone) | H | 3GL/125EO—H | 3GL/125EO—H |

TABLE 36-continued

M=CH—⟨aryl with R16⟩—N(R17)(R18)

| Entry | M | R16 | R17 | R18 |
|---|---|---|---|---|
| 12 | H3CO2C and C6H5 substituted furanone (methylene) | 3-CH3 | —CH2CH2—N(morpholine-2,5-dione-like, with N—H) | 2GL/200EO/20PO—H |
| 13 | NC, CH3 substituted furanone (methylene) | H | C6H5 | 3GL/75EO—H |
| 14 | NC, thiophen-2-yl substituted furanone (methylene) | H | CH3 | 4GL/90EO—H |
| 15 | NC, 4-methoxyphenyl substituted furanone (methylene) | 3-CH3 | 2GL/125EO—H | 2GL/125EO—H |
| 16 | NC, 4-methylphenyl substituted furanone (methylene) | H | CH2CH2Cl | 3GL/50EO—H |
| 17 | 3-methyl-1H-pyrazol-5(4H)-one (methylene) | H | 2GL/50EO—H | 2GL/50EO—H |
| 18 | 1-phenyl-3-methyl-pyrazol-5(4H)-one (methylene) | 3-CH3 | 2GL/25EO—H | 2GL/25EO—H |
| 19 | 1-(2-hydroxyethyl)-3-methyl-pyrazol-5(4H)-one (methylene) | H | 3GL/75EO—H | 3GL/75EO—H |

TABLE 36-continued
M=CH—⟨phenyl with R16⟩—N(R17)(R18)
| Entry | M | R16 | R17 | R18 |
|---|---|---|---|---|
| 20 | 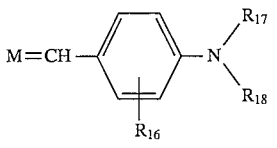 | 3-CH$_3$ | CH$_2$CH$_2$COC$_6$H$_5$ | 4GL/100EO—H |
| 21 | 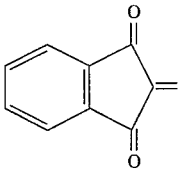 | 3-Cl | CH$_2$C$_6$H$_5$ | 6GL/50EO—H |
| 22 | 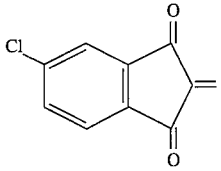 | H | 4GL/80EO—H | 4GL/80EO—H |
| 23 | 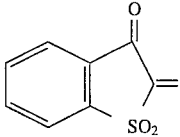 | 3-CH$_3$ | 3GL/100EO—H | 3GL/100EO—H |
| 24 | 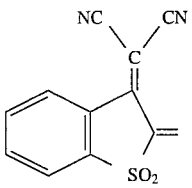 | H | CH$_2$CH$_2$SO$_2$C$_6$H$_5$ | 3GL/150EO/15BO—H |
| 25 | 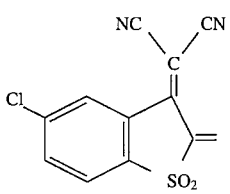 | 3-CH$_3$ | CH$_2$CH$_2$SO$_2$CH=CH$_2$ | 3GL/50EO—H |
| 26 | 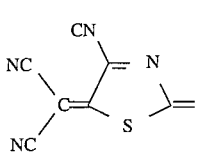 | 3-CH$_3$ | CH$_2$CH$_2$SO$_2$CH$_2$SCH$_3$ | 6GL/100EO—H |
| 27 | 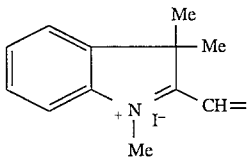 | 3-CH$_3$ | CH$_2$CH(CH$_3$)$_2$ | 4GL/90EO/5PO—H |

TABLE 36-continued

M=CH—C₆H₃(R₁₆)—N(R₁₇)(R₁₈)

| Entry | M | R₁₆ | R₁₇ | R₁₈ |
|---|---|---|---|---|
| 28 | 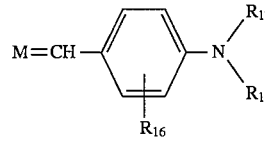 ZnCl₄⁻²/2, Z-substituted 3,3-dimethyl-1-methyl-indolinium, Br⁻, —CH= | 3-CH₃ | CH₂CH₂OH | 4GL/200EO—H |
| 29 | 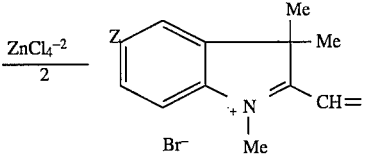 N⁺(CH₃)-benzothiazolium, Cl⁻, —CH= | 3-Cl | 3GL/75EO—H | .3GL/75EO—H |
| 30 | 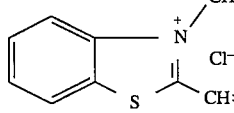 N⁺(CH₂C₆H₅)-benzothiazolium (H₃CO-substituted), Cl⁻, —CH= | H | C₂H₄—O-2GL/60EO—H | 2GL/60EO—H |
| 31 | 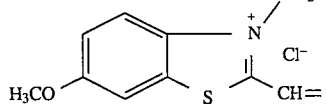 N⁺(C₂H₄CO₂⁻Na⁺)-benzoxazolium, Cl⁻, —CH= | 3-CH₃ | CH₂CH(OCH₃)CH₂OCH₃ | 3GL/40EO/4BO—H |
| 32 | 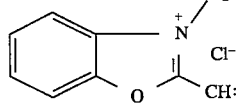 N⁺(C₂H₄CO₂⁻K⁺)-benzoxazolium, Cl⁻, —CH= | H | CH₂CH₂OC₆H₅ | 3GL/50EO—H |
| 33 | 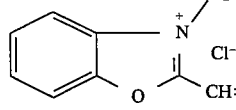 CH₃COO-substituted 3,3-dimethyl-1-methyl-indolinium, —CH= | 3-CH₃ | C₂H₅ | 3GL/100EO—H |
| 34 | 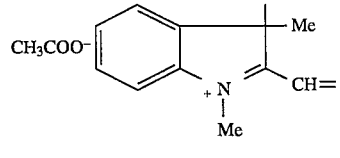 Cl-substituted 3,3-dimethyl-1-methyl-indolinium, I⁻, —CH= | 3-CH₃ | 2GL/75EO—H | 2GL/75EO—H |
| 35 | 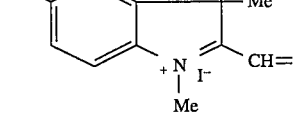 H₃C-substituted 3,3-dimethyl-1-methyl-indolinium, Br⁻, —CH= | 3-CH₃ | 4GL/150EO—H | 4GL/150EO—H |
| 36 | 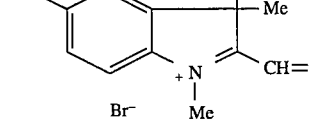 ZnCl₄⁻²/2, Z-substituted 3,3-dimethyl-1-methyl-indolinium, Br⁻, —CH= | H | C₆H₅ | 4GL/200EO—H |

TABLE 36-continued
| | | M=CH—⟨Ar⟩—N(R17)(R18), R16 on ring | | |
|---|---|---|---|---|
| Entry | M | R16 | R17 | R18 |
| 37 | 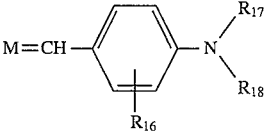 | H | 2GL/50EO—H | 2GL/50EO—H |
| 38 | 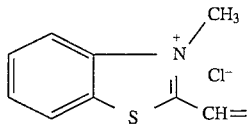 | H | 2GL/15EO—H | 2GL/15EO—H |
| 39 | 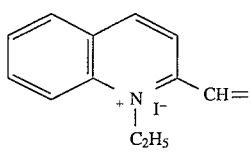 | H | CH2C6H5 | 3GL/60EO—H |
| 40 | 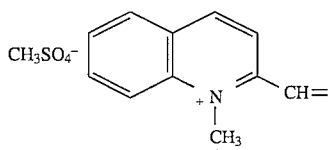 | H | 2GL/75EO/5BO—H | 2GL/75EO/5BO—H |
TABLE 37
| | M=C—Ar—(Z) | | |
|---|---|---|---|
| Entry | M | Ar | Z |
| 1 | 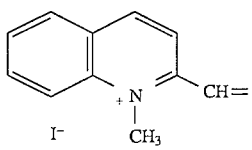 | 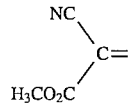 | 3GL/90EO—H |
| 2 | 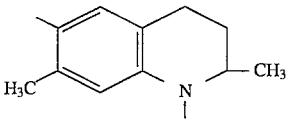 | 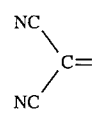 | 2GL/150EO—H |
| 3 | 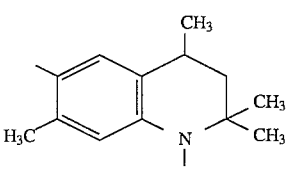 | 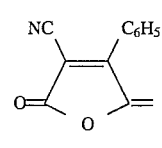 | 2GL/40EO—H |

TABLE 37-continued $M=C-Ar-(Z)$

| Entry | M | Ar | Z |
|---|---|---|---|
| 4 | H₂N-CO-C(C₆H₅)=C-C(=O)-O- (methylene furanone carboxamide) | 5,6-dimethyl-8-methoxy-2-methyl-1-(2-ethoxyethyl)-1,2,3,4-tetrahydroquinoline | 4GL/50EO—H |
| 5 | NC, H₃COC₂H₄O₂C—C= (dicyanoethylene ester) | 4-methyl-1-(N-ethyl-N-methyl)aminonaphthalene | 3GL/70EO—H |
| 6 | H₅C₂O-CO-C(C₆H₅)=C-C(=O)-O- | 4-methyl-2-(N-methyl-N-(2-methylpropyl))aminophenoxy (morpholine derivative) | 3GL/50EO/5PO—H |
| 7 | indane-1,3-dione methylene | 4,5-dimethyl-2-(N-(2-ethoxyethyl)-N-methyl-N-propyl) amino phenoxy | 3GL/100EO—H |
| 8 | benzothiophene-SO₂ dicyanomethylene | 4,5-dimethyl-2-(N-methyl-N-isopropyl)aminophenoxy | 5GL/200EO—H |
| 9 | NC, H₅C₂O₂C—C= | 3-methyl-N-alkyl carbazole | 4GL/100EO—H |
| 10 | NC, thienyl furanone | N-(2-ethoxyethyl)-3-methylcarbazole | 5GL/150EO—H |
| 11 | NC, C₆H₅, NC—C=C—CH= | 4-methyl-2-(N-phenyl-N-methyl)aminophenoxy | 3GL/60EO—H |
| 12 | H₅C₆, NC, NC—C=C(thiazole) | 4-methyl-2-(N-(2-ethoxyethyl)-N-methyl)aminophenoxy | 3GL/70EO—H |

TABLE 37-continued
| | | M=C—Ar—(Z) | |
|---|---|---|---|
| Entry | M | Ar | Z |
| 13 | 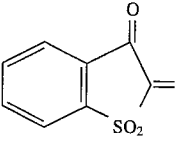 | 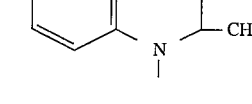 | 4GL/40EO—H |
| 14 | 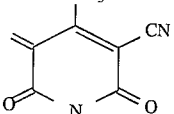 | 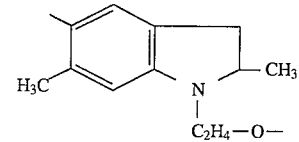 | 3GL/200EO—H |
| 15 | 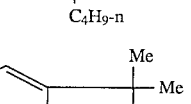 | 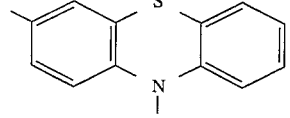 | 4GL/50EO—H |
| 16 | 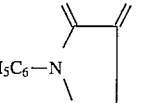 | 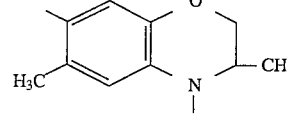 | 3GL/60EO/10BO—H |
| 17 | 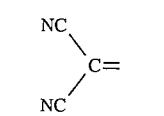 | 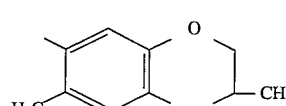 | 3GL/100EO—H |
| 18 | 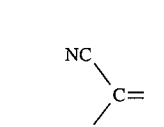 | 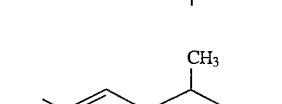 | 3GL/150EO—H |
| 19 | 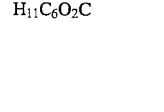 | 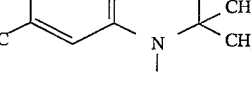 | 5GL/75EO—H |
| 20 | 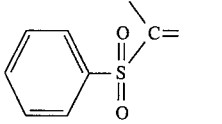 | 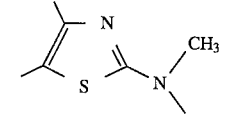 | 4GL/50EO—H |

TABLE 37-continued
M=C—Ar—(Z)
| Entry | M | Ar | Z |
|---|---|---|---|
| 21 | 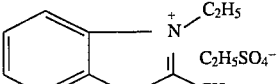 | 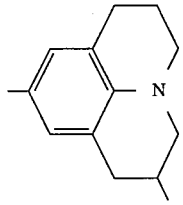 | 3GL/200EO—H |
| 22 | 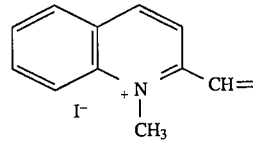 | 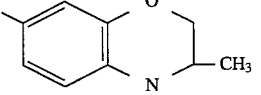 | 3GL/60EO—H |
| 23 | 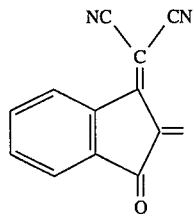 | 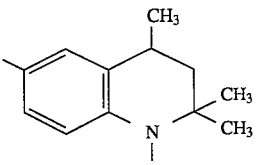 | 8GL/50EO/5PO—H |
| 24 | 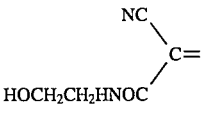 | 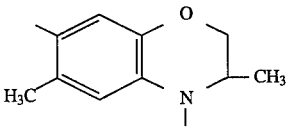 | 5GL/100EO—H |
TABLE 38
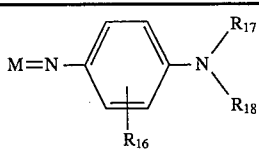
| Entry | M | $R_{16}$ | $R_{17}$ | $R_{18}$ |
|---|---|---|---|---|
| 1 |  | 3-$CH_3$ | 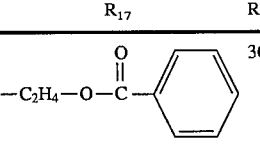 | 3GL/100EO—H |
| 2 |  | 3-$OCH_3$ | —$CH_2CH(Cl)CH_2Cl$ | 4GL/150EO—H |
| 3 | 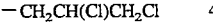 | H | 2GL/60EO—H | 2GL/60EO—H |

TABLE 38-continued

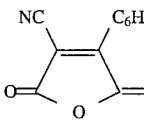

| Entry | M | R16 | R17 | R18 |
|---|---|---|---|---|
| 4 | 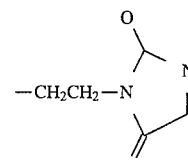 | 3-CH3 | 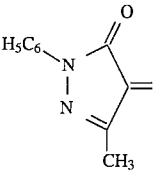 | 4GL/40EO—H |
| 5 |  | H | $C_6H_5$ | 3GL/30EO—H |
| 6 | 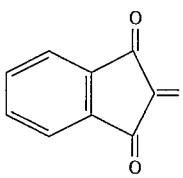 | H | $CH_3$ | 2GL/25EO—H |
| 7 |  | 3-CH3 | 2GL/50EO—H | 2GL/50EO—H |
| 8 | 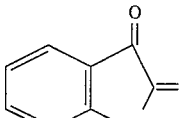 | H | $CH_2CH_2Cl$ | 3GL/200EO—H |

TABLE 39

| Entry | P | R16 | R17 | R18 |
|---|---|---|---|---|
| 1 | H | H | $C_2H_5$ | 2GL/80EO—H |
| 2 | H | H | $C_6H_{11}$ | 4GL/100EO—H |
| 3 | H | 3-CH3 | $CH_2CH=CH_2$ | 3GL/170EO—H |
| 4 | H | 3-CH3 | 5GL/50EO—H | 5GL/50EO—H |
| 5 | CHO | 3-CH3 | $CH_2C_6H_5$ | 3GL/200EO—H |
| 6 | H | 2-CH | $CH_3$ | 4GL/30EO—H |
| 7 | H | 2-OCH3 | $C_2H_4C_6H_5$ | 2GL/45EO—H |
| 8 | H | 2-OCH3,5-CH3 | 2GL/50EO/5PO—H | 2GL/50EO/5PO—H |
| 9 | $N_2^+Cl^-$ | 3-OCH3 | 3GL/100EO/5BO—H | 3GL/100EO/5BO—H |
| 10 | H | 3-CF3 | 2GL/100EO—H | 2GL/100EO—H |
| 11 | H | 3-Cl | 2GL/30EO—H | 2GL/30EO—H |
| 12 | CHO | H | $C_6H_{10}$-4-$CH_3$ | 4GL/60EO—H |
| 13 | CHO | H | $C_6H_4$-4-$OCH_3$ | 3GL/140EO—H |
| 14 | CHO | 3-CH3 | $C_6H_4$-3-Cl | 4GL/250EO—H |
| 15 | NO | 3-CH3 | $C_6H_4$-3-$CO_2C_2H_5$ | 6GL/75EO/25PO—H |

TABLE 39-continued

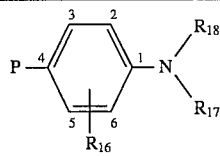

| Entry | P | $R_{16}$ | $R_{17}$ | $R_{18}$ |
|---|---|---|---|---|
| 16 | $NH_2$ | 3-$CH_3$ | $C_6H_4$-4-CN | 6GL/50EO—H |
| 17 | NO | H | $C_2H_4C_6H_5$ | 4GL/20EO—H |
| 18 | $NH_2$ | H | $C_2H_4OC_6H_5$ | 3GL/20EO—H |
| 19 | CH=N—$C_6H_5$ | H | $CH(CH_3)C_2H_5$ | 4GL/80EO—H |
| 20 | CH=N—$C_6H_4$-3$CH_3$ | H | $CH(CH_3)_2$ | 2GL/100EO—H |
| 21 | $COCH_3$ | H | $CH_2C_6H_5$ | 6GL/150EO—H |
| 22 | $COC_6H_5$ | H | $CH_2C_6H_{11}$ | 3GL/50EO—H |
| 23 | $COCH_3$ | H | $C_2H_4SC_6H_5$ | 2.5GL/10EO—H |
| 24 | NH—$NH_2$ | H | $C_2H_4OC_2H_5$ | 3GL/30EO—H |
| 25 | $NO_2$ | H | $C_2H_4SC_2H_5$ | 3GL/50EO—H |
| 26 | H | 3-$OC_6H_5$ | $C_3H_6SO_2CH_3$ | 3GL/90EO—H |
| 27 | H | 3-$SC_6H_5$ | $C_2H_4OC_2H_4OC_2H_5$ | 6GL/150EO—H |
| 28 | H | 2,5-di-Cl | $C_2H_4CN$ | 6GL/250EO—H |
| 29 | H | 2,5-di-$CH_3$ | $CH_2C_6H_{11}$ | 4GL/160EO—H |
| 30 | NH—$NH_2$ | H | $CH_2CH_2Cl$ | 4GL/90EO—H |
| 31 | $COCH_3$ | 3-$CH_3$ | $C_4H_4OCOCH_3$ | 3GL/50EO—H |
| 32 | $NO_2$ | 3-$CH_3$ | $C_2H_4N(SO_2CH_3)CH_3$ | 3GL/100EO—H |
| 33 | $NH_2$ | 3-$CH_3$ | $C_2H_4CON(C_2H_5)_2$ | 4GL/200EO—H |
| 34 | NO | 3-$CH_3$ | $C_2H_4SO_2N(CH_3)_2$ | 5GL/120EO—H |
| 35 | CHO | 3-$CH_3$ | $C_2H_4SO_4N(CH_3)C_6H_5$ | 4GL/95EO—H |
| 36 | $N_2^+Cl^-$ | 3-$CH_3$ | $C_2H_4SO_2(CH_3)C_6H_{11}$ | 3GL/80EO—H |
| 37 | —N=CH—$C_6H_5$ | 3-$CH_3$ | $C_2H_4N(SO_2C_6H_5)C_2H_5$ | 3GL/60EO—H |
| 38 | CHO | 3-$CH_3$ | $C_2H_4OCONHC_6H_5$ | 4GL/100EO—H |
| 39 | $COC_6H_5$ | 3-$CH_3$ | $C_2H_4SO_2C_6H_5$ | 3GL/70EO—H |
| 40 | NH—$NH_2$ | 3-$CH_3$ | $C_2H_4OCO_2C_2H_5$ | 3GL/50EO—H |
| 41 | $NO_2$ | 3-$CH_3$ | $C_2H_4SO_2CH=CH_2$ | 4GL/80EO—H |
| 42 | NO | 3-$CH_3$ | $C_2H_4OCOC_6H_5$ | 3GL/100EO—H |
| 43 | CHO | 3-$CH_3$ | $CH_2CH(OCH_3)CH_2OCH_3$ | 3GL/120EO—H |
| 44 | CHO | 3-$CH_3$ | $C_2H_4OCON(CH_3)_2$ | 4GL/40EO—H |

TABLE 40

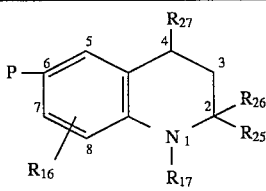

| Entry | P | $R_{16}$ | $R_{25}$ | $R_{26}$ | $R_{27}$ | $R_{17}$ |
|---|---|---|---|---|---|---|
| 1 | H | H | H | H | H | 2GL/30EO—H |
| 2 | CHO | H | $CH_3$ | H | H | 4GL/50EO/10PO—H |
| 3 | NO | H | $C_2H_5$ | H | H | 3GL/90EO—H |
| 4 | H | H | $CH_3$ | H | H | 5GL/140EO—H |
| 5 | CHO | H | $CH_3$ | $CH_3$ | $CH_3$ | 3GL/180EO—H |
| 6 | NO | 7-$CH_3$ | $CH_3$ | H | H | 4GL/200EO—H |
| 7 | $N_2^+Cl^-$ | 7-$CH_3$ | $CH_3$ | H | H | 2GL/90EO—H |
| 8 | $NH_2$ | 7-$CH_3$ | $CH_3$ | $CH_3$ | $CH_3$ | 2GL/45EO—H |
| 9 | H | 5-$CH_3$,8-$OCH_3$ | $CH_3$ | H | H | 3GL/250EO—H |
| 10 | H | 5-$CH_3$,8-$OCH_3$ | $CH_3$ | $CH_3$ | $CH_3$ | 2GL/100EO—H |
| 11 | NO | 8-$OCH_3$ | $CH_3$ | H | H | 2GL/150EO—H |
| 12 | CHO | 8-$OCH_3$ | $CH_3$ | $CH_3$ | $CH_3$ | 4GL/60EO—H |
| 13 | CHO | 5,8-di-$OCH_3$ | $CH_3$ | H | H | 3GL/20EO—H |
| 14 | NO | 5,8-di-$OCH_3$ | $CH_3$ | H | H | 4GL/100EO—H |
| 15 | H | 7-Cl | $CH_3$ | H | H | 6GL/90EO—H |
| 16 | NH—$NH_2$ | 7-$OCH_3$ | $CH_3$ | H | H | 6GL/50EO—H |
| 17 | $NO_2$ | 7-$OC_2H_5$ | $CH_3$ | H | H | 4GL/80EO—H |
| 18 | $COCH_3$ | 7-$CF_3$ | $CH_3$ | H | H | 3GL/90EO—H |
| 19 | H | 7-$CH_3$ | $CH_3$ | H | H | $C_2H_4SO_2NHC_6H_4$-4-O-3GL/100EO—H |
| 20 | —N=CH—$C_6H_5$ | 7-$CH_3$ | $CH_3$ | H | H | $CH_2C_6H_4SO_2C_6H_4$-4-O-4GL/90EO—H |

TABLE 41

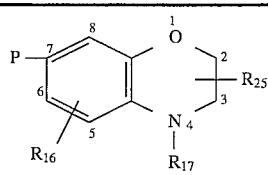

| Entry | P | $R_{16}$ | $R_{25}$ | $R_{17}$ |
|---|---|---|---|---|
| 1 | H | H | H | 2GL/90EO/10BO—H |
| 2 | H | H | 2-CH$_3$ | 4GL/140EO—H |
| 3 | CHO | H | 2-CH$_3$ | 3GL/90EO—H |
| 4 | NO | H | H | 3GL/90EO—H |
| 5 | H | 6-CH$_3$ | H | 6GL/200EO—H |
| 6 | H | 6-CH$_3$ | 3-CH$_3$ | 6GL/45EO—H |
| 7 | CHO | 6-CH$_3$ | 3-CH$_3$ | 4GL/60EO—H |
| 8 | NO | 6-CH$_3$ | 3-CH$_3$ | 4GL/20EO—H |
| 9 | NH$_2$ | 6-CH$_3$ | H | 3GL/100EO—H |
| 10 | NO$_2$ | H | H | 3GL/100EO—H |
| 11 | —N=CH—C$_6$H$_5$ | H | 3-CH$_3$ | 4GL/100EO—H |
| 12 | H | 6-OCH$_3$ | 3-CH$_3$ | 5GL/20EO—H |
| 13 | H | 6-Cl | 3-CH$_3$ | 4GL/40EO—H |
| 14 | N$_2^+$HSO$_4^-$ | H | H | 3GL/90EO—H |
| 15 | H | 6,8-di-CH$_3$ | 3-CH$_3$ | 3GL/200EO—H |
| 16 | N$_2^+$Br$^-$ | H | 3-CH$_3$ | 4GL/150EO—H |
| 17 | H | 6-CH$_3$ | 3-CH$_3$ | 3GL/30EO—H |
| 18 | COCH$_3$ | H | 3-CH$_3$ | 3GL/170EO—H |
| 19 | COCH$_3$ | H | 3-CH$_3$ | 4GL/60EO—H |
| 20 | NH—NH$_2$ | H | 3-CH$_3$ | 3GL/150EO—H |
| 21 | H | 6-CH$_3$ | 3-CH$_3$ | C$_2$H$_4$SO$_4$N(CH$_3$)-3GL/100EO—H |
| 22 | H | 6-CH$_3$ | 3-CH$_3$ | C$_2$H$_4$S-4GL/50EO—H |

TABLE 42

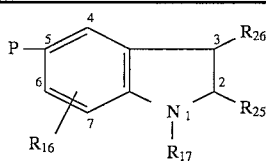

| Entry | P | $R_{16}$ | $R_{25}$ | $R_{26}$ | $R_{17}$ |
|---|---|---|---|---|---|
| 1 | H | H | H | H | 2GL/100EO—H |
| 2 | H | H | CH$_3$ | H | 4GL/150EO—H |
| 3 | CHO | H | CH$_3$ | H | 3GL/90EO/20PO—H |
| 4 | CHO | H | CH$_3$ | H | 5GL/50EO—H |
| 5 | NO | H | CH$_3$ | H | 3GL/70EO—H |
| 6 | H | 6-CH$_3$ | CH$_3$ | CH$_3$ | 4GL/200EO—H |
| 7 | NH$_2$ | 6-CH$_3$ | CH$_3$ | H | 2GL/100EO—H |
| 8 | NO$_2$ | 6-CH$_3$ | CH$_3$ | H | 2GL/20EO—H |
| 9 | H | 4,6-di-CH$_3$ | CH$_3$ | H | 3GL/40EO—H |
| 10 | H | 6-OCH$_3$ | CH$_3$ | H | 2GL/150EO—H |
| 11 | H | 6-Cl | CH$_3$ | H | 2GL/60EO—H |
| 12 | H | 6-C$_2$H$_5$ | CH$_3$ | H | 4GL/70EO—H |
| 13 | NO | 6-CH$_3$ | CH$_3$ | H | 3GL/130EO/10PO—H |
| 14 | NH$_2$ | 6-CH$_3$ | CH$_3$ | H | 4GL/25EO—H |
| 15 | N$_2^+$Cl$^-$ | H | CH$_3$ | H | 6GL/25EO—H |
| 16 | NH—NH$_2$ | H | CH$_3$ | H | 6GL/25EO—H |
| 17 | —N=CH—C$_6$H$_5$ | H | CH$_3$ | H | 4GL/100EO—H |
| 18 | COCH$_3$ | H | CH$_3$ | H | C$_2$H$_4$OC$_6$H$_4$-3GL/45EO—H |
| 19 | COC$_6$H$_5$ | H | CH$_3$ | H | CH$_2$CH(CH$_3$)O-3GL/120EO—H |
| 20 | CHO | H | CH$_3$ | H | C$_3$H$_6$O-4GL/30EO—H |

TABLE 43

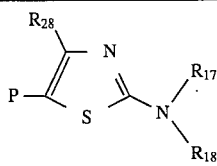

| Entry | P | $R_{17}$ | $R_{18}$ | $R_{28}$ |
|---|---|---|---|---|
| 1 | H | 2GL/40EO—H | 2GL/40EO—H | $C_6H_5$ |
| 2 | CHO | 4GL/60EO—H | 4GL/60EO—H | $C_6H_5$ |
| 3 | NO | 3GL/40EO/5PO—H | 3GL/40EO/5PO—H | $CH_3$ |
| 4 | $NH_2$ | 5GL/50EO—H | 5GL/50EO—H | $CH_3$ |
| 5 | $N_2^+Br^-$ | 3GL/100EO—H | 3GL/100EO—H | $C_6H_{11}$ |
| 6 | H | 4GL/150EO—H | $CH_3$ | $C_6H_4$-4-$CH_3$ |
| 7 | H | $C_6H_5$ | 2GL/90EO—H | $C_6H_4$-4-$CH_3$ |
| 8 | NO | $CH_2C_6H_5$ | 2GL/60EO—H | $C_6H_4$-4-$OCH_3$ |
| 9 | CHO | $CH_3$ | 3GL/140EO—H | $C_6H_4$-4-Cl |
| 10 | $NH_2$ | $CH_3$ | 2GL/80EO/10BO—H | $C_6H_5$ |
| 11 | $NO_2$ | 2GL/45EO—H | 2GL/45EO—H | $C_6H_5$ |
| 12 | CHO | $CH_3$ | 4GL/120EO—H | $CH_3$ |
| 13 | NH—$NH_2$ | $C_2H_5$ | 3GL/160EO—H | 2-thienyl |
| 14 | —N=CH—$C_6H_5$ | $CH_3$ | 4GL/80EO—H | 5-Cl-2-thienyl |
| 15 | H | $CH_3$ | $C_6H_4$-4-$C_2H_4$O-3GL/100EO—H | $CH_3$ |
| 16 | CHO | $CH_3$ | $C_2H_4$O-4GL/100EO—H | $CH_3$ |
| 17 | $COCH_3$ | H | $C_2H_4N(SO_2CH_3)$-3GL/150EO—H | $C_6H_5$ |
| 18 | $COC_6H_5$ | 3GL/100EO—H | 3GL/100EO—H | $C_6H_5$ |
| 19 | NO | 3GL/10EO—H | 3GL/10EO—H | $CH_3$ |
| 20 | CHO | $C_2H_5$ | 3GL/20EO—H | $C_6H_5$ |

TABLE 44

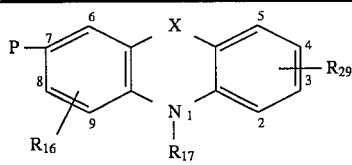

| Entry | P | $R_{16}$ | $R_{17}$ | X | $R_{29}$ |
|---|---|---|---|---|---|
| 1 | H | H | 2GL/50EO—H | CB* | H |
| 2 | CHO | H | 4GL/50EO—H | CB* | H |
| 3 | NO | 8-$CH_3$ | 4GL/70EO—H | CB* | H |
| 4 | $NH_2$ | 8-$CH_3$ | 5GL/70EO—H | CB* | H |
| 5 | H | 8-$CH_3$ | 3GL/70EO—H | CB* | 4-$OCH_3$ |
| 6 | H | H | 4GL/100EO—H | O | 3,4-di-Cl |
| 7 | H | H | 2GL/150EO—H | O | 2-Cl |
| 8 | H | 8-$CH_3$ | 2GL/45EO/5PO—H | O | 3-$OCH_3$ |
| 9 | $N_2^+Cl^-$ | 8-$CH_3$ | 3GL/200EO—H | S | H |
| 10 | NO | 8-$CH_3$ | 2GL/100EO—H | S | H |
| 11 | H | 5,8-di-$CH_3$ | 2GL/50EO—H | S | H |
| 12 | $NH_2$ | H | 4GL/80EO—H | S | H |
| 13 | NH—$NH_2$ | 8-$CH_3$ | 3GL/150EO—H | O | H |
| 14 | H | 8-$CH_3$ | 4GL/150EO—H | O | 4-$OCH_3$ |
| 15 | $NO_2$ | H | 6GL/200EO—H | O | H |
| 16 | $COCH_3$ | H | 6GL/30EO—H | O | H |
| 17 | $COC_6H_5$ | H | 4GL/45EO—H | O | H |
| 18 | —N=CH—$C_6H_5$ | 8-$CH_3$ | 5GL/50EO—H | O | H |
| 19 | H | 8-$CH_3$ | $C_2H_4$O-4GL/50EO—H | O | H |
| 20 | CHO | 8-$CH_3$ | 4GL/100EO—H | O | H |

*CB = covalent bond

TABLE 45

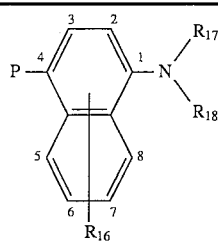

| Entry | P | $R_{16}$ | $R_{17}$ | $R_{18}$ |
|---|---|---|---|---|
| 1 | H | H | 2GL/50EO—H | 2GL/50EO—H |
| 2 | CHO | H | $C_2H_5$ | 4GL/45EO—H |
| 3 | $NH_2$ | 2-$CH_3$ | $CH_2CH=CH_2$ | 3GL/90EO—H |
| 4 | H | 2-$CH_3$ | 5GL/50EO—H | 5GL/50EO—H |
| 5 | H | 5-O-3GL/100EO—H | $C_2H_5$ | H |
| 6 | H | 2-$CH_3$ | $CH_3$ | 4GL/200EO—H |
| 7 | H | 2-$OCH_3$ | $C_2H_4C_6H_5$ | 2GL/150EO—H |
| 8 | H | 2-$OCH_3$,6-$CH_3$ | 2GL/30EO—H | 2GL/30EO—H |
| 9 | H | 3-$OCH_3$ | 3GL/45EO—H | 3GL/45EO—H |
| 10 | $N_2^+Cl^-$ | H | H | $C_2H_4SO_2NH$-2GL/100EO—H |
| 11 | $NH-NH_2$ | H | 2GL/30EO—H | $C_2H_5$ |
| 12 | $COCH_3$ | H | $C_6H_{10}$-4-$CH_3$ | 4GL/150EO—H |
| 13 | $COC_6H_5$ | H | $C_6H_4$-4-$OCH_3$ | 3GL/120EO—H |
| 14 | $-N=CH-C_6H_5$ | 2-$CH_3$ | $C_6H_4$-3-Cl | 4GL/200EO—H |
| 15 | H | 2-$CH_3$ | 6GL/100EO—H | 6GL/100EO—H |
| 16 | H | 5-$OCH_3$ | 6GL/15EO—H | 6GL/15EO—H |
| 17 | NO | H | 4GL/10EO—H | 4GL/10EO—H |
| 18 | $NH_2$ | H | $C_2H_4OC_6H_5$ | 3GL/30EO—H |
| 19 | $N_2^+Cl^-$ | H | $C_2H_4SC_6H_5$ | 2.5GL/35EO—H |
| 20 | CHO | H | $C_2H_4OC_2H_5$ | 3GL/90EO—H |

TABLE 46

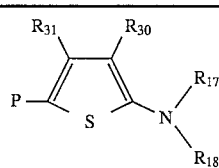

| Entry | P | $R_{17}$ | $R_{18}$ | $R_{30}$ | $R_{31}$ |
|---|---|---|---|---|---|
| 1 | H | 2GL/50EO—H | 2GL/50EO—H | H | H |
| 2 | CHO | 4GL/100EO—H | 4GL/100EO—H | H | H |
| 3 | $COCH_3$ | 3GL/90EO—H | $C_2H_5$ | H | $CH_3$ |
| 4 | NO | 5GL/75EO—H | $CH_3$ | H | $C_6H_5$ |
| 5 | $NH_2$ | 3GL/80EO—H | H | H | $CH_3$ |
| 6 | $N_2^+Cl^-$ | 4GL/120EO—H | H | $CO_2C_2H_5$ | $CH_3$ |
| 7 | $NH-NH_2$ | 3GL/80EO—H | H | CH | $CH_3$ |
| 8 | $NO_2$ | 2GL/60EO—H | $C_2H_5$ | $SO_2CH_3$ | $CH_3$ |
| 9 | CHO | 3GL/75EO—H | $CH_3$ | $CONH_2$ | $CH_3$ |
| 10 | NO | 3GL/150EO—H | H | $SO_2C_6H_5$ | $CH_3$ |
| 11 | $NH_2$ | 3GL/45EO—H | $CH_3$ | $CONHC_2H_5$ | $CH_3$ |
| 12 | H | 4GL/50EO—H | 4GL/30PO/10EO—H | H | $C_6H_5$ |
| 13 | H | 3GL/85EO—H | $C_2H_5$ | $CONHC_2H_4OH$ | $C_6H_5$ |
| 14 | CHO | 4GL/50EO—H | 4GL/8PO/8EO—H | H | $CH_3$ |
| 15 | $-N=CH-C_6H_5$ | 6GL/90EO—H | $CH_3$ | H | $CH_3$ |
| 16 | $NH_2$ | 6GL/100EO—H | $CH_2C_6H_5$ | H | $CH_3$ |
| 17 | NO | 4GL/100EO—H | 4GL/100EO—H | H | $C_6H_5$ |
| 18 | $NH-NH_2$ | 3GL/100EO—H | 3GL/100EO—H | H | $CH_3$ |
| 19 | CHO | 5GL/100EO—H | 5GL/100EO—H | H | $CH_3$ |
| 20 | $COC_6H_5$ | 4GL/150EO—H | $CH_3$ | H | $C_6H_5$ |

TABLE 47

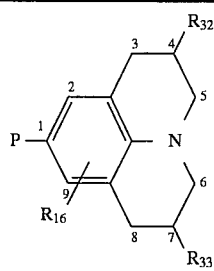

| Entry | P | $R_{16}$ | $R_{32}$ | $R_{33}$ |
|---|---|---|---|---|
| 1 | H | H | O-2GL/75EO—H | H |
| 2 | CHO | H | O-4GL/120EO—H | H |
| 3 | NO | 2-CH$_3$ | O-3GL/30EO—H | H |
| 4 | NH$_2$ | 2-CH$_3$ | O-5GL/30EO—H | H |
| 5 | N$_2^+$Cl$^-$ | 2-CH$_3$ | O-3GL/30EO—H | H |
| 6 | NH—NH$_2$ | 2-OCH$_3$ | O-4GL/30EO—H | CH$_3$ |
| 7 | COCH$_3$ | 2-Cl | O-3GL/150EO—H | CH$_3$ |
| 8 | H | 2-CH$_3$ | O-3GL/100EO—H | O-3GL/10PO/10EO—H |
| 9 | CHO | 2-OCH$_3$ | O-3GL/60EO—H | O-3GL/20PO/5EO—H |
| 10 | NO | 2-CH$_3$ | O-2GL/20EO—H | O-2GL/10BO/5EO—H |
| 11 | NH$_2$ | 2,9-di-CH$_3$ | O-2GL/20EO—H | OCH$_3$ |
| 12 | N$_2^+$Cl$^-$ | H | O-3GL/100EO—H | OCH$_3$ |
| 13 | H | H | O-3GL/50EO—H | Cl |
| 14 | H | 2-CH$_3$ | O-4GL/100EO—H | Cl |
| 15 | CHO | 2-CH$_3$ | O-6GL/50EO—H | H |
| 16 | CHO | 2-CH$_3$ | O-6GL/50EO—H | O-6GL/50EO—H |
| 17 | NH$_2$ | H | O-6GL/100EO—H | H |
| 18 | —N=CH—C$_6$H$_5$ | H | O-3GL/100EO—H | H |
| 19 | H | H | O-4GL/100EO—H | Cl |
| 20 | CHO | H | O-2GL/100EO—H | C$_2$H$_5$ |

TABLE 48

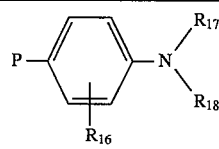

| Entry | P | $R_{16}$ | $R_{17}$ | $R_{18}$ |
|---|---|---|---|---|
| 1 | H | 3-CH$_3$ | ![](tolyl with CH$_3$) | 6GL/100EO—H |
| 2 | H | 3-CH$_3$ | ![](phenyl-O-2Gl/75EO—H) | 2GL/75EO—H |
| 3 | —C(=O)—H | 3-OC$_2$H$_5$ | CH(CH$_3$)C$_2$H$_5$ | 4GL/200EO—H |
| 4 | —C(=O)—H | 3-C$_2$H$_5$ | —CH$_2$—C$_6$H$_4$—CO$_2$C$_2$H$_5$ | 4GL/90EO—H |
| 5 | —N=O | H | —CH$_2$—C$_6$H$_4$—Cl | 3GL/65EO—H |

TABLE 48-continued

|  | | | R17 |
|---|---|---|---|
|  | | P—⟨phenyl⟩—N | |
|  | | \| | R18 |
|  | | R16 | |

| Entry | P | R16 | R17 | R18 |
|---|---|---|---|---|
| 6 | —N=O | H | —CH2—⟨C6H4⟩—Cl | 3GL/80EO—H |
| 7 | —NH2 | 3-CH2—O—3GL/120EO—H | C2H5 | C2H5 |
| 8 | —NH2 | 3-O—C2H4—O—3GL/200EO—H | C2H5 | —CH2—⟨C6H5⟩ |
| 9 | —N=N+Cl− | 3-CH3 | —C2H4—O—C(=O)—⟨C6H5⟩ | 4GL/60EO—H |
| 10 | —N=N+Cl− | 3-CH3 | —CH2CH(Cl)CH2Cl | 3GL/80EO—H |
| 11 | —NH—NH2 | H | —CH2CH2—N(succinimide) | 3GL/100EO—H |
| 12 | —NH—NH2 | H | —CH2CH2—N(hydantoin-like, N—H) | 4GL/150EO—H |
| 13 | H | H | —CH2CH2—N(cyclic with S—CH2) | 3GL/200EO—H |
| 14 | H | H | —CH2CH2—N(phthalimide) | 6GL/250EO—H |
| 15 | H | 3-CH3 | —CH2CH2—N(cyclic with O—CH2) | 5GL/65EO—H |

TABLE 48-continued
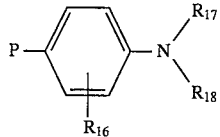
| Entry | P | R16 | R17 | R18 |
|---|---|---|---|---|
| 16 | H | 3-CH3 | 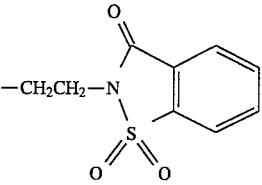 | 2GL/120EO—H |
| 17 | H | 3-CH3 | 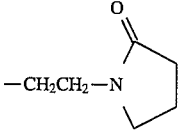 | 2GL/90EO—H |
| 18 | —C(=O)—H | 3-CH3 | 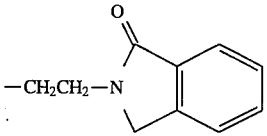 | 3GL/130EO—H |
| 19 | H | 3-CH3 | —C2H4—N(COCH3)SO2CH3 | 3GL/50EO—H |
| 20 | —N=O | H | 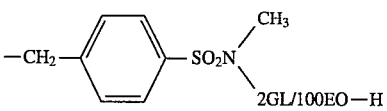 | C2H5 |
| 21 | —NO2 | H | 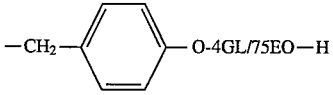 | CH3 |
| 22 | H | H | —CH2—C6H4SO2—NH-3(O-3GL/100EO—H | CH3 |
| 23 | 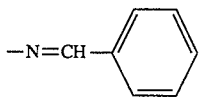 | H | 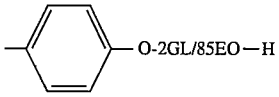 | CH3 |
| 24 | 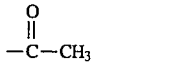 | H | 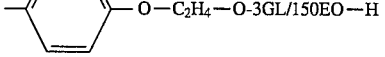 | CH3 |
| 25 | —C(=O)—H | H | 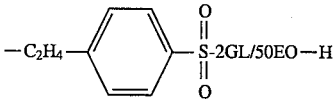 | CH3 |
| 26 | —N=O | H | —CH2—N(SO2—CH3)-3GL/75EO—H | CH3 |
| 27 | —NH2 | 3-CH3 | —C2H4—SO2—N(CH3)-2GL/95EO—H | CH3 |
| 28 | H | H | 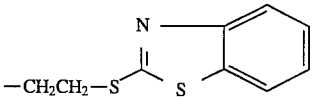 | 4GL/100EO—H |
| 29 | —NH2 | H | —CH2—CH2—O-2GL/150EO—H | C2H5 |
| 30 | —NH2 | H | 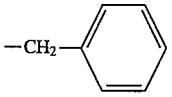 | 3GL/200EO—H |

TABLE 48-continued
| Entry | P | R₁₆ | R₁₇ | R₁₈ |
|---|---|---|---|---|
| 31 | $-NH_2$ | 3-Cl | $-CH_2-CH_2-O-2GL/10EO-H$ | $-CH_2-CH_2-O-2GL/10EO-H$ |
| 32 | $-\overset{O}{\underset{\|}{C}}-CH_3$ | 3-$CH_3$ | $-C_3H_6SO_2C_2H_4-S-CH_3$ | 4GL/15PO/20EO$-$H |
| 33 | H | H | 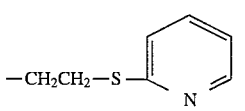 | 3GL/75EO$-$H |
| 34 | $-C(=O)-H$ | H | 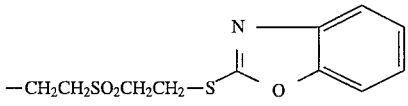 | 4GL/150EO$-$H |
| 35 | $-N=O$ | H | 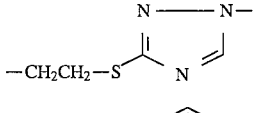 | 5GL/60EO$-$H |
| 36 | H | H | 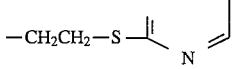 | 4GL/100EO$-$H |
| 37 | H | H | 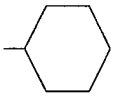 | 3GL/140EO$-$H |
| 38 | $-NH_2$ | H | $-CH(CH_3)C_4H_9$-n | 2GL/200EO$-$H |
| 39 | $-C(=O)-H$ | H | $-CH_2CH(CH_3)_2$ | 4GL/45EO$-$H |
TABLE 49
P$-$Ar$-$(Z)
| Entry | P | Ar | Z |
|---|---|---|---|
| 1 | H | 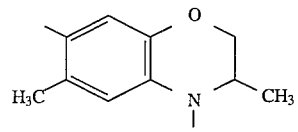 | 3GL/40EO$-$H |
| 2 | H | 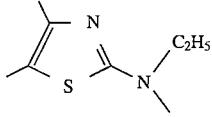 | 4GL/90EO$-$H |
| 3 | $-C(=O)-H$ | 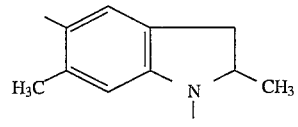 | 3GL/70EO$-$H |

TABLE 49-continued
| | | P—Ar—(Z) | |
|---|---|---|---|
| Entry | P | Ar | Z |
| 4 | H | 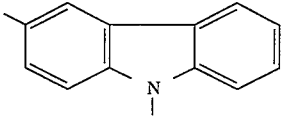 | 4GL/120EO—H |
| 5 | H | 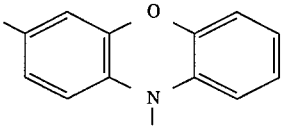 | 3GL/200EO—H |
| 6 | —N=O | 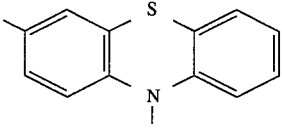 | 2GL/150EO—H |
| 7 | —C(=O)—H | 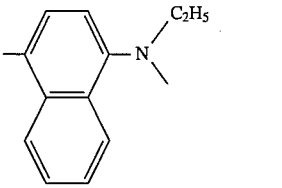 | 3GL/65EO—H |
| 8 | H | 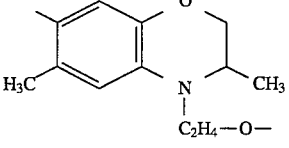 | 2GL/30EO—H |
| 9 | —C(=O)—H | 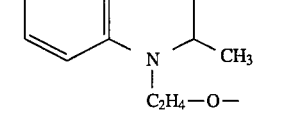 | 3GL/100EO—H |
| 10 | H | 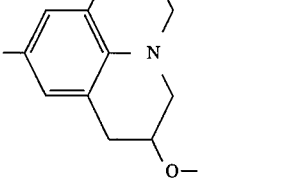 | 2GL/150EO—H |
| 11 | —C(=O)—H | 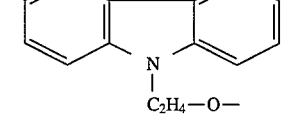 | 3GL/200EO—H |
| 12 | H | 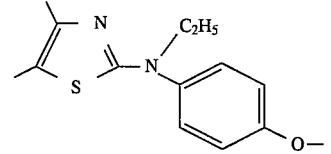 | 2GL/200EO—H |

TABLE 49-continued

| Entry | P | Ar | Z |
|---|---|---|---|
| 13 | —N=O | 4-methyl-1-(dimethylamino)naphthalene | (2GL/40EO—H)₂ |
| 14 | —C(=O)—H | N-methyl-3-methyl-2-methyl-benzomorpholine | 3GL/90EO—H |
| 15 | —N=O | 4,5-dimethyl-N-(2-hydroxyethyl)-3-methyl-benzomorpholine | 2GL/40EO—H |
| 16 | —NH₂ | 4,5-dimethyl-N-(2-hydroxyethyl)-benzomorpholine | 3GL/150EO—H |
| 17 | —NH₂ | 5,6-dimethyl-N-indoline | 6GL/100EO—H |
| 18 | —NH₂ | 3-methyl-N-(2-hydroxyethyl)-carbazole | 4GL/125EO—H |
| 19 | —NH₂ | 4,5-dimethyl-3-methyl-benzomorpholine | 3GL/150EO—H |
| 20 | —N=O | 3,5-dimethyl-3-methyl-benzomorpholine | 3GL/40EO—H |
| 21 | —NH—NH₂ | 4,5-dimethyl-3-methyl-benzomorpholine | 2GL/80EO—H |

TABLE 49-continued

P—Ar—(Z)

| Entry | P | Ar | Z |
|---|---|---|---|
| 22 | —N=CH—C₆H₅ | 1,2,2,4-tetramethyl-6,7-dimethyl-tetrahydroquinoline | 4GL/90EO—H |
| 23 | —CH=N—C₆H₅ | 2,2,4-trimethyl-6-methyl-tetrahydroquinoline | 2GL/120EO—H |
| 24 | —NH—NH₂ | 1,2,2,4-tetramethyl-6,7-dimethyl-tetrahydroquinoline | 2GL/65EO—H |

TABLE 50

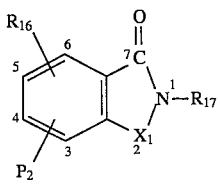

| Entry | R₁₇ | R₁₆ | p* | X₁ | P₂ |
|---|---|---|---|---|---|
| 1 | 3GL/80EO—H | H | 4 | C=O | H |
| 2 | 3GL/120EO—H | H | 4 | C=O | NO₂ |
| 3 | 4GL/150EO—H | H | 4 | C=O | NO₂ |
| 4 | 4GL/60EO—H | H | 3 | C=O | NH₂ |
| 5 | 3GL/200EO—H | H | 3 | —S— | NH—NH₂ |
| 6 | —C₆H₄—N(1.5GL/25EO—H)₂ | H | 3 | —S— | N₂⁺Cl⁻ |
| 7 | —C₆H₄—O-3GL/8PO/8EO—H | H | 4 | —S— | N₂⁺Cl⁻ |
| 8 | —C₆H₄—SO₂N(H)(2GL/100EO—H) | 4-CH₃ | 3 | C=O | NH₂ |
| 9 | —C₆H₄—N(1.5GL/50EO—H)₂ | 3,6-di-CH₃ | 4 | C=O | NH₂ |
| 10 | 3GL/60EO—H | 3-Cl | 4 | C=O | NH₂ |
| 11 | 3GL/80EO—H | 3-Br | 4 | C=O | —N=CH—C₆H₅ |
| 12 | 4GL/140EO—H | 4,5-diCl | 3 | C=O | NH—NH₂ |

TABLE 50-continued

| Entry | R₁₇ | R₁₆ | p* | X₁ | P₂ |
|---|---|---|---|---|---|
| 13 | 4GL/20PO/20EO—H | H | 4 | C=O | H |
| 14 | 3GL/70EO—H | H | 4 | C=O | NO₂ | p* indicates the position of P₂ on the aromatic ring

TABLE 51

| Entry | R₁₇ | R₁₆ | P₄ |
|---|---|---|---|
| 1 | 3GL/100EO—H | H | H |
| 2 | 3GL/200EO—H | 6-OCH₃ | 4-NO₂ |
| 3 | 4GL/150EO—H | 5,6-di-CH₃ | 4-NO₂ |
| 4 | 3GL/75EO—H | 5,6-di-OC₂H₅ | 4-NH₂ |
| 5 | 5GL/45EO—H | 5,6-di-C₆H₅ | 4-NH₂ |
| 6 | 3GL/100EO—H | 5-S—C₆H₅ | 4-N₂⁺Cl⁻ |
| 7 | —C₆H₄—O-2GL/50EO—H | 6-S—C₆H₄—Cl | 4-NH—NH₂ |
| 8 | —C₆H₄—N(2GL/50EO—H)₂ | 5,6-di-SC₂H₅ | 4-NH—NH₂ |
| 9 | —C₆H₄—SO₂N(H)(2GL/150EO—H) | 6-NHCOCH₃ | 5-NH—NH₂ |
| 10 | —C₆H₄—N(2GL/40EO—H)₂ | 6-NHCOC₆H₁₁ | 5-NO₂ |
| 11 | —C₆H₄—O30EO-18PO/10EO—H | 6-NHCO₂C₂H₅ | 4-NO₂ |
| 12 | 2GL/80EO—H | 6-NHSO₂-n-C₄H₉ | 4-NH₂ |

TABLE 51-continued

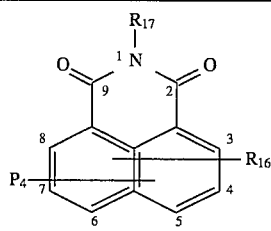

| Entry | R$_{17}$ | R$_{16}$ | P$_4$ |
|---|---|---|---|
| 13 | —CH$_2$—C$_6$H$_4$—SO$_2$N(H)(3GL/125EO—H) | 6-—NH—C(=N—)(triazine with OCH$_3$, N, OCH$_3$) | 4-NH$_2$ |

TABLE 52

$$Q_1-(N=N-Ar)_n$$

| Entry | Q$_1$ | Ar(Coupler) | n |
|---|---|---|---|
| 1 | —C$_6$H$_4$—S—C$_6$H$_4$— | —C$_6$H$_4$—N(2GL/50EO—H)(2GL/50EO—H) | 2 |
| 2 | —C$_6$H$_4$—S—S—C$_6$H$_4$— | —C$_6$H$_3$(CH$_3$)—N(C$_2$H$_5$)(3GL/100EO—H) | 2 |
| 3 | —C$_6$H$_4$—CO$_2$—C$_6$H$_4$— | —C$_6$H$_3$(Cl)—N(2GL/25EO—H)(2GL/25EO—H) | 2 |
| 4 | —C$_6$H$_4$—C(=O)NHC$_2$H$_4$NHC(=O)—C$_6$H$_4$— | —C$_6$H$_4$—N(CH$_3$)(3GL/75EO—H) | 2 |
| 5 | —C$_6$H$_4$—N(CH$_3$)—C$_6$H$_4$— | —C$_6$H$_4$—N(2GL/50EO—H)(2GL/50EO—H) | 2 |
| 6 | —C$_6$H$_4$—N(SO$_2$CH$_3$)—C$_6$H$_4$— | —C$_6$H$_4$—N(2GL/50EO—H)(2GL/50EO—H) | 2 |
| 7 | —C$_6$H$_4$—SO$_2$NH—C$_6$H$_4$— | —C$_6$H$_4$—N(CH$_2$C$_6$H$_5$)(2GL/50EO—H) | 2 |

TABLE 52-continued
$Q_1-(N=N-Ar)_n$
| Entry | $Q_1$ | Ar(Coupler) | n |
|---|---|---|---|
| 8 | 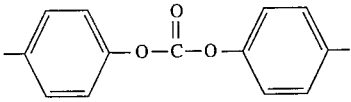 | 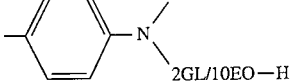 2GL/10EO—H / 2GL/10EO—H | 2 |
| 9 | 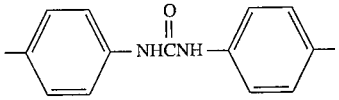 —NHCNH— | 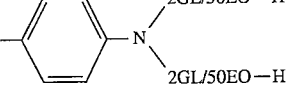 2GL/50EO—H / 2GL/50EO—H | 2 |
| 10 | 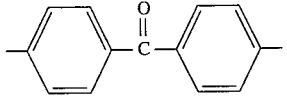 | 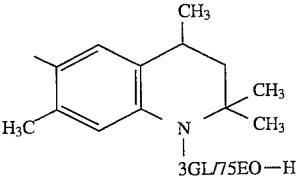 CH₃, CH₃, CH₃, 3GL/75EO—H | 2 |
| 11 | 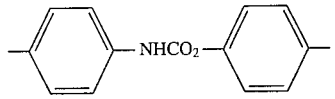 —NHCO₂— | 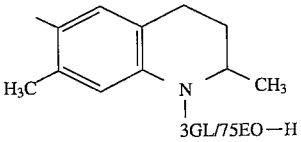 CH₃, 3GL/75EO—H | 2 |
| 12 | 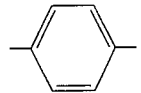 | 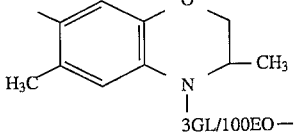 CH₃, 3GL/100EO—H | 2 |
| 13 | 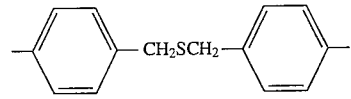 —CH₂SCH₂— | 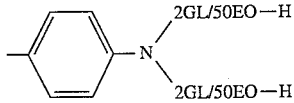 2GL/50EO—H / 2GL/50EO—H | 2 |
| 14 | 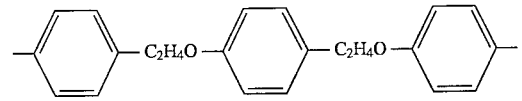 —C₂H₄O— —C₂H₄O— | 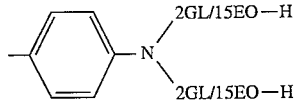 2GL/15EO—H / 2GL/15EO—H | 2 |
| 15 | 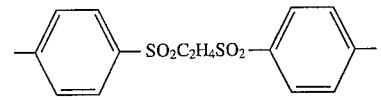 —SO₂C₂H₄SO₂— | 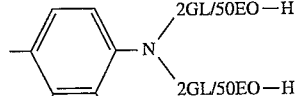 2GL/50EO—H / 2GL/50EO—H | 2 |
| 16 | 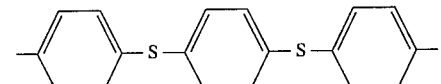 —S— —S— | 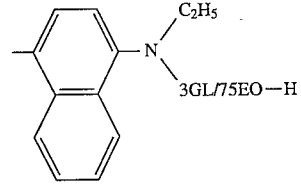 C₂H₅ / 3GL/75EO—H | 2 |
| 17 | 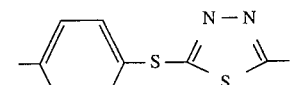 | 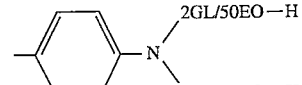 2GL/50EO—H / 2GL/50EO—H | 2 |
Note: subscripts such as $C_2H_5$, $CH_3$, $SO_2$, $C_2H_4O$, $CH_2SCH_2$ reproduced in LaTeX where applicable within the table.

TABLE 52-continued $$Q_1-(N=N-Ar)_n$$

| Entry | Q₁ | Ar(Coupler) | n |
|---|---|---|---|
| 18 | [structure: tolyl-S-phenyl-S-C(=N-)CH₃] | 4-N(2GL/30EO-H)₂-phenyl | 2 |
| 19 | [structure: tolyl-O-naphthyl] | [thiazoline with H₅C₆, N, C₂H₅, 3GL/60EO-H] | 2 |
| 20 | [structure: tolyl-O-naphthyl] | 3-CF₃-4-N(2GL/90EO-H)₂-phenyl | 2 |
| 21 | [structure: tolyl-C₂H₄O-naphthyl] | 3-OCF₃-4-N(2GL/50EO-H)₂-phenyl | 2 |
| 22 | [bis-thiadiazole linked by SC₂H₄S] | 4-N(CH₃-H)(2GL/50EO-H)-phenyl | 2 |
| 23 | [structure: tris(tolyl)CH-CH₃] | 4-N(2GL/10EO-H)₂-phenyl | 3 |
| 24 | [structure: tris(tolyl)amine] | 4-N(2GL/50EO-H)₂-phenyl | 3 |

We claim:

1. A colorant comprising a compound having the formula $C(Z)_{1-8}$ wherein:

C is a chromogen radical having from 1–8 nucleophilic site residues to which the Z moieties are attached; said Z moieties containing at least about 60 weight percent of poly(oxyalkylene) which is comprised of (a) at least one glycidol residue segment of 2–6 glycidol residues attached to a nucleophilic site of C, wherein said poly(oxyalkylene) contains a total of from 2–20 glycidol residues, and (b) wherein said poly(oxyalkylene) further contains three separate poly (oxyalkylene) branches pendant from said glycidol residue segment containing the residues of one or more other epoxide reactants of ethylene oxide (EO), propylene oxide (PO), or butylene oxide (BO), or mixtures thereof, wherein said poly(oxyalkylene) contains a total of from about 10 to about 600 of said EO, PO or BO residues, or mixtures thereof, at least about 75 mole percent of which are EO residues.

2. The colorant of claim 1 wherein the total number of said other epoxide residues is from about 150 to about 400 and the ratio of the total of —O—PO— AND —O—BO— linkages of all glycidol residues to the total of all functional oxy linkages of said glycidol residues is less than one.

3. The colorant of claim 1 wherein the EO residues comprise from about 90 to 100 mole percent of said other epoxide residues.

4. The colorant of claim 1 wherein the poly(oxyalkylene) moiety contains one glycidol residue segment containing 2–6 glycidol residues.

5. The colorant of claim 1 wherein each said poly(oxyalkylene) moiety is independently terminated by hydrogen or a group selected from acyl or unsubstituted or substituted alkyl, cycloalkyl, or aryl.

6. The colorant of claim 1 wherein each said poly(oxyalkylene) branch is terminated by hydrogen.

7. The colorant of claim 1 wherein the number of Z moieties is from 1–4.

8. The colorant of claim 1 wherein C is selected from compounds containing at least one chromogen radical selected from mono-, bis-, tris-, or tetrakis-azo, methine, azamethine, indophenol, or triphenylmethane chromogen radicals.

* * * * *